(12) United States Patent
Lund

(10) Patent No.: US 8,272,331 B2
(45) Date of Patent: Sep. 25, 2012

(54) AUTOMATED TRANSPORT SYSTEM

(75) Inventor: Van Metre Lund, Evanston, IL (US)

(73) Assignee: Autran Corp., Evanston, IL (US)

( * ) Notice: Subject to any disclaimer, the term of this patent is extended or adjusted under 35 U.S.C. 154(b) by 175 days.

(21) Appl. No.: 12/658,023

(22) Filed: Feb. 1, 2010

(65) Prior Publication Data

US 2011/0061559 A1 Mar. 17, 2011

Related U.S. Application Data

(60) Provisional application No. 61/205,777, filed on Feb. 4, 2009, provisional application No. 61/276,370, filed on Sep. 11, 2009.

(51) Int. Cl.
*B61J 3/00* (2006.01)
(52) U.S. Cl. ..................................... 104/88.01
(58) Field of Classification Search .............. 104/27–31, 104/48–50, 88.01, 96, 130.01, 130.04–130.07
See application file for complete search history.

(56) References Cited

U.S. PATENT DOCUMENTS

| | | | | |
|---|---|---|---|---|
| 2,645,185 A | * | 7/1953 | Fields | 104/63 |
| 2,694,164 A | * | 11/1954 | Geppelt | 335/296 |
| 2,838,009 A | * | 6/1958 | Bonanno | 105/77 |
| 3,690,393 A | * | 9/1972 | Guy | 180/65.6 |
| 4,304,187 A | * | 12/1981 | Becker et al. | 104/120 |
| 4,990,117 A | * | 2/1991 | Yonezawa | 446/136 |
| 4,996,928 A | * | 3/1991 | Janssen et al. | 105/144 |
| 5,069,141 A | * | 12/1991 | Ohara et al. | 105/30 |
| 5,222,439 A | * | 6/1993 | Di Rosa | 105/148 |
| 5,359,941 A | * | 11/1994 | DeLorean | 105/73 |
| 5,381,737 A | * | 1/1995 | Trenary | 105/34.1 |
| 5,706,735 A | * | 1/1998 | Lund | 104/88.04 |
| 6,886,651 B1 | * | 5/2005 | Slocum et al. | 180/167 |

* cited by examiner

*Primary Examiner* — S. Joseph Morano
*Assistant Examiner* — R. J. McCarry, Jr.

(57) ABSTRACT

A single main steel wheel rides on a single main steel rail of a guideway to support and drive a carrier and to facilitate steering and provide a simplified, more compact and less costly construction. The carrier can support a car through a platform having elements and chocks for locking contact with a front bumper and front wheels of the car Auxiliary wheels and rails cooperate to cause nearly all weight to be carried through the single main wheel. Traction is increased when necessary through application of increased upward forces to undersides of auxiliary rails and/or through developing magnetic forces between the steel wheel and steel rail. An AC induction motor is a main source of drive power. Acceleration and braking are assisted through epicyclic gearing, braking means and a DC motor/generator that is connected to a battery and that drives the carrier if supply of AC fails.

28 Claims, 28 Drawing Sheets

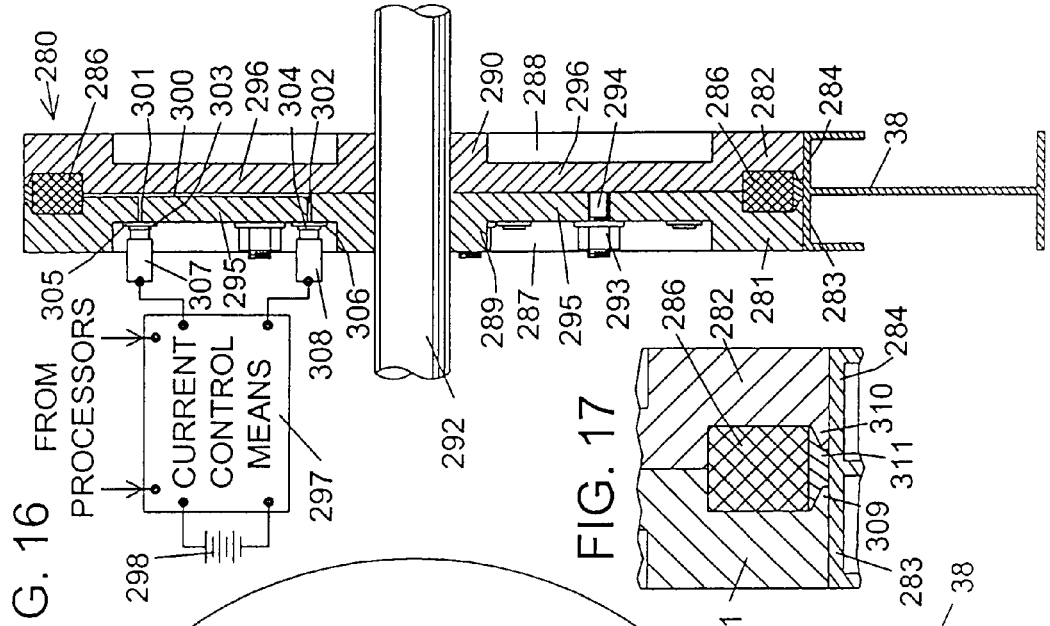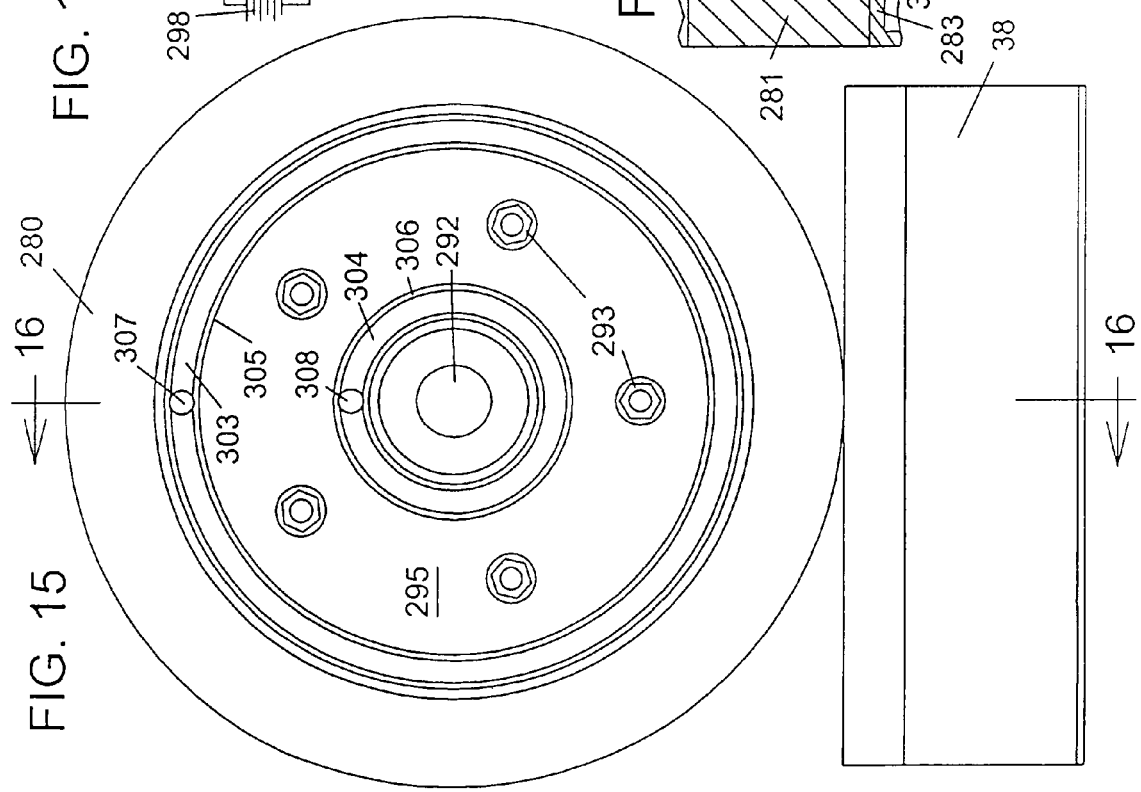

AUTOMATED TRANSPORT SYSTEM

A claim is made for the priority benefits of Provisional Application No. 61/205,777, entitled "AUTOMATED TRANSPORT SYSTEM", filed Feb. 4, 2009 and of Provisional Application No. 61/276,370, entitled "AUTOMATED TRANSPORT SYSTEM", filed Sep. 11, 2009.

BACKGROUND OF THE INVENTION

This invention relates to improvements upon prior automated transport systems, particularly those disclosed in my U.S. Pat. Nos. 5,590,603, 5,590,604, 5,598,783, 5,706,735, 5,979,334, 6,082,268, 6,237,500 and 6,622,635 and in references cited therein.

SUMMARY OF THE INVENTION

Important aspects of the invention relate to analyses of prior systems and the discovery and recognition of problems with and deficiencies with such systems. In the past, vehicles such as wagons, carriages and automobiles and cars or bogies of trains have commonly used four support wheels for support either directly from underlying ground or through roadways or rails. Sometimes only three wheels have been used. In such vehicles, stability against rotations about transverse and longitudinal axes is obtained through longitudinal and lateral spacing of support wheels. In four wheel vehicles, support wheels are usually in two pairs with one pair in longitudinally spaced relation to the other pair and with the wheels of each pair in laterally spaced relation to each other. Three wheel vehicles usually include a pair of support wheels that are longitudinally spaced from a third support wheel and that are in laterally spaced relation to each other.

The idea of obtaining stability through support wheels that are spaced longitudinally and laterally is so pervasive that it is hard to escape from. I myself have used the idea in four-wheel designs of vehicles in my aforesaid issued patents. However, I find that the idea is not necessarily a good idea when a vehicle can be supported in a guideway or the like and when it is realized that means other than spacings of support wheels can be used to obtain stability. In accordance with the invention, a vehicle is provided that is referred to herein as a "carrier" and that is movable along a guideway while carrying a load such as an automobile-carrying platform or passenger cabin. (The term "carrier" is used herein as a synonym to the term "carrier vehicle" but is used rather than the term "carrier vehicle" which seemed to cause possible confusion, when used in my prior patents and otherwise, between a vehicle that is being carried and the vehicle that is doing the carrying, since automobiles or other vehicles can be carried.). The guideway includes a main rail and two auxiliary rails. A support wheel of the carrier rides on the main rail. Auxiliary wheels of the carrier contact the two auxiliary rails to obtain stability with respect to tilting about a longitudinal axis. To obtain stability with respect to rotation of the carrier about a transverse axis, two longitudinally spaced main support wheels may be used. Preferably, however, a single main support wheel is used and stability is obtained through contacts between auxiliary wheels and either the main rail or auxiliary rails at points spaced forwardly and rearwardly from the single main support wheel.

To insure against lateral displacement of a support wheel relative to the main rail, additional auxiliary wheels contact sides of a main rail at points in adjacent relation to a region of contact between the support wheel and the main rail. Steering means are provided for controlling rotation of the support wheel about a vertical axis through that region of contact. Preferably, the steering means includes auxiliary wheels for contact with rail surfaces that are spaced forwardly from the vertical turn axis. Turns of short radius are possible.

The use of auxiliary rails and wheels allows the carrier to be as compact as possible, can also minimize the number of required components and can facilitate driving and braking the carrier. The carrier is preferably driven and braked through torques applied to a support and drive wheel that rides on a single main rail. There is no need for the differential that has previously been required when a pair of support and drive wheels ride on laterally spaced rails to limit tilting of a vehicle. A very important feature is in obtaining increased traction through the use of contacts between auxiliary wheels and undersides of the two auxiliary rails to apply increased upward forces, thereby increasing the downward traction force applied from the support wheel to the main rail. Preferably, such forces are so controlled that increased traction is obtained when necessary or desirable, as when accelerating or braking or when moving on upward or downward inclines.

In Y-junctions, means are provided for steering a carrier in either of two paths while a support wheel rides on portions of a main rail. First and second main rail portions extend away from each other and from one end of a third rail portion, from a forward end of the third rail portion in a divergent Y-junction and from a rearward end of the third rail portion in a convergent Y-junction. In each Y-junction, a first auxiliary rail is in a certain spacial relation to the first and third main rail portions to be contacted by one of two auxiliary wheels while a second auxiliary rail is in a certain spacial relation to the second and third main rail portions to be contacted by the other of the two auxiliary wheels. The first auxiliary rail can thereby limit tilting of the carrier in one direction when the carrier moves in one path. The second auxiliary rail can thereby limit tilting of the carrier in the opposite direction when the carrier moves in the other path. Tilt-limit means are provided for limiting tilting in the opposite direction when the carrier moves in the one path and for limiting tilting in the one direction when the carrier moves in the second path.

Important advantages are obtained by using a single main wheel to support a carrier. Construction is simplified and the number of components required for each carrier is minimized. Guidance of the carrier along straight and curved paths and steering of the carrier through Y-junctions are facilitated. Inherently high traction forces are obtained when a single main wheel carries virtually all of the weight of the carrier and its load. Such inherently high traction forces can be increased when necessary or desirable by applying increased upward forces to auxiliary rails. These features are important when, as is preferably the case, steel wheels and steel rails are used. The result of all these features is that more than adequate traction force can be obtained at all times, while minimizing the high frictional losses and other problems associated with use of tires.

A further advantage of the use of a main wheel engaged with a single main rail relates to the provision of a protected path for carrier movement within an enclosed guideway. A single load-support pad can be positioned above the guideway and directly above the single main wheel. To support the pad, a connection from the pad to a carrier frame can extend down through a longitudinally extending and narrow opening in a top guideway wall. Entry of rain or snow into the path of the carrier is thereby limited.

In a first embodiment of the invention, two auxiliary rails are located upwardly and in spaced relation, directly above a main rail. They can be used in performing a number of important functions. Side surfaces of the two upwardly located auxiliary rails may be contacted by auxiliary wheels to limit tilting of a carrier about a longitudinal axis. Side surfaces of the two upwardly located auxiliary rails may also be contacted by auxiliary wheels in guiding a carrier and in steering the carrier, especially in proper directions through Y-junctions. For steering through Y-junctions, auxiliary wheels of the carrier may contact inwardly facing side surfaces of the two upwardly located auxiliary rails while additional left and right auxiliary wheels of the carrier may contact outwardly facing side surfaces of the two auxiliary rails, the left auxiliary wheel being lowered in a steer to the right and the right auxiliary rail being lowered in a steer to the left. Downwardly facing underside surfaces of the two auxiliary rails may be contacted by auxiliary wheels in control of traction and can be used in obtaining a proper balance of a carrier about the transverse axis of a single main wheel. The two upwardly located auxiliary rails can also be located on opposite sides of a path of movement of a connection between a carrier frame and a load-support pad above the guideway.

Control of the proper vertical relation of the auxiliary wheels which control tilting to the two upwardly located auxiliary rails is preferably accomplished through position-control wheels that engage downwardly facing underside surfaces of the two upwardly located auxiliary rails. Such position control wheels are most preferably the same wheels that are used for traction control.

To control rotation of a main wheel about a vertical axis through the area of contact between the main wheel and main rail and to thereby guide and steer the carrier in the first embodiment, additional auxiliary wheels are provided that contact side surfaces of the two upwardly located auxiliary rails at points in longitudinally spaced relation ahead of the main wheel. The proper vertical position of such additional auxiliary wheels is maintained by associated position-control wheels that contact underside surfaces of the two upwardly located auxiliary rails.

In the first embodiment, current supply rails are provided on opposite sides of the two upwardly located auxiliary rails, preferably in two groups each including three rails for supply of three phase AC power. The power may preferably be supplied from the electrical supply grid and obtained in part from wind and solar power sources. Two current collector assemblies are supported from a carrier. Except in Y-junctions, both may engage the current supply rails. To permit steering through Y-junctions, one of the current collector assemblies is lowered to a level below that of the upwardly located auxiliary rails while the other supplies power to the carrier. For this purpose, physical connections are provided between the current collector assemblies and auxiliary wheels that, to limit tilting or to control steering, are arranged to contact outwardly facing side surfaces of the two upwardly located auxiliary rails. In an illustrated carrier, such connections are to the auxiliary wheels used to limit tilting.

Additional features of the first embodiment relate to the provision of lower guide wheels that insure proper engagement between the main wheel and the main rail. A first pair of lower guide wheels may engage opposite sides of the main rail. A second pair of lower guide wheels may engage inwardly facing sides of a pair of lower rails that are provided in Y-junctions in outwardly spaced relation to the main rail. In conditions other than when steering through Y-junctions, the first pair of lower guide wheels engage the opposite sides of the main rail to insure proper engagement between the main wheel and the main rail. In steering through a Y-junction, one of the first pair of lower guide wheels and one of the second pair of lower guide wheels are lifted to level above that of the main rail and lower guide rails. The other wheels of the two pairs then engage a side of the main rail and a side of one of the lower guide rails to insure proper engagement between the main wheel and the main rail.

The provision of such lower guide wheels is particularly important in that forces can potentially develop to cause the main wheel to move sideways off the main rail. For example, the forces applied from a strong side wind to a load above the guideway could act on the main wheel about a fulcrum point at about the level of the upper rails, possibly producing a sideways force of one hundred pounds or more on the main wheel where it engages the main rail. Another example relates to movements through turns when the main wheel tends to move in a chordal direction toward the guide and steering means, rather than in the direction that is desired for staying on the main rail and that is tangential with respect to the arc of the turn. If the radius of a turn is fifteen feet and if the distance to the guide and steering means is four feet, the calculated angle between the chordal direction and the desired direction is 7.7 degrees. If the total frictional force between the main wheel is, say, five hundred pounds a calculated sideways force of about sixty eight pounds must be resisted to keep the main wheel on the main rail. To facilitate movements through turns of short radius, a support that journals the main wheel might be pivotal to a limited extent about a vertical axis. This would require a drive connection that uses U-joints or that is otherwise flexible, but could be readily accomplished. However, the provision of the lower guide wheels would nevertheless be highly desirable because of potential problems with side winds and otherwise.

Other important features of the first embodiment relate to balance control, i.e. obtaining the proper balance of the carrier and the load it carries about the horizontal axis of the main wheel. The aforementioned position-control wheels not only control proper positioning of auxiliary wheels relative to the upwardly located auxiliary rails but are also used as a pair of upper balance control wheels. A lower balance control wheel is engaged with the main rail at a point below the pair of balance control wheels. Means are provided for controlling the vertical distance between the lower balance control wheel and the pair of upper balance control wheels. Preferably, a screw jack or equivalent linear actuator is secured to a forward end portion of a main frame of the carrier. The jack controls vertical movement of an element that applies an upward force to the pair of upper balance control wheels through an upper compression spring and that applies a downward force to the lower balance control wheel through a lower compression spring. The jack is preferably operated by an electric motor which is controlled by a signal from a linear potentiometer or equivalent device that senses changes in the vertical position of the forward end of the carrier frame relative to the lower balance control wheel.

Additional features of the first embodiment relate to a guideway design that provides strong, reliable and accurate support of rails, that facilitates construction and that allows for compatible use of guideways with different load-carrying capabilities in a network of guideways. In an illustrated arrangement rails are supported between two parallel beams by assemblies which may be installed at certain intervals along a guideway, e.g. every two feet. The beams may be of precast and prestressed concrete but may be of steel or other materials where desired as where the guideway is to have a small capacity and/or where a small exterior size is needed. Each assembly may include two hangers that are arranged to be hooked onto the beams. Each hanger may provide support for one of two upwardly located auxiliary rails and half of the support for a main lower rail.

Means are provided for adjusting the vertical position of each assembly relative to the supporting beam, the horizontal position of a support for each upwardly located auxiliary rail relative to the supporting beam and the horizontal position of each main rail support relative to the supporting beam. To support rails that extend in curves, the horizontal positions of the rail supports can be readily varied as necessary while allowing the beams to be in parallel relation. Each hanger may also support electrical supply rails, preferably in fixed relation to a support for an upwardly located auxiliary rail to be at positions which are adjusted at the same time that the position of the upwardly located auxiliary rail is adjusted.

Further features of the first embodiment invention relate to a drive train for the carrier which is similar to that disclosed in FIGS. 22,23 and 27 at col. 13, lines 23-67 and col 15, line 43 to col. 17, line 64 of my U.S. Pat. No. 6,082,268. An induction motor is the main source of power and can operate at a substantially constant speed with very high efficiency. A control motor is used in making speed changes and, in accordance with an important feature, in shifting of gears, requiring no clutch. The drive train includes a an epicyclic or differential gear train having one element coupled to the induction motor, a second element coupled to the control motor and a third element coupled through a gears of a transmission to an output shaft that is coupled to the main drive wheel of the carrier. The transmission includes means for sensing the rotational speeds of the third element and the output shaft and for selecting between neutral and any one of three or more gears. The control motor is preferably a DC motor/generator that develops an emf proportional to field current and that is connected through switching means to a either a resistive load or DC battery supply that can store as well as supply energy. An electrically controllable brake may be connected to the control motor.

One operation of the drive train starts with the transmission in neutral, with the control motor connected to the DC supply and with its field current at a low value so as to operate at a high speed such that the third element is stationary. Then a lowest gear of the transmission is coupled to its output shaft. Then field current is gradually increased to apply charging current to the DC supply and store energy. This will gradually reduce the speed of the control motor and thereby gradually increase the speed of the output shaft. At a certain point, a shift is made to a next higher gear ratio. This is accomplished by shifting the transmission to neutral and then controlling field current in response to sensing of any difference between the speed of the output shaft and the product of the speed of the third element and the next higher speed ratio. When the difference is made equal to zero, the output shaft and the next higher gear will be rotating at the same speed and can be safely connected. Once connected, field current is again gradually increased to decrease the speed of the control motor and further increase the speed of the output shaft.

Other modes of operation of the drive system are possible. For example, if the AC supply to the carrier fails, the main motor may be disconnected and braked. Then connections to the control motor may be reversed and, usually after shifting to the lowest gear, the control motor may be operated from energy stored in the DC supply to move the carrier to a next available station for safe unloading of occupants of a car or passengers in a cabin being carried.

In second embodiment of the invention, and in contrast to the first embodiment, two auxiliary rails are spaced through substantial horizontal distances from the main rail and are also somewhat above the main rail but at positions that are much lower than the positions of the two upwardly located auxiliary rails of the first embodiment. The underside surfaces of the two auxiliary rails of the second embodiment are located through only a relatively short vertical distance from the upper surface of the main rail. This arrangement has important advantages. One advantage is that the same wheels that control traction can be used in control of tilting; no separate tilt-control wheels are required. Another advantage arises in part from the fact that the forces applied to the two auxiliary rails for tilt control are in substantially the same vertical direction as those applied for traction control and in part from the fact that with the two auxiliary rails located along the sides of the guideway, the support required to withstand such vertically applied traction and tilt control forces is facilitated. It avoids problems with the arrangement of the first embodiment in which the upwardly located auxiliary rails are in central elevated locations that make construction and access difficult and that make it difficult to resist vertical traction control forces and horizontal tilt control fores. The second embodiment avoids the cantilever supports that are required to withstand the vertical traction control forces applied to the upwardly located auxiliary rails.

In accordance an important feature of the second embodiment, guide and steer control wheels contact opposite sides of the main rail rather than contacting the two upwardly located auxiliary rails of the first embodiment. Preferably, one pair of guide and steer control wheels is located below the axis of the main wheel to keep the main wheel in properly centered relation to the main rail at all times. A second pair of guide and steer control wheels is located a substantial distance ahead of the axis the main wheel. When moving along a main rail that curves to the left or right, the carrier is rotated about a vertical axis through the area of contact between the main wheel and the main rail, thereby developing a lateral "cornering force" that assists movement of the carrier in the proper leftward or rightward direction. The arrangement allows the carrier to be moved through turns of very short radius.

In the second embodiment, operations are simplified in moving through Y junctions. To steer to the right through a divergent Y junction, the guide and steer wheels on the left side of the main rail are lifted while a transverse force-developing wheel engaged with the upper surface of the main rail is turned in a direction to develop a force to the left, insuring engagement of the guide and steer wheels with the right side of the main rail. In entering a convergent Y junction from the left, guide and steer wheels on the right are lifted until the carrier has moved beyond the entrance to the junction. Such operations are reversed in steering to the left through a divergent Y junctions and entering from the right into a convergent Y junction.

Another feature of the second embodiment relates to the supply of electrical current from the guideway to carriers moving along the guideway. Current supply rails are provided along opposite sides of the main rail, preferably in two groups of three each for supply of three phase AC power that may be obtained from the grid. The upper surfaces of such current supply rails are preferably at the same level as the upper surface of the main rail. While steering to the left through a divergent Y junction or in entering from the right to move through a convergent Y junction, current collector shoes on the left are lifted to avoid contact with the main rail or supply rails on the right. While steering to the right through a divergent Y junction or in entering from the left to move through a convergent Y junction, current collector shoes on the right are lifted to avoid contact with the main rail or supply rails on the left.

Other important features of the second embodiment relate to balance control, i.e. obtaining the proper balance of the carrier and the load it carries about the horizontal axis of the main wheel. Balance wheels that rotate about horizontal axes and that engage the upper surface of the main rail are positioned in spaced relation ahead of and behind the main support wheel. Such balance wheels are supported through springs from supports that are controlled from electrical signals developed by sensors that sense displacements relative to the main rail of portions of the carrier in spaced relation ahead of and behind the main support wheel. Each displacement sensor preferably includes a sensing wheel rotating about a horizontal axis and urged by a spring into engagement with the upper surface of the main rail and a linear potentiometer which measures the displacement of the sensing wheel relative to the carrier.

The support for each balance wheel and for each sensing wheel preferably allows limited rotation about a vertical axis ahead of the horizontal axis of the rotation of the wheel to provide a caster action. However, during movement through Y junctions, the support for the forward balance wheel may be actively rotated about a vertical axis to a position which allows the forward balance wheel to act as a force-developing wheel as described previously that either insures engagement of the right guide and steer wheels with the right side of the main rail or that insures engagement of the left guide and steer wheels with the left side of the main rail. In moving through curved paths, the carrier rotates about a vertical axis through the area of contact between the main wheel and the main rail. In a turn to right, the guide and steer wheels at the forward end of a carrier follow the main rail and are displaced a certain distance to the right from a direction line at right angles to the axis of the main rail. At the same time, the rearward end of the carrier is displaced to the left by that certain distance from the direction line and twice that certain distance from the underlying portion of the main rail. There can thus be a quite substantial lateral displacement of the rearward balance and sensing wheels relative to the portions of the main rail to be engaged thereby. For this reason, each of the rearward balance and sensing wheels preferably has a relatively large width, sufficient to insure proper engagement with the main rail in turns of minimum radius.

Further features of the second embodiment relate to a carrier drive train designed to be highly efficient in operation, versatile, low in cost and reliable. The drive train includes an AC induction motor that can be powered from the grid and a transmission between the induction motor and the main drive wheel. In an illustrated embodiment, the transmission includes two planetary gear trains that are coupled in series relation. A sun gear of each train is connected to a caliper brake to control drive from a planet-carrier to a ring gear. Through control of the caliper brakes and through selective lock-ups of the two gear trains, substantially constant carrier speeds of about 45 MPH, about 63 MPH and about 88 MPH are developed with drive from the induction motor that is operated with high efficiency at near rated speed.

The drive train also includes a DC motor/generator connected to batteries and usable alone to drive main wheel in the event of failure of power from the grid. An important feature is that the DC motor/generator is also usable to supply torque to the main drive wheel during time intervals of acceleration of the carrier and to provide regenerative braking during time intervals of deceleration of the main wheel. In the event of an AC power failure, the DC motor/generator is usable to move a carrier to a station ahead, which can be done at a relatively low speed so that the motor/generator can be of limited rated capacity for continuous operation and of relatively smaller size and cost. During time intervals of acceleration and deceleration, which can be of relatively short duration, the DC motor/generator can be safely operated at power levels much greater that its rated capacity.

Use of the DC motor/generator during accelerations and decelerations complements a drive/braking control system in which control is exercised through control of torque applied to one element of a planetary gear train. Such control systems are highly advantageous when used for control of the speed of carriers powered from induction motors, carrying different types of loads and following one-another along guideways. However, there are problems in attempting to use such gear trains used solely for acceleration of a carrier from zero speed to a maximum. The use of the DC motor/generator minimizes such problems. The operation of the planetary gear trains is such that the output ring gear can be accelerated from zero velocity to a maximum velocity through braking of the sun gear from a maximum velocity to a zero velocity. If the output torque is constant, the braking power loss (proportional to the product of torque and angular velocity) is at a maximum at the start and decreases linearly to zero when the output ring gear is rotating at its maximum angular velocity. The braking power loss could thus be very large if acceleration of the carrier is obtained solely through use of the gear trains. However, when the DC motor/generator is operated to supply a large portion of the torque required to accelerate to the maximum velocity, the power loss from braking of sun gears can be reduced to a reasonable value. The operation of the planetary gear trains is also such that power losses from braking of sun gears are not a significant problem when control of braking occurs at near maximum carrier speed, as will normally be the case. When a carrier is powered by an induction motor, its speed will decrease from a maximum value in proportion to load but in normal circumstances only as a relatively small fraction of the maximum speed. For example, a carrier that carries no load may move at say 86 MPH while a carrier that carries an SUV having a high CD (aerodynamic drag coefficient) may move at say 83 MPH. If a series of carriers are moving along a guideway, some carrying SUVs and others that are unloaded or that have smaller CD's, the sun gears of those carrying SUVs will be braked to a full extent to a zero velocity, with no loss from braking of the sun gears. At the same time, it will be necessary reduce braking of sun gears to allow such other carriers to slow down to 83 MPH, but the associated losses from braking of sun gears will be quite small in relative terms.

Another feature of the invention relates to a design of a platform onto which a car may be driven to be carried by a carrier to a desired destination. I consider the carrying of cars to be extremely important for four primary reasons. The first is safety. Drivers and other occupants of cars are much safer when in a car being carried on a dedicated guideway rather than operating on streets or highways. The second reason relates of avoidance of congestion. In many regions, guideways can be elevated and build along rights-of-way that are available or otherwise much less expensive than would be required to add new lanes of comparable carrying capacity. The third reason relates to minimizing the pollution and avoiding the burning of gasoline or diesel fuels which would otherwise occur with a car moving on streets or highways. The fourth reason relates to the eventual construction of a network that can carry passengers in cabins or cargo in containers or on pallets as well as cars on platforms. As soon as built, guideways that can carry cars on platforms can be immediately profitable, can lead to expansions and interconnections into networks to which passenger and cargo-carrying capabilities can be readily added.

An illustrated platform is designed for fast and reliable loading of cars thereon and to be low in cost. The platform includes a pair of stop elements that are at the forward end of a platform and that have upright positions in which they are engage-able by front bumper portions of a car. A pair of wheel chocks are then lifted out of pockets in the platform and moved ahead to engage behind the front wheels of a car. The car and platform are then moved to a destination unloading station at which the chocks are moved back into the pockets and at which the stop elements are swung forwardly and down, allowing the car to be driven onto the receiving end of an exit driveway. Then the stop elements are swung up and back the then down into receiving slots in the platform which then has a low profile and can be moved either directly to a loading position in a loading station or to a queue of a loading station to await movement to loading position.

Further features of the invention relate to a wheel that is for use as a driven wheel in moving a carrier and that includes magnetic means for obtaining increased traction. The use of a steel wheel moving on a steel rail has important advantages as to efficiency and as to maintenance and costs but has limitations with respect to traction. Traction can be increased though the use of wheels engaged with undersides of auxiliary rails, as I have described herein. The use of magnetic means to increase traction is an attractive possibility, either for use alone or as a means to enhance the increased traction obtained through the use of the upper guide rails.

In a limited prior art search I have found no disclosure of a use of magnetic means for increasing traction which would be appropriate for use in driving a carrier of a system as disclosed herein. A Wojnarowski et al. U.S. Pat. No. 6,262,573 discloses an electromagnetic system useable for traction enhancement as well as for railroad track crack detection. However, that system requires two pairs of wheels and coils wound on axles of the two pairs of wheels.

In accordance with the invention the periphery of a wheel includes first and second annular portions of magnetic material that are axially spaced to engage separated portions of a supporting rail. A coil is located between such portions and a third annular portion of magnetic material is on the inside of the coil and completes a magnetic flux path through the first and second annular and through separated portions of the rail engaged by the first and second annular portions. Rings of copper or other conductive material are connected to the coil and supported on the wheel through insulators for engagement by brushes used to supply a controllable current to the coil and to increase traction when desired.

It might seem that the traction force obtainable magnetically between a steel wheel and a steel rail would be limited by an extremely small area of contact between the cylindrical surface of a wheel and the planar surface of a rail. This is less of a problem when consideration is given to deformation of a wheel and rail from a weight being carried. I found a formula applicable to the case of a cylindrical wheel on a flat surface, as follows:

$a=1.076*((P*R*(E1+E2)/(E1*E2))^0.5)$ where a=the half width of a rectangular area of contact, P=load in pounds/axial inch on the wheel, R=radius of the wheel in inches and E1 and E2 are the moduli of elasticity of the wheel and rail in pounds/square inch. When this formula is applied to the case of a 4 inch wide and 26 inch diameter steel wheel riding on a steel rail and carrying a load of 8000 pounds, the result is a contact area of a little over one-third of a square inch. This is quite substantial when considering that a concentrated flux through the contact area may possibly lead to localized saturation effects but nevertheless lead to large fluxes and a large potential energy in considerable portions of the magnetic material of a wheel When the wheel carries a load, there is a synergistic effect on traction. The weight being carried results by itself in a certain traction force and it increases the contact area. The increase in the contact area increases the magnetic force and thereby further increases the traction force. The synergistic effect also occurs when the traction force is increased by increasing the upward force against the upper rails, thereby further increasing the contact area and the magnetic force, thereby further increasing the traction force.

The foregoing and other objects, features and advantages of the invention will become more fully apparent from the following detailed description taken in conjunction with the accompanying drawings.

BRIEF DESCRIPTION OF THE DRAWING FIGURES

FIG. 15 is a side elevational view of a wheel of the invention that uses magnetic forces to increase traction;

FIG. 16 is a sectional view taken along line 16-16 of FIG. 15;

FIG. 17 is an enlargement of a portion of FIG. 16;

DESCRIPTION OF PREFERRED EMBODIMENTS

Figure 1:
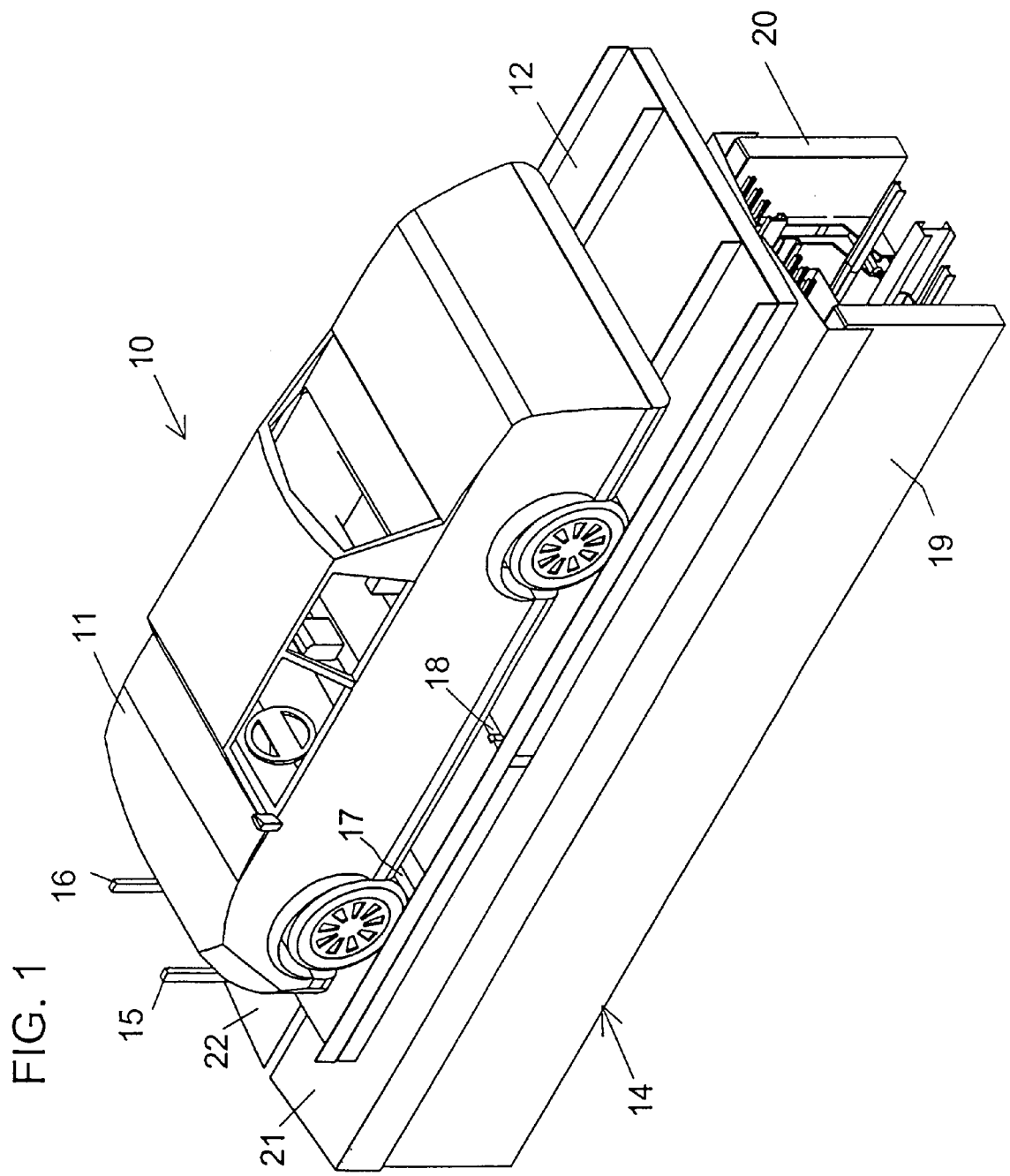
FIG. 1 is an isometric view showing a car being carried on a platform of the invention above a guideway of the invention.

Reference numeral 10 generally designates one form of transportation system constructed in accordance with the invention, portions of which are shown in FIG. 1. The system 10 is particularly designed for expansion and to eventually form a wide-scale network for automated carrying of various types of loads by carriers moving in guideways. The carrying of a car 11 is shown. The system 10 can also be used to carry passengers, freight and other loads.

The car 11 is shown being carried on a pallet or platform 12 above a short section of a guideway 14. Guideway 14 may be of any desired length and may extend forwardly to a divergent Y-junction at which carriers may be steered to either of two guideways. The guideway 14 may also extend rearwardly to the end of a convergent Y-junction that receives carriers entering from either of two guideways.

The platform 12 is similar to, but different from, that disclosed in my U.S. Pat. No. 6,237,500 issued May 29, 2001. Platform 12 includes pair of forward stop elements 15 and 16 which are engaged with front bumper portions of the car 11. Platform 12 also includes and a pair of wheel chocks 17. After a car is driven onto the platform, the chocks 17 are lifted out of pockets 18 and moved forwardly into firm engagement behind the front wheels of the car 11. Only one of the chocks 17 and only one of the pockets 18 are visible in FIG. 1.

The system 10 automatically moves the platform 12 with car 11 to a destination unloading station. At the unloading station, the chocks 17 are moved rearwardly and lowered into the pockets 18. Also, the forward stop elements 15 and 16 are swung forwardly and down about a lower pivot axis. The car 11 can thereby be driven forwardly onto the receiving end of an exit driveway. Then the forward stop elements 15 and 16 are swung back and down into recesses in the platform 12. The platform 12 will then have a low profile and can be moved to a loading station, usually the next loading station that has room in a queue preceding one of more loading positions.

When the platform is moved from a queue to a loading position, the stop elements 15 and 16 are swung up to vertical positions as shown for engagement by front bumper portions of car that is driven onto the platform 12. Then the chocks 17 are lifted out of the pockets 18 and moved ahead to engage behind the front wheels of a car on the platform. The platform 12 is more completely disclosed in FIGS. 12 and 13 and a description thereof which follows. As an alternative, the platform of my aforementioned U.S. Pat. No. 6,237,500 may be used.

The guideway 14 includes spaced parallel beams 19 and 20 from which rails are supported to support and guide a carrier. A pair of top panels 21 and 22 extend inwardly to edges which define a narrow opening or slot through which load-support members of carriers can extend.

Figure 2:
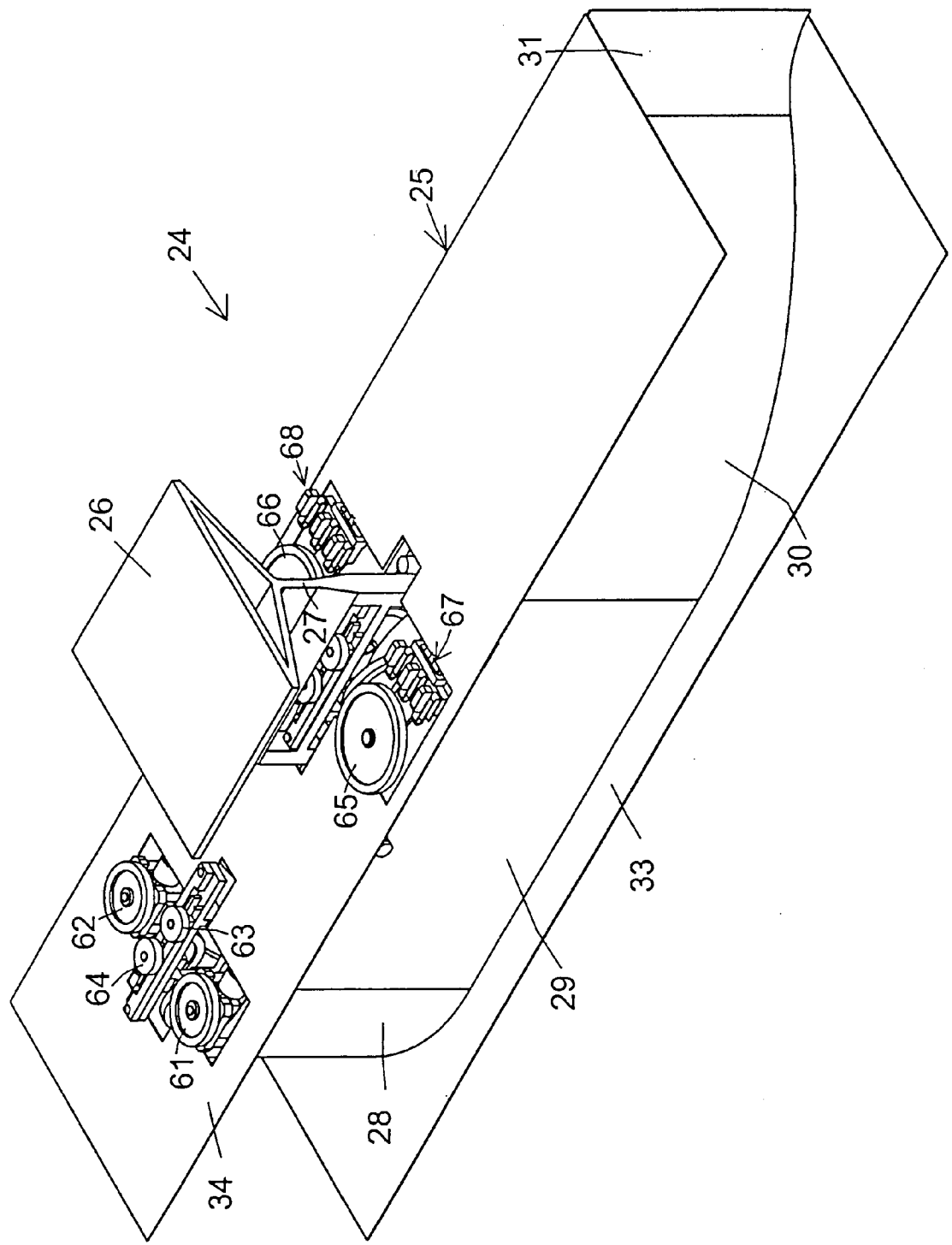
FIG. 2 is an isometric view showing a carrier of the invention.

FIG. 2 shows a carrier vehicle or carrier generally designated by reference numeral 24. Carrier 24 includes an outer shell 25 of aerodynamic shape designed to minimize losses from turbulence as the carrier moves within the guideway 14. A frame of carrier 24 includes portions extending upwardly through an upper wall of the shell 25 and to a pad 26 for support of a load such as the platform 12. A narrow portion 27 of the frame extends through the slot formed between the top portions 21 and 22 of the guideway 14 shown in FIG. 1.

As shown, the shell 25 of the carrier 24 has a shape that is asymmetric, mainly because of an asymmetric drive configuration of the carrier 24. The guideway is not shown in FIG. 2 but has opposite inside wall surfaces that may preferably be symmetrically located with respect to a central vertical plane through the slot formed between the top walls 21 and 22. One side of the shell 25, not visible in FIG. 2, is in a vertical plane and is designed to move close to one inside wall surface of the guideway. The other side of the shell 25 includes a forward wall portion 28, an intermediate wall portion 29 and a rearward wall portion 30. The forward wall portion 28 has a quarter-rounded shape. The intermediate wall portion 29 is in a vertical plane and is designed to be at a substantial distance from and in parallel relation to an opposite inside wall surface of the guideway. The rearward wall portion 30 is tapered back to a rearward end 31 of relatively small extent. Turbulence that could occur along the lower and upper edges of portions 28 and 30 is reduced by bottom and top walls 33 and 34 that include portions projecting forwardly, laterally and rearwardly from the lower and upper edges of the wall portions 28, 29 and 30. As the carrier 24 moves through the guideway, air must be continuously moved from ahead of the carrier to behind the carrier. With the configuration shown, such air movement is separated by walls 33 and 34 into three portions. Two portions are between the walls 33 and 34 lower and upper surfaces of the guideway. A third portion is between walls 33 and 34, the wall portions 28, 29 and 30 and the aforementioned opposite side surface of the guideway. The third portion is the major portion, is of a form determined by the contour of wall portions 28-30, and tends to be of "layered" non-turbulent form to minimize the force required to move the carrier, especially at higher speeds.

As shown, the top wall 34 has openings for upper portions of the carrier frame and for guide wheel assemblies that coact with upper rails of the guideway as hereinafter described. Similar openings are provided in the bottom wall 33 for wheels that coact with a main rail and with side rails provided in Y-junctions, as hereinafter described.

Figure 3:
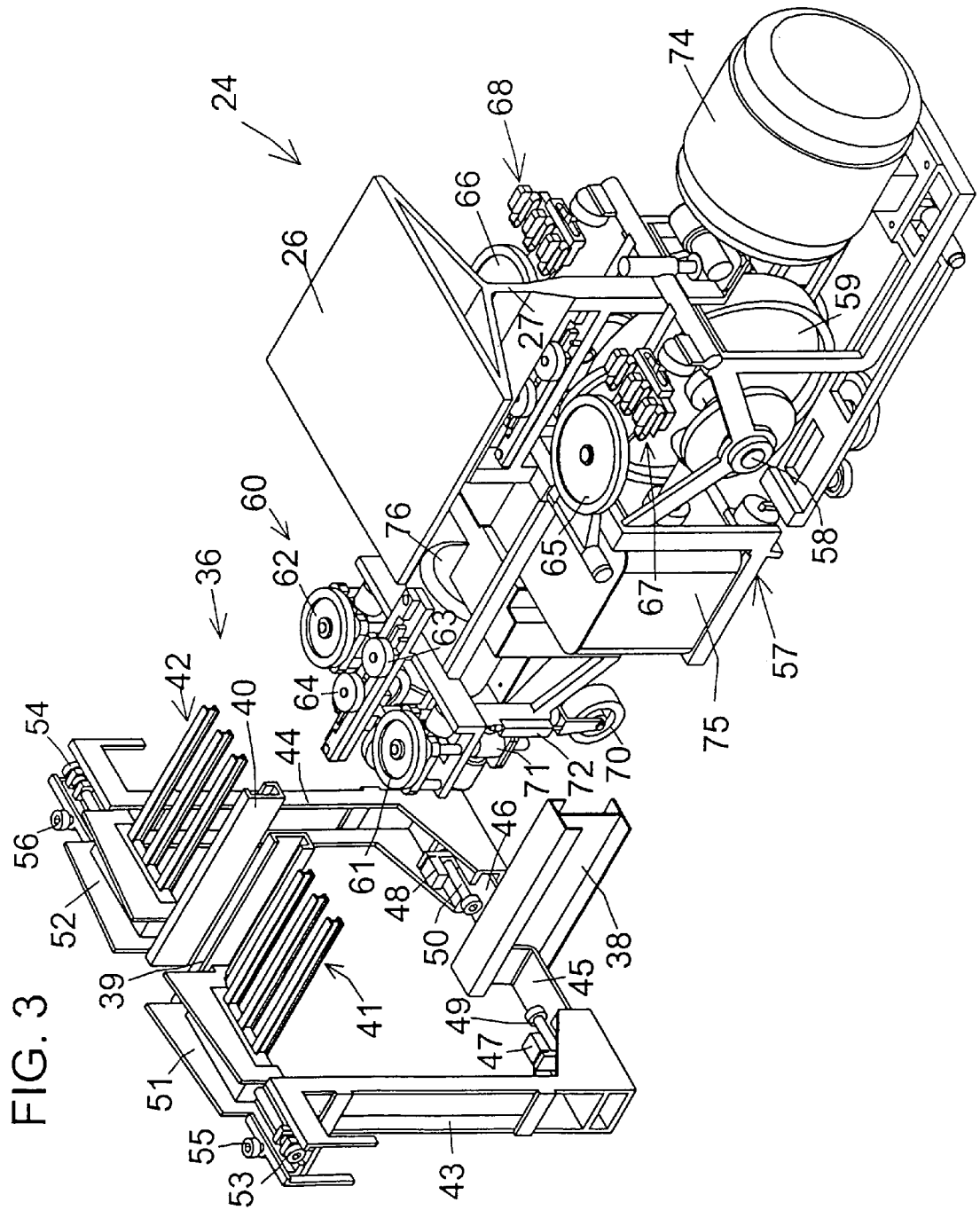
FIG. 3 is an isometric view showing the carrier of FIG. 2 but with an outer aerodynamic shell removed, also showing the relation of the carrier to guideway rails and an assembly used to support such rails.

FIG. 3 shows the carrier vehicle 24 with the shell 25 removed. To show the relation between rails of the guideway 14 and the carrier 24, FIG. 3 shows portions of the guideway 14 including short sections of rails and a rail support 36 that is one of a series of rail supports provided in spaced relation along the guideway 14. The rail supports 36 are adjustable to obtain a very smooth path of movement of the carrier 24. The rails include a lower main rail 38, a pair of auxiliary rails 39 and 40 that function as guide rails and that are in positions located upwardly above the main rail 38 and a pair of lower side rails, not shown in FIG. 3, which are provided along-side the main rail 38 in Y-junctions. In addition, a pair of current-supply rail assembles 41 and 42 are supported alongside the guide rails 39 and 40. Each current-supply assembly includes three rails for supply of three-phase AC power. The rail support 36 includes a pair of vertically extending hangers 43 and 44 having upper ends that are shaped to be hooked onto the beams 19 and 20. The main rail 38 is supported from the lower ends of the hangers 43 and 44 through leaf-springs 45 and 46 and through supports 47 and 48. Supports 47 and 48 are adjustable through screws 49 and 50 to permit accurate horizontal positioning of the main rail 38.

The guide rails 39 and 40 and the current-supply rail assemblies 41 and 42 are supported from the upper ends of the hangers 43 and 44 through supports 51 and 52 which also support the top guideway walls 21 and 22. Supports 51 and 52 are adjustable through screws 53 and 54 to permit accurate horizontal positioning of the guide rails 39 and 40 and current-supply assemblies 41 and 42. An additional pair of adjustment screws 55 and 56 permit vertical adjustments of the positions of the hangers 43 and 44 and thereby of the vertical positions of the main rail 38, the rails 39 and 40 and current-supply rail assemblies 41 and 42.

The frame of the carrier 24 is generally designated by reference numeral 57 and carries bearings for a shaft 58 of a main support and drive wheel 59 that rides on the main rail 38. A guide, steer and balance control assembly 60 is provided at the forward end of the carrier 24. Guiding and steering functions of the assembly 60 are performed by a pair of auxiliary wheels 61 and 62 that engage outside wall portions of the rails 39 and 40 and a pair of smaller auxiliary wheels 63 and 64 that engage facing inside surfaces of the rails 39 and 40. Components are located above the main wheel 59 that cooperate with wheels 61-64 of the assembly 60 in guiding the vehicle and that also perform tilt and traction control functions. Such components include a pair of main tilt-control wheels 65 and 66 and associated smaller auxiliary wheels similar to wheels 63 and 64. The main tilt-control wheels 65 and 66 engage outside wall portions of the guide rails 39 and 40 while the smaller auxiliary wheels engage opposed facing inside surfaces of the guide rails 39 and 40. The wheels 65 and 66 and associated smaller wheels can thereby limit tilting of the vehicle about the area of engagement between the main wheel 59 and the main rail 38.

Carrier 24 also includes a pair of current collector assemblies 67 and 68 that are located behind and a short fixed distance above the wheels 65 and 66. Each of the assemblies 67 and 68 includes three brushes for engaging rails of the current supply rail assemblies 41 and 42.

In Y-junctions the guide rails 39 and 40 deviate from parallel paths. Only one guide rail can then be used to guide the carrier. To steer to the right, the right guide rail 40 is used. The wheels 61 and 65 are lowered. The carrier 24 is then guided through engagement of the wheels 62 and 66 with an outside surface of the guide rail 40 and through engagement of the smaller wheel 64, and of a similar smaller wheel associated with wheel 66, with an inside surface of the guide rail 40. To use the left guide rail 39, the wheels 62 and 66 are lowered. The carrier 24 is then guided through engagement of the wheels 61 and 65 with an outside surface of the guide rail 39 and through engagement of the smaller wheel 63, and of a similar smaller wheel associated with wheel 65, with an inside surface of the guide rail 39.

The supports for wheels 65 and 66 also support the current collector assemblies 67 and 68 so that assembly 67 is lowered to allow it to move with wheel 65 below guide rail 39 when wheel 65 is lowered and so that assembly 68 is lowered to allow it to move with wheel 66 below guide rail 40 when wheel 66 is lowered.

Other drawing figures show in more detail the constructions as thus far described as well as additional features of the carrier 24 as described hereinafter. One additional feature is the inclusion of wheels that are part of the guide, steer and balance control assembly 60 and that control balance of the carrier 24 about the axis of the main wheel 59. Such wheels include a wheel 70 that engages the main rail 38 and wheels that engage the undersides of the guide rails 39 and 40. A jack 71 is provided to control the relative downward and upward forces applied by such wheels. The jack 71 is controlled through signals from a sensor 72 which may be a linear potentiometer and which develops an electrical signal proportional to the vertical position of the wheel 70 relative to the forward end of the carrier. Any unbalance of the vehicle 24 and the load it carries about the axis of the main wheel 59 may be corrected.

Another additional feature is the inclusion of wheels located above the axis of the main wheel 59 and which engage the undersides of the guide rails 39 an 40 with controllable forces for control of traction between the main wheel 60 and main rail 38. Another additional feature is the provision of wheels for engagement with side surfaces of the main rail 38 and for engagement with additional rails provided in Y-junctions, to insure movement in the proper path relative to the main rail 38 at all times.

Further features relate to the drive of the main wheel 60 from a main drive motor 74 though a four speed transmission that is in a housing 75. The transmission is controlled by a control motor 76 that is usable in control of drive and the transmission and that can be supplied with power from batteries to be usable alone for drive of the carrier 24 to an unloading position in the event of a power failure.

Figure 4:
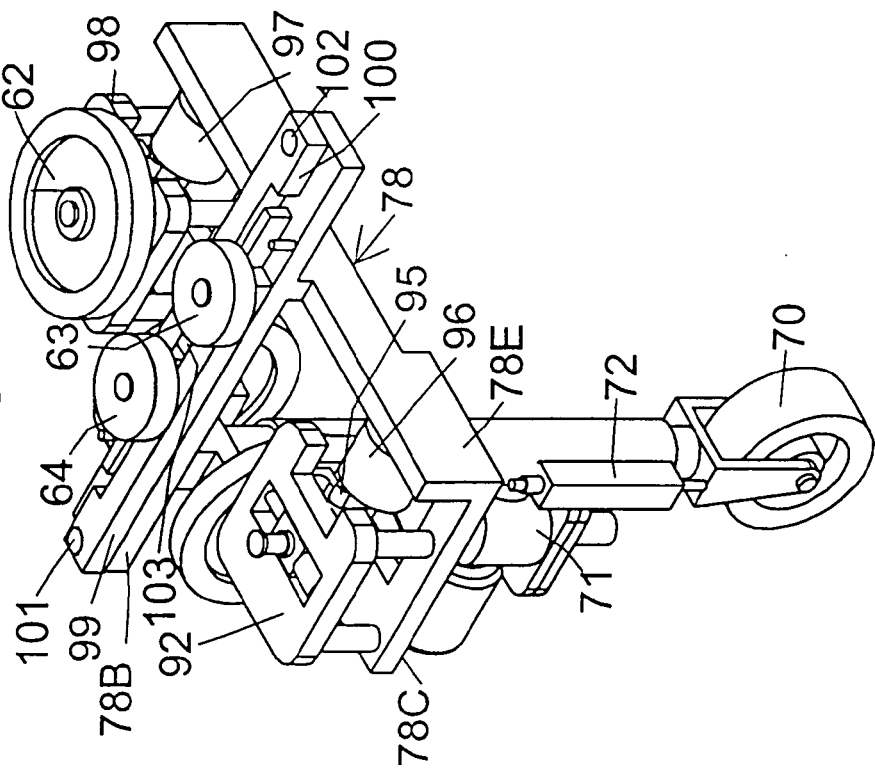
FIG. 4 is an isometric view showing an assembly and components of the carrier used for guide, steer and balance control.
Figure 5:
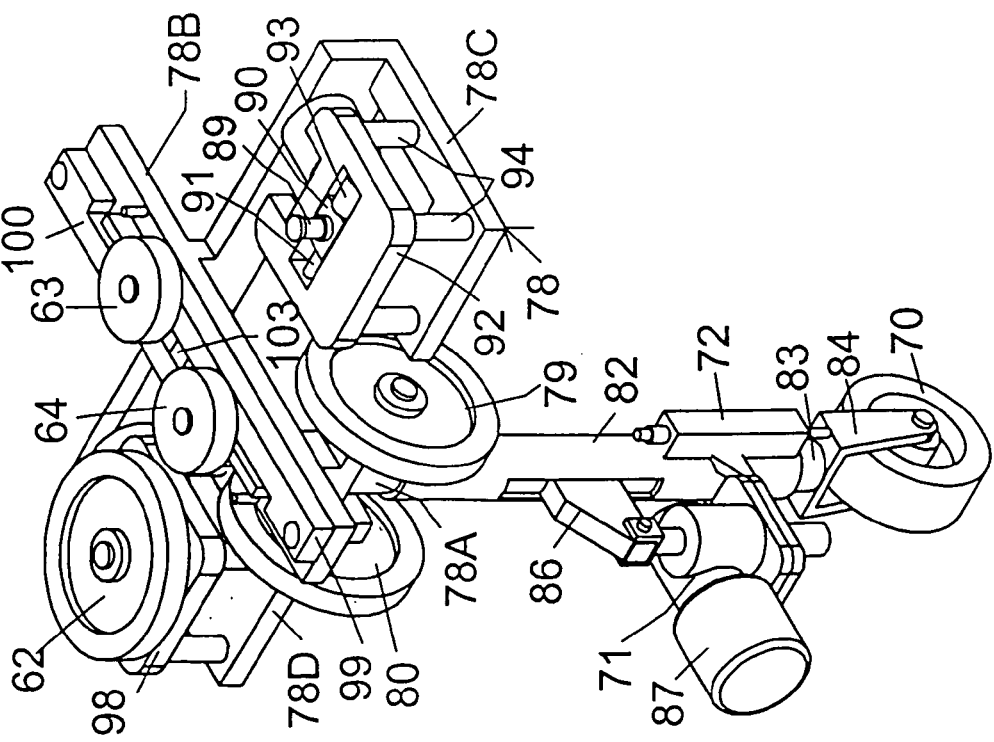
FIG. 5 is an isometric view of the assembly and components shown in FIG. 4 but from a different direction.

FIGS. 4 and 5 are isometric views illustrating the guide, steer and tilt control assembly 60 located at the forward end of the carrier 24. Such views are taken from positions ahead of and behind the assembly 60. The assembly 60 includes the wheels 61-64 and 70, the jack 71 and sensor 72 which have been described in connection with FIG. 3. The assembly 60 further includes a structure 78 that includes portions that support wheels 61-64 and portions that journal a pair of wheels 79 and 80 for rotation about a horizontal axis. Wheels 79 and 89 engage downwardly facing surfaces of the upper guide rails 39 and 40.

The vertical position of structure 78 relative to the forward end of the main frame 59 is so controlled as to maintain proper balance about the axis of the main wheel 59 and is also so controlled as to keep wheels 79 and 80 in engagement with the downwardly facing surfaces of the upper guide rails 39 and 40 and thereby obtain proper vertical positions of wheels 61-64 relative to the guide rails 39 and 40. Structure 78 is also pivotal about a vertical axis relative to the frame 59 to allow wheels 61-64 to properly coact with the guide rails 39 and 40 when moving in turns. For these purposes, a hollow vertical cylinder 82 is secured to the forward end of the frame 57. The upper end of the cylinder 82 receives a downwardly extending cylindrical portion 78A of the structure 78. The lower end of the cylinder 82 receives a first cylindrical element 83 which extends upwardly from a bracket 84 that journals the wheel 70. A second cylindrical element is located at an intermediate level in the cylinder 82 and is connected to an arm 86 which extends out through a vertical slot in the wall of the hollow cylinder 82. The screw jack 71 is supported on the hollow cylinder 82 and is connected to the arm 86, and thereby to the second element to which arm 86 is connected, to move the second element in a vertical direction. Jack 71 is operated by an electric motor 87. Two compression springs are not visible in the drawings but are located in the cylinder 82. An upper spring is disposed between the lower end of the cylindrical portion 78A of the structure 78 and the upper end of the second element to which arm 86 is connected. A lower spring is disposed between the upper end of the element 83 and the lower end of the second element to which arm 86 is connected. The maximum distance between the main rail 38 and the upper rails 39 and 40 is such relative to the free lengths of the two springs and to other dimensions that both springs are always compressed thereby always maintaining contact between at least one of the wheels 79 and 80 and the rails 39 and 40. When jack 71 is operated to move arm 86 upwardly or downwardly, the relative compressions of the upper and lower springs are changed, thereby either moving the forward end of the frame downwardly or upwardly or negating any upward or downward force that may be then applied as a result of an imbalance of the carrier 24 and its load about the axis of the main wheel 59. Jack 71 can thereby be controlled in response to a signal from the sensor 72 to maintain proper balance about the axis of the main wheel 59.

FIGS. 4 and 5 also show details of the supports of the wheels 61-64. The structure 78 includes a portion 78B which supports the wheels 63 and 64 and portions 78C and 78D which support the wheels 61 and 62. Structure 78 also includes a portion 78E for support of motors that control vertical movements of the wheels 61 and 62.

With regard to wheels 61 and 62, wheel 61 is not shown in FIGS. 4 and 5 in order to show means acting to resiliently urge the wheel 61 toward the upper guide rail 39, similar means being provided for the wheel 62. In particular, a shaft 89 that journals the wheel 61 for rotation is carried by a block 90 that is movable on a guide rod 91 in a rectangular slot in a support 92. A resilient member 93, preferably a coiled compression spring, is located on the rod 91 within the slot and acts the urge the block 90 toward the guide rail 39. The support 92 includes four depending rods 94 which extend down through openings in the portion 78C of structure 78 to guide the support 92 for vertical movement between an upper position as shown in which the wheel 61 will engage the guide rail 39 and a lower position in which the wheel 61 can move under the guide rail 39 during a steer to the right.

To move the support 92 vertically, it is formed with a slot which receives a pin that projects from the upper end of an arm 95 rotated about a horizontal axis by a stepper motor 96. Motor 96 is supported from portion 78E of structure 78. Rotation of arm 95 through 180 degrees will move the support 92 from the upper position to the lower position or from the lower position to the upper position. Similar means are provided for urging the wheel 62 toward the guide rail 40 and for controlling the vertical position of the wheel 62. Such means include a support 98 that is like support 92 and that is supported from the portion 78D of structure 78, also including a stepper motor 97 supported from the portion 78E of the structure 78.

The portion 78B of structure 78 supports the smaller wheels 63 and 64. In particular, a pair of arms 99 and 100 are pivotal on pins 101 and 102 at the opposite ends of the portion 78B of structure 78. The arms 99 and 100 carry shafts which journal the wheels 63 and 64. A resilient member 103 acts between the arms 99 and 100 to urge the wheels 63 and 64 outwardly and into engagement with facing surfaces of the guide rails 39 and 40.

Figure 6:
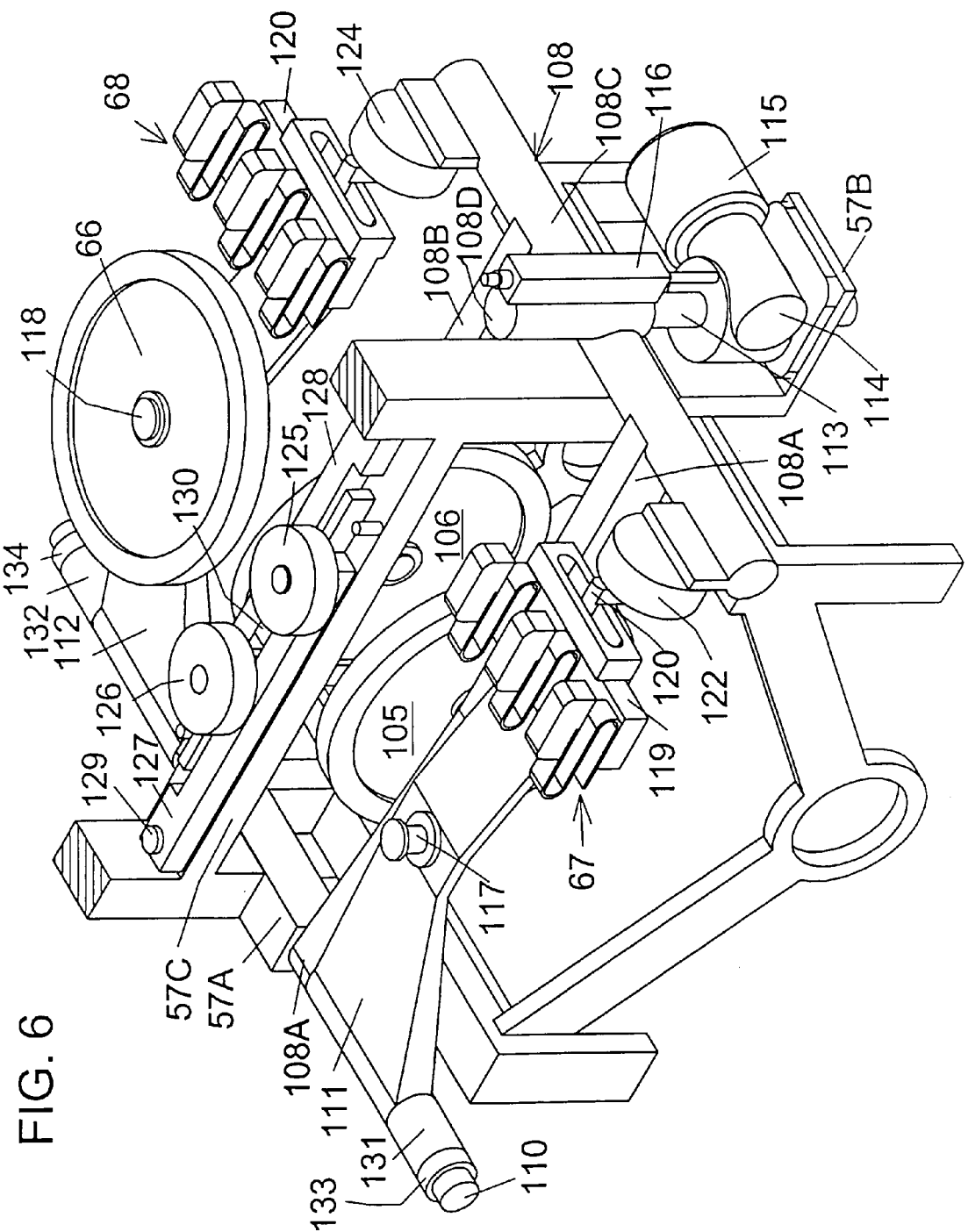
FIG. 6 is an isometric view of an assembly and components of the carrier used for tilt and traction control.

FIG. 6 is an isometric view showing portions of the main frame 57 and components that are located above the axis of wheel 59 that cooperate with wheels 61-64 of the assembly 60 in guiding the vehicle 24. These components also perform tilt and traction control functions. They include the aforementioned pair of wheels 65 and 66 but the wheel 65 is not shown in order to provide a better showing of a support for the wheel 65 and also a better showing of a pair of wheels 105 and 106 that rotate on a horizontal axis and that engage downwardly facing surfaces of the upper guide rails 39 and 40. A traction control structure 108 is provided that includes a pair of spaced parallel arm portions 108A and 108B that journal the wheels 105 and 106 and that extend forwardly from a transversely extending rearward portion 108C. A shaft 110 provides pivotal support for forward ends of the arm portions 108A and 108B and also for arms 111 and 112 that support the wheels 65 and 66. A central portion of he shaft 110 is secured to a portion 57A of the main frame 57.

To increase traction, an increased upward force is applied to the rearward portion 108C of the traction control structure 108 thereby increasing the forces applied between wheels 105 and 106 and the upper rails 39 and 40, thereby also increasing the traction force between the main wheel 59 and the main rail 38. For this purpose, the traction structure 108 includes a cylindrical portion 108D which is hollow except for a closed top wall. A compression spring within the portion 108D has a lower end engaged by the end of a screw 113 of a jack 114 operated by an electric motor 115. Jack 114 is supported on a portion 57B of the main frame 57. A sensor 116, preferably a linear potentiometer, develops an electrical signal proportional to movement of the screw 113 and thereby the degree of compression of the spring in the portion 108D and the force applied to the upper rails 39 and 40.

The wheel 65, not shown in FIG. 6, and the wheel 66 are journaled on shafts 117 and 118 that are supported on the arms 111 and 112. The current collector assemblies 67 and 68 are supported through insulating members 119 and 120 on end portions of the arms 111 and 112. To steer to the right, the end of arm 111 is lowered to position both the wheel 65 and the current collector assembly 67 below the guide rails 39 and 40. For this purpose, the insulating member 119 has a portion formed with a horizontal slot that receives a pin 120 on the free end of an arm that is rotatable by a stepper motor 122 about an axis of the motor 122 that is directly below the pin 120 in the illustrated condition. A 180 degree rotation of the pin 120 about the axis of motor 122 will effect a downward movement of the pin 120 and thereby of the end of arm 111 through a distance equal to twice the radial distance from the pin 120 to the motor axis. This will place the wheel 65 and current collector assembly safely below the rails 39 and 40. A subsequent 180 degree rotation of the pin 120 about the axis of motor 122 will return the components to the illustrated condition.

To steer to the left, a stepper motor 124 is used in a similar way for lowering the end of arm 112 to position both the wheel 66 and the current collector assembly 68 below the guide rails 39 and 40. Stepper motors 122 and 124 are not supported directly from the frame 57 of the carrier but instead on opposite ends of the transversely extending rearward portion 108C of the traction control structure 108. The result is that when traction is increased, the portions of upper rails 39 and 40 engaged by wheels 105 and 106 will defect upwardly to some extent but a proper relationship will be maintained in a vertical direction between wheels 65 and 66 and the engaged side portions of rails 39 and 40.

A pair of smaller wheels 125 and 126 are associated with the wheels 65 and 66 and function when either of the wheels 65 or 66 is lowered. During a steer to the right, when wheel 65 is lowered and can no longer limit movement to the right, wheel 126 can function to limit movement to the right through engagement with the right-hand guide rail 40. During a steer to the left, wheel 125 can function in a similar way to limit movement to the left through engagement with the left-hand guide rail 39. It is noted that in many situations centrifugal forces acting during steering may make such functions of wheels 125 and 126 unnecessary. For example, centrifugal forces acting during a steer to right will usually oppose movement to the right so that the wheel 126 might seem to be unnecessary. However, there are many foreseeable conditions in which the functions performed by wheels 125 and 126 will be necessary.

As shown in FIG. 6, a pair of arms 127 and 128 carry shafts that journal the wheels 125 and 126 and that are pivotal on pins at the opposite ends of a portion 57C of the main frame 57. Only a pin 129 for the arm 127 is visible in FIG. 6. It is noted that since the wheels 125 and 126 are supported from the main frame 127 of the carrier, their vertical relationship to the guide rails 39 and 40 may change during changes in traction control. However, facing surfaces of the guide rails 39 and 40 that are engaged by the wheels 125 and 126 have vertical dimensions that are larger than the expected relative vertical movements of the wheels so as to obviate any problem.

A resilient support is provided for the wheels 125 and 126 to accommodate small variations in the relative positioning of the guide rails 39 and 40 during movement of the carrier 24. This support is provided through the support of wheels 125 and 126 on the pivotal arms 127 and 128 and through a resilient member 130 that acts between the arms 127 and 128 to urge the wheels 125 and 126 outwardly and into engagement with inwardly facing surfaces of the guide rails 39 and 40.

A resilient support is also provided for the wheels 65 and 66 through springs 131 and 132 which are provided on the shaft 110 between the arms 111 and 112 and collars 133 and 134 which are secured to end portions of the shaft 110. Springs 131 and 132, which may be coiled compression springs, act to urge the wheels 65 and 66 into engagement with outwardly facing surfaces of the guide rails 39 and 40.

Figure 7:
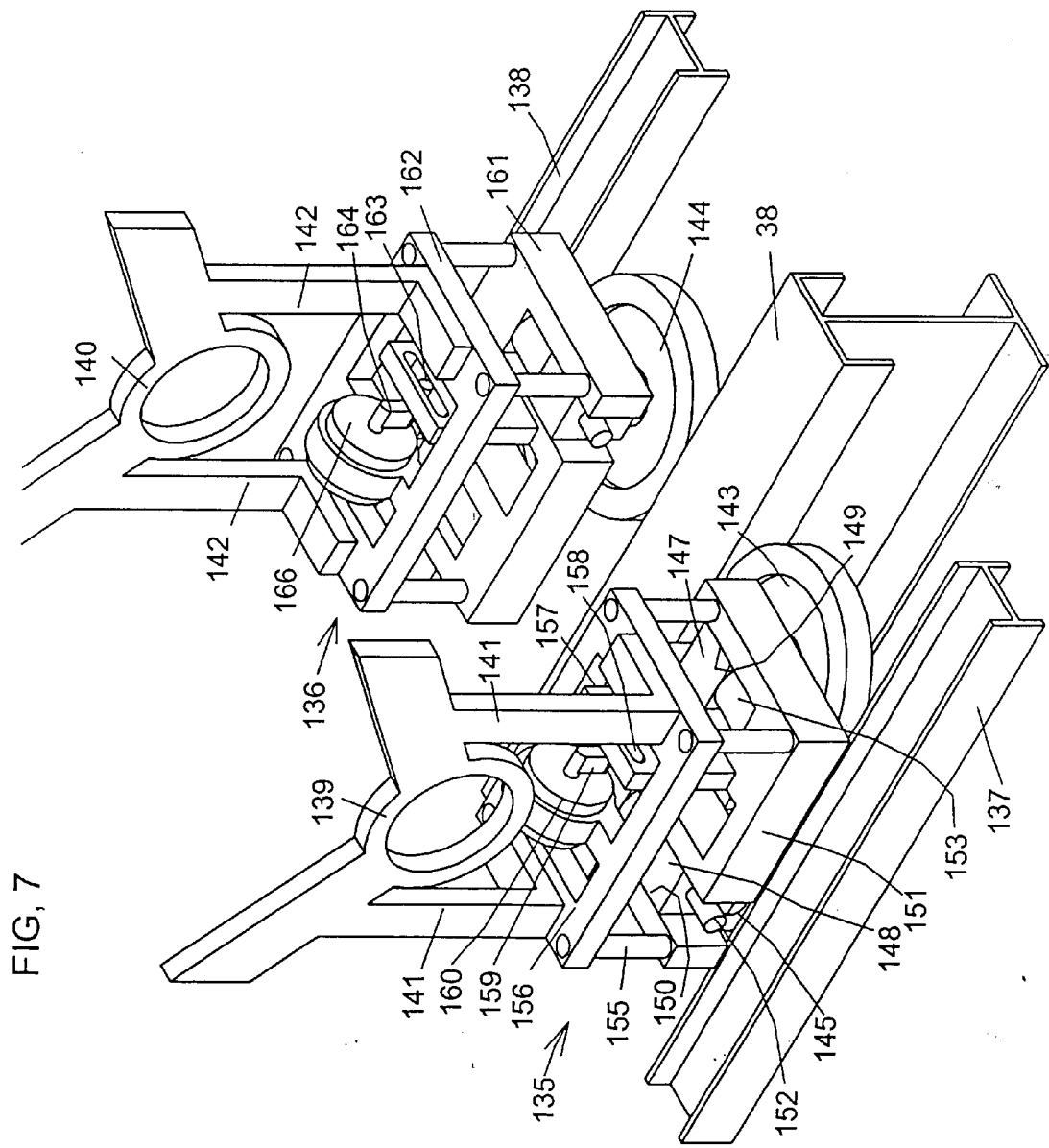
FIG. 7 is an isometric view of assemblies used to guide the carrier in relation to main and side rails.

FIG. 7 is an isometric view of left and right lower guidance assemblies 135 and 136 that function to insure proper engagement between the main wheel 59 and the main rail 38. Portions of the main frame 57, a portion of the main rail 38 and portions of two side rails 137 and 138. The side rails 137 and 138 are located alongside the main rail 38 in Y-junctions. The assemblies 135 and 136 are located alongside the main wheel 59 which is not shown. However, ring portions 139 and 140 of the main frame 57 are shown that are for support of bearings for the axle of the main wheel 59. FIG. 7 also shows a left pair of brackets 141 and a right pair of brackets 142 for support of the left and right assemblies 135 and 136. Each of such brackets is L-shaped and depends from the main frame 59.

Figure 8:
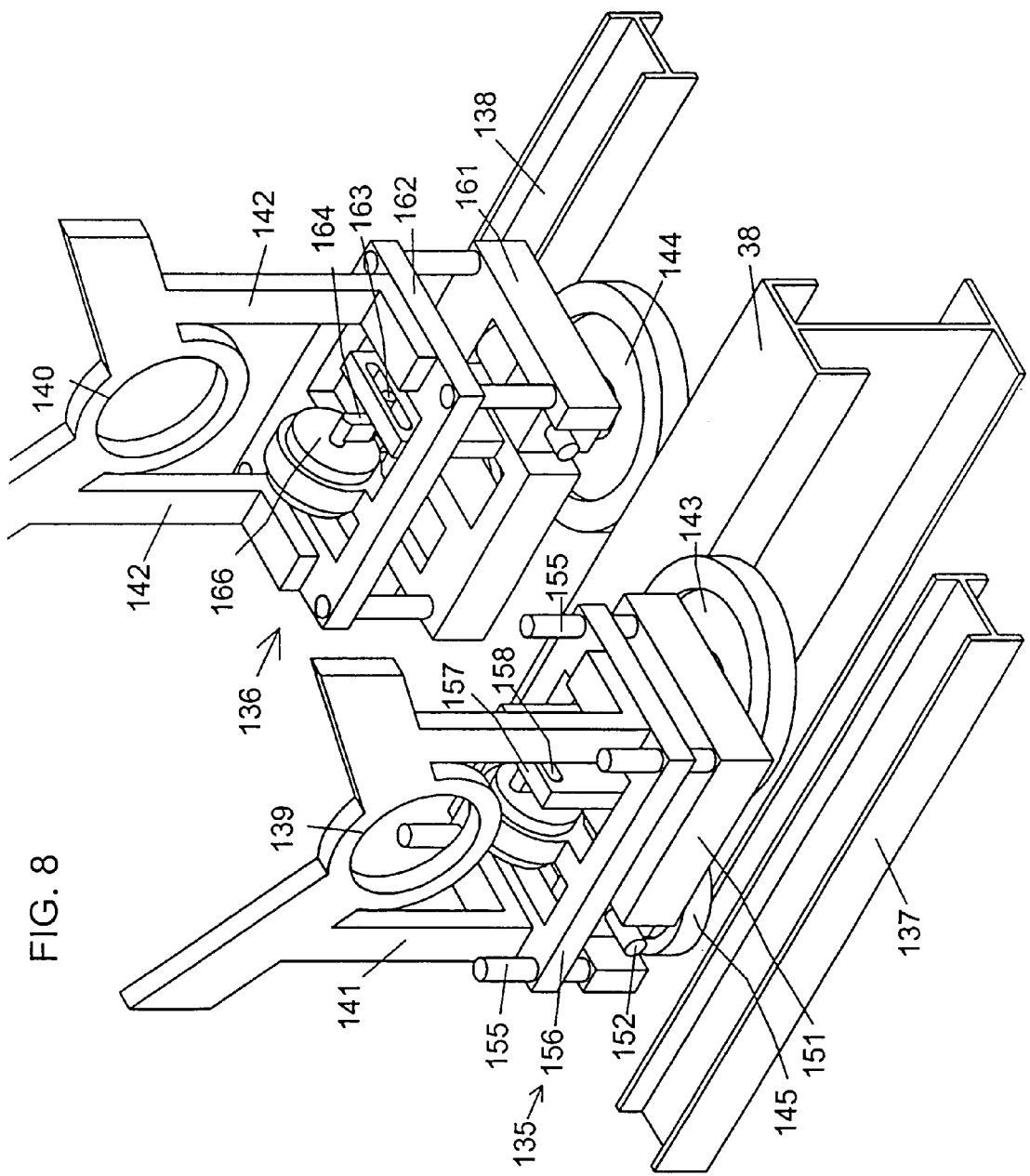
FIG. 8 is an isometric view like FIG. 7 but with certain wheels lifted for a steer to the right.
Figure 9:
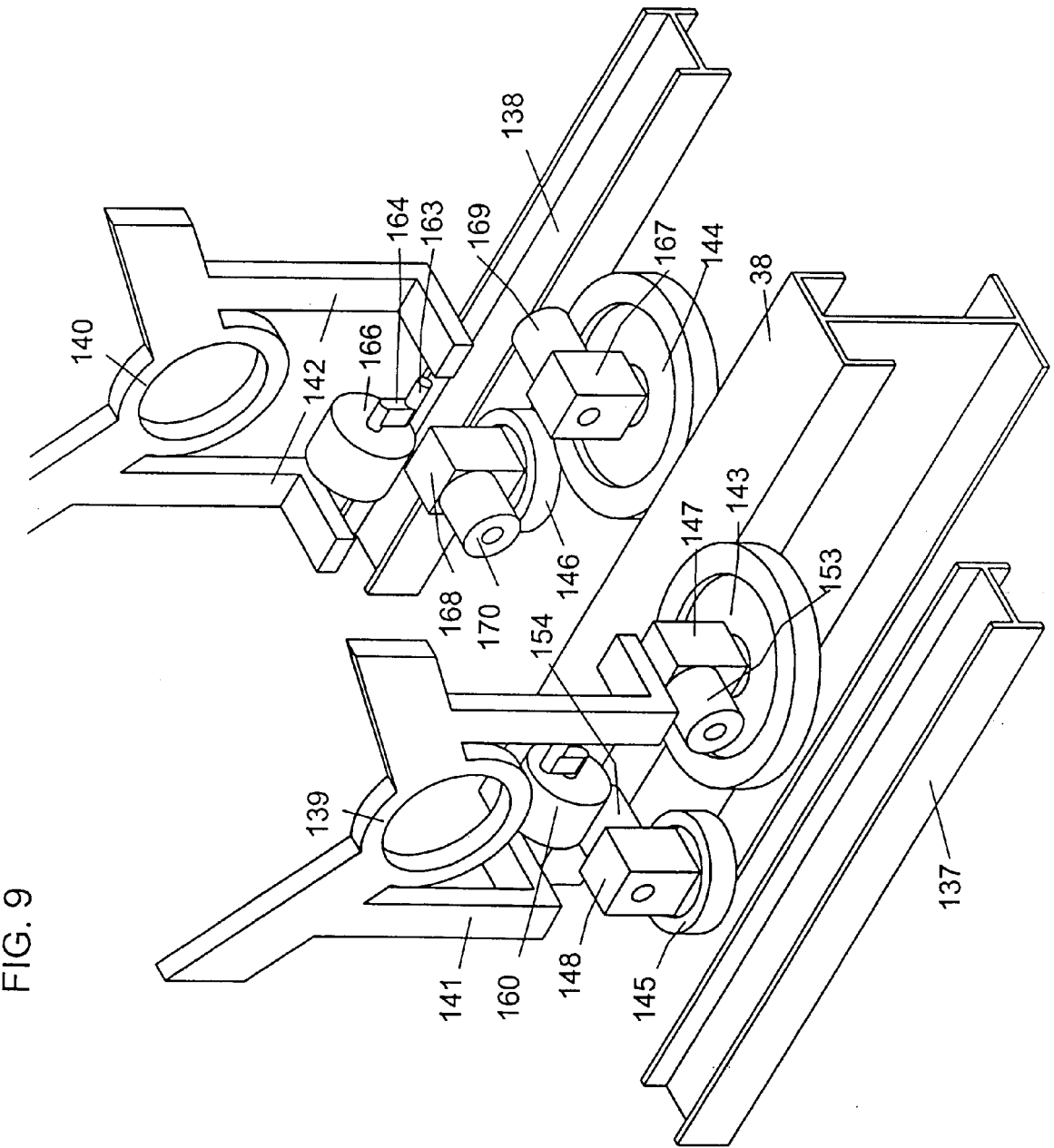
FIG. 9 is an isometric view like FIG. 8 but with certain components not visible in order to show the constructions of other components.

The assemblies 135 and 136 include two main wheels 143 and 144 for engagement with outwardly facing side surfaces of the main rail 38 and two auxiliary wheels for engagement with inwardly facing surfaces of the side rails 137 and 138 in Y-junctions. The auxiliary wheels are not visible in FIG. 7, except for a very small portions of one auxiliary wheel 145 of assembly 135. Both wheel 145 and a corresponding auxiliary wheel 146 of assembly 136 are shown in FIG. 9 which is a view like FIG. 8 but with certain components not visible. FIG. 8 is a view like FIG. 7 but with wheels 143 and 145 lifted during a steer to the right while in a Y-junction.

Other than in Y-junctions, the wheels 143 and 144 engage opposite surfaces of the main rail 38 to insure proper engagement between the main wheel 59 and the main rail 38. In Y-junctions, either two main rails converge into a single main rail or a single main rail diverges, widening to form portions that extend into two main rails. For a turn to the right in a divergent Y-junction, the main wheel 143 and the auxiliary wheel 145 of the assembly 135 are lifted to a level above that of the main and side rails as shown in FIGS. 8 and 9. The main wheel 144 and auxiliary wheel 146 of the assembly 136 then engage the main rail 38 and the side rail 138 to insure proper engagement of the main wheel 59 with the main rail 38 or a right-hand continuation thereof.

Blocks 147 and 148 are provided in assembly 135 that have downwardly extending shaft portions which journal the wheels 143 and 145. Blocks 147 and 148 are movable in slots 149 and 150 in a support 151 and on guide rods only one of which is visible in FIGS. 7 and 8, a guide rod 152 for the block 148. Springs 153 and 154 (see FIG. 9), preferably coiled compression springs, are disposed in the slots 149 and 150 of the support 151 and about the guide rods of the support 151 to act on the blocks 147 and 148 to urge the main wheel 143 and auxiliary wheel 145 into engagement with the main rail 38 and side rail 137.

The support 151 is guided for vertical movement to be lifted from an operative position as shown in FIG. 7 to a position as shown in FIG. 8 in which wheels 143 and 145 are above the level of the main rail 38 and side rails 137 and 138. Four guide rods 155 extend upwardly from corner portions of the support 151 and into four openings in corner portions of a second support 156. Support 156 is secured to the L-shaped bracket portions 141 of the main frame 57 of the carrier 24. To effect vertical movement of the support 151 it has an upstanding portion 157 formed with a horizontal slot 158. A pin extends into the slot 158 and is on the end of an arm 159 which is rotatable by a stepping motor 160. Stepping motor 160 is secured to the support 156. In the condition depicted in FIG. 7, the arm 159 extends down from the axis of motor 160. The pin and the support 151 are in lowermost positions. When the arm 159 is rotated through 180 degrees by motor 160, the support 151 is lifted by the pin of arm 159 to be in an uppermost position as shown in FIG. 8.

The assembly 136 includes supports 161 and 162 that correspond to supports 151 and 156 of the assembly 135. FIG. 9 shows how other components would appear if supports 151 and 156 of assembly 135 and supports 161 and 162 of assembly 136 were not visible in the condition depicted in FIG. 8. As shown, assembly 136 also includes a pin 163 on an arm 164 rotatable by a stepper motor 166, corresponding to the pin and arm 158 and stepper motor 160 of the assembly 135. Blocks 167 and 168 have depending shafts that journal the wheels 144 and 146 and are engaged by springs 169 and 170 that urge the wheels 144 and 146 into engagement with the main rail 38 and the side rail 138.

Figure 10:
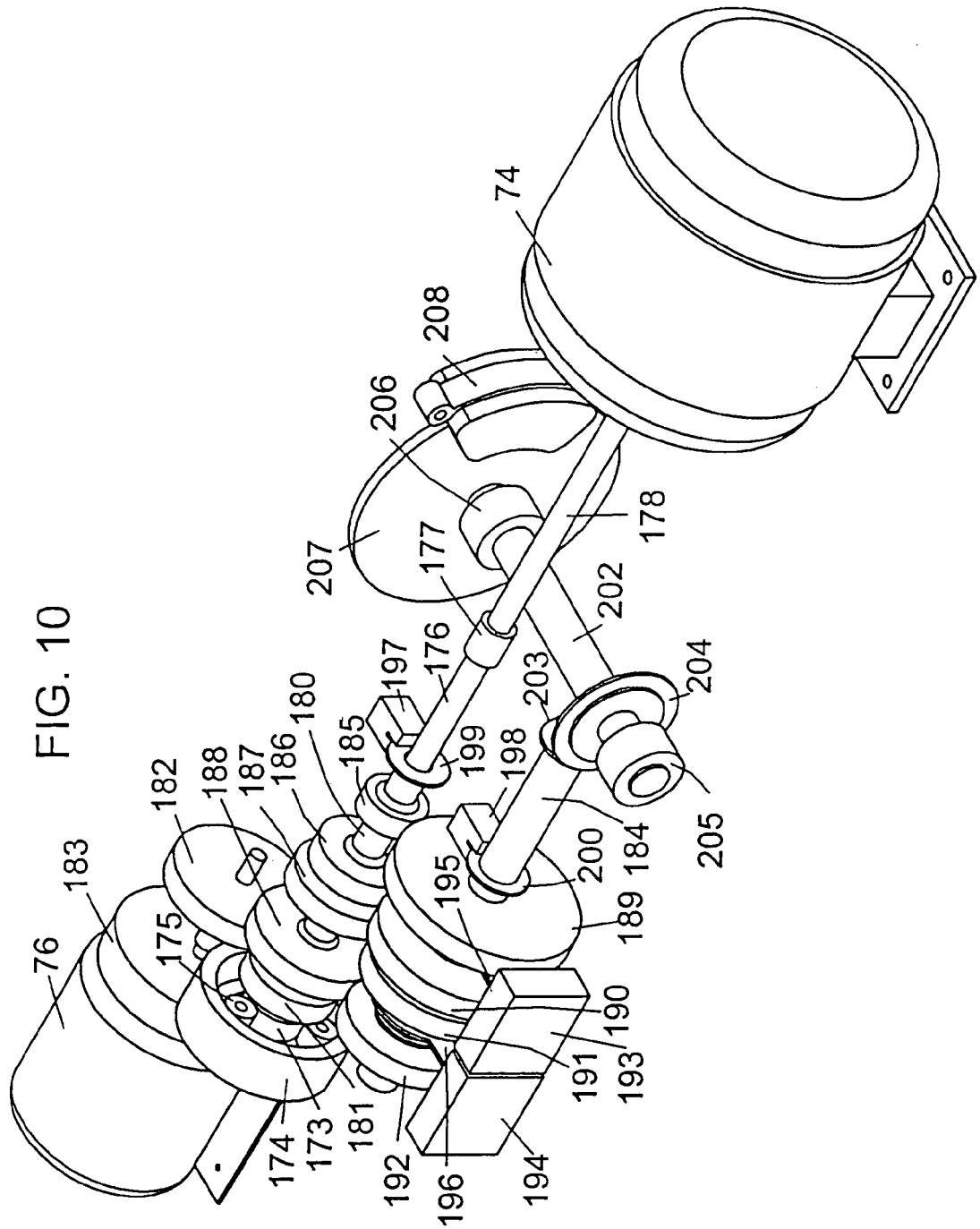
FIG. 10 is an isometric view of a drive train of the carrier.

FIG. 10 is an isometric view of components of a drive train 172 of the carrier 24. The drive train 172 includes an epicyclic gear train that includes a ring or internal gear 173, a sun gear 174 and planet gears 175 that are meshed with the ring and sun gears 173 and 174 and that are journaled by a planet carrier. To simplify illustration, the teeth of gears are not shown.

The ring gear 173 is connected to one end of an elongated input shaft 176 the opposite end of which is coupled through a coupling 177 and a shaft 178 to the shaft of the main drive motor 74. The planet carrier is not visible in FIG. 10 but is secured to the end of a hollow shaft 180, hereinafter referred to as the carrier shaft, which surrounds part of the input shaft 176. The hollow carrier shaft 180 journals the sun gear 174 and a gear 181 that is directly connected to the sun gear 174. Gear 181 is meshed with a gear 182 which is coupled to the control motor 76, also to an electrically controllable brake 183. The control motor 76 and brake 183 are usable in controlling the speed of rotation of the sun gear 174 to thereby control drive of the carrier and the carrier shaft 180 from the ring gear 173 that is driven by the main motor 74 through shafts 178 and 176.

The carrier shaft 180 drives an output shaft 184 through gears of a four speed transmission that includes first, second, third and fourth gears 185, 186,187 and 188 that are secured to shaft 180 and first, second, third and fourth gears 189, 190, 191 and 192 that are journaled on the output shaft 184. Shifter units 193 and 194 operate through elements 195 and 196 control coupling of gears to the output shaft 184. Element 195 has a neutral position in which neither the first gear 189 nor the second gear 190 is coupled to the output shaft 184, and two operative positions in which either the first gear 189 or the second gear 190 is coupled to the output shaft 184. Similarly, element 196 has a neutral position in which neither the third gear 191 nor the fourth gear 192 is coupled to the output shaft 184, and two operative positions in which either the third gear 191 or the fourth gear 192 is coupled to the output shaft 184.

Conventional synchronizers may preferably be used to couple the gears to the output shaft 184 but with an operation that minimizes stress on any synchronizer that is used. Prior to movement of a control element to a coupling position, the control motor 76 is used to drive a selected gear to be coupled at the same speed as that of the output shaft. For this purpose, the speeds of the carrier shaft 180 and output shaft 184 are measured by sensors 197 and 198 which sense rotation of discs 199 and 200 to develop signals that are proportional to speed and that may either be in digital form or converted to digital form. A digital signal from the sensor 197 is multiplied by the speed ratio of the selected gear and compared with a digital signal from the sensor 198 to control the control motor 76 and obtain rotation of the selected gear to be coupled at the same speed as that of the output shaft 184. The element 195 or the element 196 is then operated to couple the selected gear to the output shaft 184.

As is shown in FIG. 10, the output shaft 184 drives a axle 202 for the main wheel 59 through bevel gears 203 and 204. Bearings 205 and 206 are carried by the main frame 57 of the carrier 24 and journal the axle 202. The axle carries a disc 207 engaged by a caliper brake 208. Brake 208 is secured to the frame 57 of the carrie and is hydraulically operated by means not shown.

In using each of the four gear sets, the speed of rotation of the output shaft is increased by using the control motor 76 and/or the brake 183 to reduce the speed of rotation the sun gear 174. The top speed obtainable with any gear set is realized when the speed of the sun gear 174 is reduced to zero. The speed of the carrier shaft 180 is then equal to a certain fraction of the speed of the speed of the ring gear 172. The fraction depends upon the relative diameters of gears. With the illustrated gears, the planet gears 175 have a diameter of two inches, half the four inch diameter of he sun gear 174; the fraction is two-thirds.

In a proposed prototype, the main motor 74 is an induction motor having a rated speed of 3560 RPM. The top speed of the carrier shaft is then 2373.33 RPM. The diameters of the fourth gears 188 and 192 are equal so that the top speed of the output shaft 184 is also 2373.33 RPM. The bevel gears 203 and 204 provide a 2:1 speed reduction so that the top speed of the axle is 1186.67 RPM or 19.77 RPS. With a main wheel 59 having a diameter of 26 inches and a circumference of 6.8 ft., the top speed of the carrier is 134.62 ft./sec. or 91.78 MPH. With the third gears, the top speed is about 71 MPH; with the second gears it is about 55 MPH; and with the first gears it is about 30.59. It is not necessarily desirable to realize any of such top speeds. Various modes of operation are possible, as will be explained in connection with FIG. 11

Figure 11:
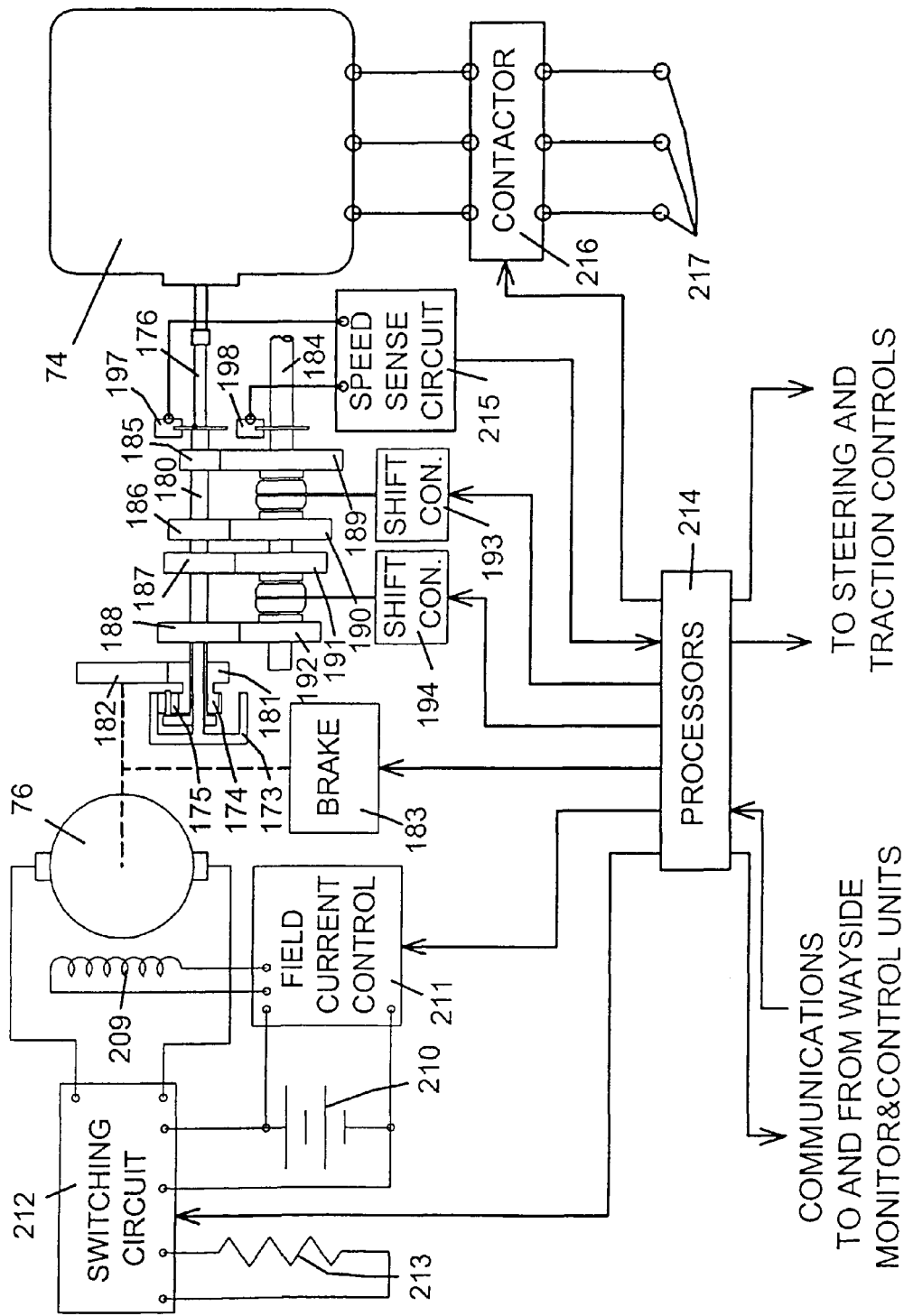
FIG. 11 is a schematic view showing electrical circuitry used to control the drive train of FIG. 10.

FIG. 11 shows electrical circuitry for the drive train 172. As diagrammatically indicated the control motor 76 is a DC motor/generator having a field 209 which is supplied with current from a battery supply 210 through a field current control circuit 211. The armature of the motor 76 is connected through a switching circuit 212 either to the supply 210 or to a resistive load 213. Processors 214 control the field current control circuit 211 and the switching circuit 212, also the brake 183 and the two shifter units 193 and 194. A speed sense circuit 215 receives signals from the sensors 197 and 198 and supplies corresponding data to the processor 214 for control of the shifter units 193 and 194. Processors 214 also control a contactor 216 which connects the main motor 74 to terminals 217 that may be connected to brushes of the current collector assemblies to supply three phase power to the motor 74. Contactor 216 is used in start-up and shut-down operations. Contactor may also be used to prevent supply of power to the main motor 74 following a power supply failure and during temporary drive of the carrier from the control motor 76 as will be described.

Processors 214 may also communicate with wayside monitoring and control units to receive data for control of speed and acceleration and also for sending steering and traction data to controls of the carrier. Reference is made to the steering control shown in FIGS. 4 and 5, the traction control shown in FIG. 6, the magnetic traction control shown in FIGS. 15 and 16, also to a provisional application that relates to a control system and that is to be filed with this application.

To start from a stopped condition of the carrier and then accelerate to a desired speed, the main motor 74 must first be started through the contactor 216. The transmission must then be in a neutral condition with no gear coupled to the output shaft. The motor 74 and the ring gear 174 will then rotate at close to the synchronous speed of 3600 RPM. With no load on either the carrier shaft 180 or the sun gear 174, their speeds will be indeterminate. If the armature of the control motor 76 is then connected to the source 210 the control motor 76 will operate at a speed determined by the voltage of the source 210 and the field current. To obtain a zero speed of the shaft 180, required before coupling any gear to the output shaft 184, the processor 214 then operates in response to a speed signal from the sensor 197 applied through the circuit 215 and through the field current control 211 to obtain a speed of the sun gear 174 equal to twice the speed of the ring gear 173 or nearly 7200 RPM. The control motor will need to operate at nearly two-thirds of that speed or 4800 RPM. This will require a small field current, the speed of the control motor being an inverse function of field current.

With zero speeds of both carrier shaft 180 and the output shaft, the shifter control 193 may then connect the low gear 189 to the output shaft. Then the processor 214 may gradually increase the field current to reduce the speed of the control motor 76. The control motor 76 will then be operating as a generator to apply charging current to the source 210. The control motor 76 will also be operating apply a braking torque to the sun gear 174 and a corresponding torques to carrier shaft 180 and output shaft 184 to accelerate the carrier 24.

When the field current of control motor 76 is increased to a maximum value its speed will be limited to a value determined by the voltage of the source 210. If, for example, that speed is 1200 RPM, the speed of the sun gear will be 1800 RPM, and the speed of the carrier shaft will be two-thirds the approximately 3580 RPM speed of the ring gear 173, minus one third of 1800 RPM or about 1787 RPM. With the first gear 189 engaged the speed of the output shaft 184 will be 596 RPM corresponding to a carrier speed of about 23 MPH. To increase the output speed, the speed of the control motor 76 might be further reduced by connecting its armature to the resistive load 213 and might thereafter be reduced to zero by operating the brake 183. These steps might be taken when it is desired to continuously move the carrier at a speed determined by the gear being used, a speed of about 30.89 MPH in the case of the lowest gear. However, when the lowest gear is being used it will usually be desirable to shift to a higher gear before taking these steps.

To shift from use of the first gears 185 and 189 to use of the second gears 186 and 190, the shifter 193 is shifted to neutral condition. Then the control motor 76 is controlled through control of its field current and in response to a determination of any difference between two rotational speeds. The first is that of the output shaft 184, determined from a signal from the output shaft sensor 198. The second is that of the gear 190, determined from the product of the ratio of the gears 186 and 190 and speed data determined from a signal from the carrier shaft sensor 180. When through operation of the control motor 76 the difference between the two speeds is reduced to zero it means that the gear 190 and output shaft 184 are rotating at the same speed. The shifter 193 is then operated to couple the gear 190 to the output shaft 184.

Shifts in a similar way may be made from the second set 186,190 to the third set 187,191 and then from the third set to the fourth set 188, 192. The fourth set may be used between urban regions or where high speed operation is otherwise desired. The third and second sets or even the first set may be used in urban regions or where for any reason operation at a certain lower speed is desired for a substantial length of time. Maximum efficiency is achieved during continuous operation at the maximum speed obtainable with any set of gears, energy being then supplied solely from main motor 74 which is preferably a high efficiency induction motor. To reach the maximum speed obtainable with the fourth gears or any other set of gears, the switching circuit 212 and the brake 183 are used. After a minimum speed of the control motor 76 has been reached by increasing its field current to a maximum value, the switching circuit 212 may be used to disconnect the armature of motor 76 from the battery 210 and connect it to the resistive load 213 after which the speed of the motor may be further reduced through control of field current. Finally, the brake 183 may be applied to reduce the control motor speed to zero.

The brake 183 may also be used at any time to augment the action of the control motor 76 in reducing the speed of the sun gear 174 and thereby increasing the speeds of the carrier shaft 180 and output shaft 184. A brake 183 of large capacity may be used to limit the required size and capacity of the control motor 76, a primary function of which may then be for use in shifting between gears. However, it is desirable that the size and capacity of the control motor 76 be at least sufficient to allow its use alone to drive the carrier 24 in the event of a failure in supply of AC power for operation of the main motor 76. The contactor 216 is then controlled to disconnect the main motor 74 from the supply terminals and insure that power will not suddenly be applied in the event of restoration of the AC supply. With the control motor 74 disconnected, its output shaft may be held by friction against movement. If not, a brake, not shown, may be applied. A set of gears may then be engaged. Drive of the carrier shaft 180 and of the output shaft 184 may then be effected through drive of sun gear 174 through gears 181 and 182 from the control motor 76. The switching circuit 212 may be used to connect the armature of the motor 76 to the battery 210 in a direction such as to allow safe movement of the carrier 24 to a next available station at which occupants or passengers in cars or cabins can depart. Such movement may be controlled through use of the field current control circuit 211.

The control motor 76 may be used during deceleration of the carrier 24 as well as during acceleration. To decrease the speed of the output shaft while any set of gears is engaged, the speed of the motor 76 may be increased by decreasing its field current. Energy from deceleration of the carrier 24 and energy from the battery 210 are then transferred to the AC supply through operation of the main motor 74 as an induction generator. Such deceleration may be augmented through use of the caliper brake 208 shown in FIG. 10.

Figure 12:
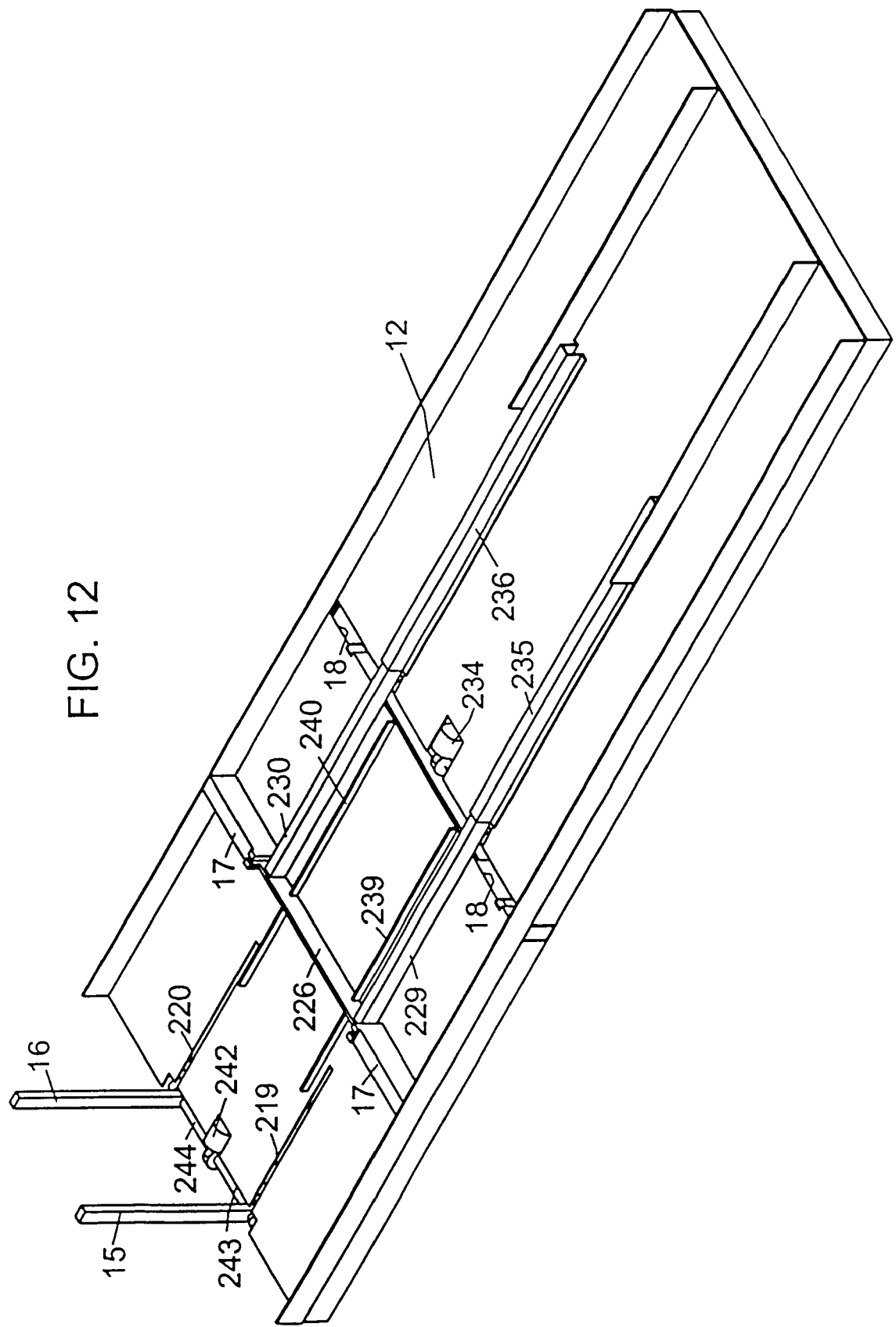
FIG. 12 is an isometric view of an auto-carrying platform of the invention.
Figure 13:
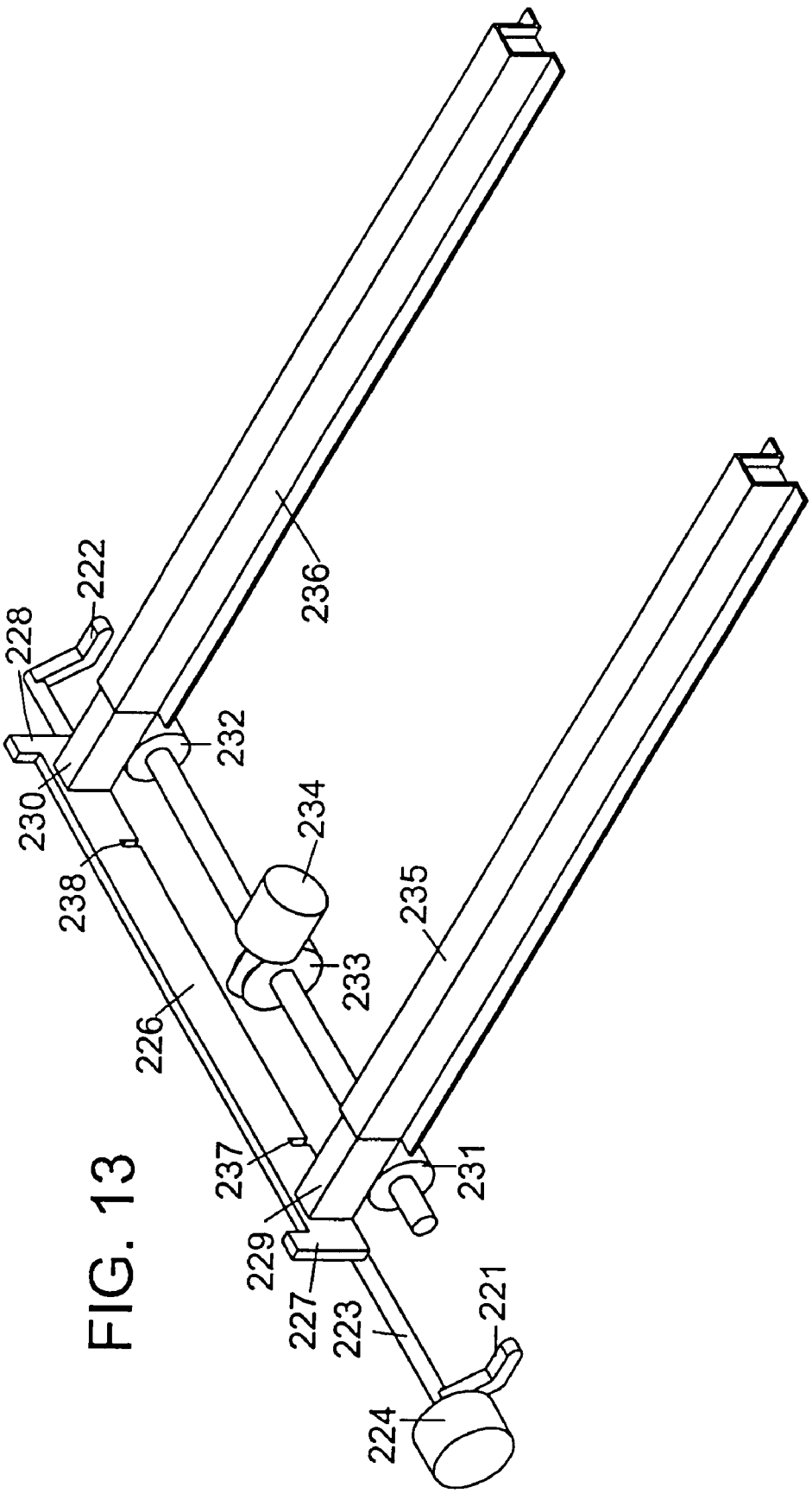
FIG. 13 is an isometric view showing portions of an operating mechanism of the platform of FIG. 12.

FIGS. 12 and 13 provide a more complete disclosure of the platform 12 and its operation. FIG. 12 shows the platform 12 in the condition it would be in after a car has been driven on the platform 12 and after chocks have been moved into engagement with front wheels of the car, but does not show the car. FIG. 13 shows components used in operation of chocks 17 and 18, in conditions awaiting the driving of a car onto the platform 12. As previously explained, a car is driven on the platform 12 to engage front bumper portions thereof with the pair of forward stop elements 15 and 16. After a car is driven onto the platform, the pair of chocks 17 are lifted out of pockets 18 and moved forwardly to positions as shown in FIG. 12, for firm engagement behind the front wheels of the car 11. The system 10 then automatically moves the platform 12 with car 11 thereon to a destination unloading station. At the unloading station, the platform is placed in a car-delivery condition in which the chocks 17 are moved rearwardly and lowered into the pockets 18 and in which the forward stop elements 15 and 16 are swung forwardly and down about a lower pivot axis to be out of the path of a car to be driven forwardly onto the receiving end of an exit driveway.

After a car is driven off the platform, the forward stop elements 15 and 16 are swung up and back and then down into recesses 219 and 220 in the platform 12. The platform 12 will then have a low profile and can be moved to a loading station, usually the next loading station that has room in a queue preceding one of more loading positions. At a loading station, the platform is moved from a queue to a car-receiving condition in which the stop elements 15 and 16 are swung up to upright positions. A car may then be driven forwardly onto the platform to engage front bumper portions with the stop elements. Then the chocks 17 are lifted out of the pockets 18 by a pair of arms 221 and 222 on a transverse shaft 223 which is rotated by a stepper motor 224. Then the chocks 17 are moved forwardly to engage the front wheels of the car.

To move the chocks 17 forwardly, they are connected by a transverse bar, not visible in the drawings, which is in front of a transverse actuating bar 226 when the chocks are lifted. Opposite end portions 227 and 228 of the actuating bar 226 are then positioned in slots in ends of the chocks 17. The actuating bar 226 connects the forward ends of a pair of racks 229 and 230 formed with teeth on their undersides mesh with the teeth of a pair of pinions 231 and 232. To simplify illustration, the teeth of the racks 229,230 and pinions 231, 232 are not shown. The pinions 231 and 232 are on opposite ends of a shaft 233. A worm gear of a gear motor 234 drives a central portion of the shaft 233 to move the racks 229 and 230, bar 226 and chocks 17 ahead to engage behind the front wheels of a car on the platform.

A pair of covers 235 and 236 are secured to the platform 12 to guide and protect rearward portions of the racks 229 and 230. A pair of notches 237 and 238 are formed in the transverse actuating bar 226 to receive upstanding formations 239 and 240 on the platform 12 and guide movement of the bar 226. FIG. 12 shows the formations 239 and 240. FIG. 12 also shows a gear motor 242 that is provided for controlling movements of the stop elements 15 and 16. The gear motor 242 includes a worm gear connected to ends of a pair of torsion springs 243 and 244 that have opposite ends connected to lower ends of the stop elements 15 and 16. A transverse support shaft, not visible, journals the elements 15 and 16 and extends through the torsion springs 243 and 244 and the worm gear of the gear motor 242. The torsion springs 243 and 244 absorb energy that is applied from the front bumper portion of a car driven onto the platform. After a car is driven onto the platform 12, the gear motor 242 may be operated if necessary to apply a certain torque to the springs 243 and 244 as may be necessary to maintain a firm engagement of the stop elements 15 and 16 with the car during travel.

An energy absorbing buffer assembly may be used with the platform 12 at a loading station to absorb any excess energy that may come from a car driven too fast onto the platform 12. In my U.S. Pat. No. 6,237,500, FIGS. 9-12 and columns 14-17, I disclose a buffer assembly that includes a buffer element 146, means for moving the buffer element to a position in which it will be engaged by the front bumper of an automobile driven onto a platform, means for absorbing energy developed during such engagement and means for then moving the buffer element out of the path of the automobile. That buffer assembly may be used to move a buffer element like the element 146 thereof to a back-up position just ahead of the stop elements 15 and 16 while a car is driven onto the platform 12. The buffer assembly would then absorb any excess energy applied from a car moved too fast against the elements 15 and 16, thereby protecting the elements 15 and 16, torsion springs 243 and 244 and gear motor 242 from any damage. After doing so, the buffer element would then be moved away, allowing the elements 15 and 16 to be swung ahead and down and allowing the car to be moved onto the receiving end of an exit driveway.

Figure 14:
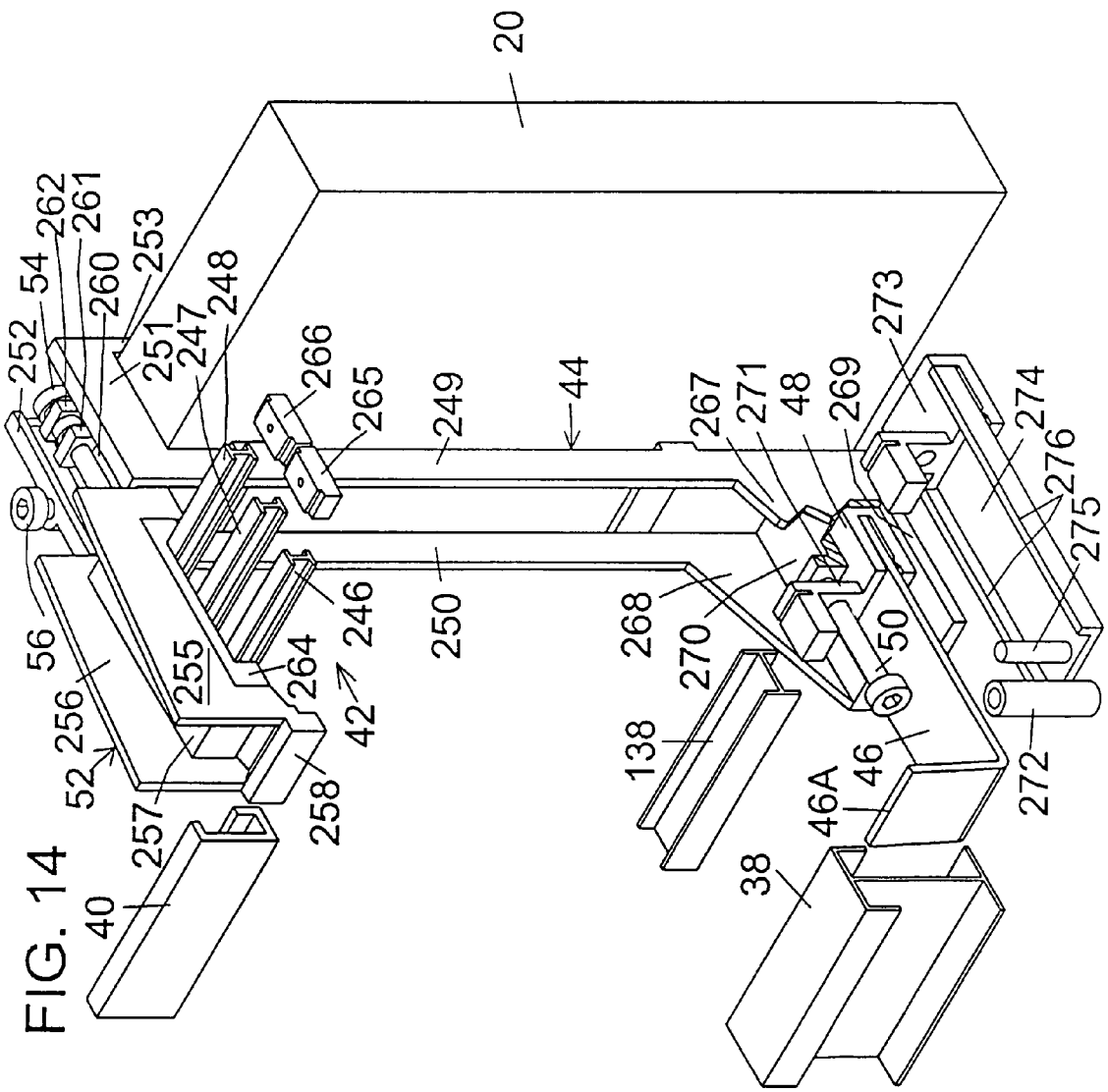
FIG. 14 is an isometric view showing details of a right-hand portion of a rail support shown in FIG. 3.

FIG. 14 is an isometric view showing details of a right-hand portion of the rail support 36 that is one of a series of rail supports along the guideway. Short sections of the main rail 38, the upper right guide rail 40, the side rail 138 and rails 246, 247 and 248 of the right-hand current collector assembly 40 are shown in relation to supporting components. Also shown is a short section of the right-hand support beam 20. As aforementioned, the hanger 44 has an upper end arranged to be hooked onto the beam 20. The hanger 44 includes a pair of spaced parallel vertically extending portions 249 and 250, top portions 251 and 252 that extend over the upper end of the beam 20 and portions including a portion 253 that extend down from the outer ends of the top portions 251 and 252 along the outside of the beam 20. Lower sides of the top portions 252 and 252 are joined by a horizontal wall, not visible, that may either rest on the top of the beam 20 or be positioned a short distance above the top of the wall 20 through adjustment of the screw 56 which is threaded through the top portion 252.

The support 51 for the upper right guide rail 40 and for the upper right top guideway wall 21 includes two portions 255 and 256 that are joined by a horizontal wall portion 257 which is above the rails 246-248 of the current supply rail assembly 42. Inner ends of portions 255 and 256 are also joined by a portion 258 which is configured to be inserted into the upper guide rail 40 and to then engage lower and inner and outer wall portions of the upper guide rail 40. After being so inserted, a spacer not shown is inserted between the upper side of the portion 258 and an upper flange portion of the guide rail 40 to securely connect the support 51 and the upper guide rail 40.

The support 51 is supported from, and guided for adjustable inward movement relative to, the upper end of the hanger 44. For these purposes, outwardly extending portions of the support 51 extend under inwardly turned flanges of the top portions 251 and 252 of hanger 44 and are joined by a horizontal wall 260 that is positioned over the aforementioned horizontal wall that joins the top portions 251 and 252 of the hanger 44. A threaded shank portion of the adjustment screw 54 is threaded through an upstanding portion 261 of the horizontal wall 260. An upstanding portion 262 of the aforementioned horizontal wall that joins the top portions 252 and 252 of the hanger is embraced between the head of the adjustment screw 54 and a collar secured to the shank portion of the screw 54. The screw is thereby restrained from longitudinal movement relative to the hanger 44.

To provide an insulated support for the current supply rails 246-248, members 264, 265 and 266 of insulating material are provided. The member 264 is positioned under the support 52 and over the rails 246-248 with downwardly extending end portions of member 264 in engagement with the rails 246 and 248. Member 265 is inserted between rails 246 and 247 by temporarily moving portions of the rails 246 and 247 away from each other at a distance from the support 52. In a similar way, member 248 is inserted between rails 247 and 248. The members 265 and 266 are so configured as shown that once so inserted, they are engaged by flanges of the rails 246-248 which cannot move downwardly relative thereto. After being so inserted, the members 265 and 266 are slidably moved along the rails and to positions under the member 264 and the support 52. A pair of screws are then inserted upwardly through openings in members 265 and 266 and openings in member 264 and are threaded into openings in the support 52 to securely support the rails 246-248 from the support 52.

At its lower end, the hanger 44 includes portions 267 and 268 which extend toward the main rail 38 and which support lower and upper wall portions 269 and 270 there-between. Part of portion 267 is broken away in the drawing to show the configuration of the support 48 for the leaf spring 46. Support 48 includes lower and upper wall portions which embrace the end of the leaf spring 46. The lower of such wall portions has an upstanding rib which provides a fulcrum point for bending action of the leaf spring 46. An upstanding formation 271 on the upper of such wall portions of member 48 has an internally threaded opening for the adjustment screw and is configured to support a side rail such as rail 138.

The leaf spring 46 has an end portion 46A which extends upwardly to a terminal end that engages the main rail 38 at a point between the web and a top flange of the rail 38. As an alternative to a leaf spring, use may be made of a spring 272 that for convenience is shown as a hollow cylinder but that should be understood as being a coiled compression spring. For this purpose, a substitute 273 for the member 48 may be used to support the end of a member 274 having an upstanding rod portion 275 on which the coiled compression spring 272 is installed. The member 274 is formed with strengthening ribs 276. The coiled compression spring 272 will engage the underside of a top wall of the main rail 38 between the web portion and a down-turned flange portion of the main rail 38.

The use of springs of steel or another metal to support a rail has advantages from the standpoints of predictability, uniformity and reliability of performance, as compared to use of elastomeric materials, wood ties or the like. Regardless of what type of support is used, deflections under load may be determined using an analysis and Hay-Talbott equations set forth at pages 244-252 of a text "RAILROAD ENGINEERING" by William W. Hay, Second Edition, published by John Wiley & Sons. With a rail having a given moment of inertia and modulus of elasticity and with a given load, the deflection is determined by the modulus of elasticity or "u" of the rail support, the dimensions of which may be the amount of load in pounds on a one inch length of rail required to depress the rail one inch. Equations include:

Max. deflection $Y0 = P*(64*E*I*(u^3))^0.25$

Max. moment $M0 = P*((E*I/(64*u))^0.25$

Max. pressure against rail $P0 = P*((u/(64*E*I))^0.25)$ where P=load in lbs. E=modulus of elasticity of rail I=moment of inertia distance to where bending moment=0, $x1 = (pi/4)*((4*E*I/u)^0.25))$ distance to point of reverse flexure=$3*x1$ seat load $Q0 = 0.391 * P*S/x1$, where S=tie spacing max. bending stress $S0 = M0*c/I$ where c=distance to neutral axis.

It is useful to calculate u as function of allowable stress Sa $u = (E/64)*(((c*P/Sa)^4))/(I^3)$ These equations may be used in the design of rail supports that avoid undue stress of a rail, distribute loads along guideway structures, avoid undesired stress concentrations in guideway structures and provide a "floating" support of carriers for smooth travel. Using these equations it is possible to compensate for deflection of a supporting beam or beams by varying support of the rail to provide a harder support at the center of the beam or beams and a softer support at the ends. This may be done by varying spring rates or, while using a uniform spring rate, by varying distances between supports. It is also possible to use a combination of varying spring rates and varying distances between supports.

After installation of the rails on assemblies as illustrated, blocks of an acoustically absorptive material, not shown, are preferably installed between the hangers and against the inside surfaces of the beams to minimize the creation of air turbulence as well as to absorb any acoustic energy otherwise generated during movement of carriers along the guideway.

FIG. 15 is a side elevational view of a wheel 280 that is usable to obtain controllably increased traction between the wheel 280 and a rail through use of magnetic forces. FIG. 16 is a cross-sectional view taken substantially along line 16-16 of FIG. 15. FIG. 16 also diagrammatically illustrates electrical circuitry. It will be understood that the wheel 280 may be directly substituted for the wheel 59 of a first embodiment of a carrier or for a wheel of a second embodiment of a carrier that is shown in FIGS. 18-31. When so substituted, the wheel 280 will support substantially all of the weight of a carrier and any load carried by the carrier, resulting in a large traction force that is enhanced by a synergistic effect. The force that results from the weights being carried will increase areas of contact between the periphery of the wheel and a rail. This will increase magnetic forces which will thereby add to the force that results from weights being carried and thereby increase the total force and traction.

A peripheral part of the wheel 280 provides first and second annular portions 281 and 282 that are of a magnetic material, preferably steel, and that are axially spaced to engage separated portions 283 and 284 of the main rail 38. The peripheral part of the wheel 280 also provides a space between portions 281 and 282 for an annular coil 286 to which a controllable current can be applied for obtaining a variable source of magnetic flux. The peripheral part of the wheel 280 also provides a third annular portion that is of a magnetic material, preferably steel, and that is radially inside the coil 286 to complete a magnetic flux path around the coil, through the portions 281 and 281 and through separated portions of the rail 38 engaged by the portions 281 and 282.

In the illustrated embodiment, the wheel includes two separate members 287 and 288 that provide the first and second annular portions 281 and 282 and that include portions in flush engagement on the inside of the coil to together provide the third annular portion. Members 287 and 288 may be of a physically strong and magnetically "soft" steel material, but could possibly be of a special magnet material to minimize hysteresis or other losses. The members 287 and 288 include hub portions 289 and 290 that are keyed or otherwise secured to a drive shaft 292 to be driven from a drive train such as the drive train 172 of FIGS. 10 and 11. To secure members 287 and 288 together five nuts 293 are threaded onto five stud bolts 294 that project through openings in a web portion 295 of member 287 and from a web portion 296 of member 288.

Coil 286 is arranged to be connected through current control means 297 to a DC supply 298 which may preferably be in the form of a battery as shown. Wires that are connected to ends of the coil 286 extend through a channel 300 formed in a face of member 287 and through openings 301 and 302 in the web portion 295 of member 287 to two rings 303 and 304. The rings 303 and 304 are of copper or other conductive material and mounted on the web portion 295 of member 287 through spacers 305 and 306 of insulating material. Rings 303 and 304 are engaged by brushes 307 and 308 which are carried by the frame of the carrier 24 and are connected to the current control means 287. The current control means 287 is controlled by signals from processors such as processors 214 of FIG. 11. The processors may act through the current control means 287 to apply increased current to the coil 286 and obtain increased traction during accelerations and decelerations, during movement in upward or downward inclines or when increased traction may be otherwise desirable.

FIG. 17 is an enlargement of a portion of FIG. 16, more clearly showing that the members 287 and 288 include portions 309 and 310 that extend toward each other between their outer cylindrical surfaces and the outer end of the coil 286. Each of the portions 309 and 310 is tapered to a terminal end having a short dimension in a radial direction. A gap is thereby provided between the members 287 and 288 which is less than the width of the coil 286 and portions of the rail of greater length are thereby engaged by the wheel 280. FIG. 17 also shows more clearly an annular member 311 that has an outer diameter equal to that of members 287 and 288, that has an inner diameter equal to the outer diameter of coil 286 and that is shaped to engage the inner surfaces of the tapered portions 309 and 310. Annular member 311 is of a non-magnetic material and may be of a plastic material which is applied and hardened after assembly of the members 287 and 288 with the coil 286 there-between.

It is noted that with the construction as shown and with continued application of a DC current of one polarity to the coil 286, residual magnetic forces may exist in portions of the wheel 280 and in rails to create increased traction even when no DC current is flowing in the coil 286. Such increased traction may increase energy losses and may otherwise be undesirable but will decrease the possibility of slippage between the wheel and the rail and may usually be desirable. If residual magnetic forces are found to be undesirable, they can be reduced through the use of "soft" magnetic materials and can be avoided through substitution an AC magnetizing current for a DC magnetizing current of one polarity or through periodic demagnetization procedures. If increased traction from residual magnetic forces is found to be desirable, the residual magnetic forces can be increased through the use of "hard" magnetic materials. A short burst of a high amplitude magnetizing current may be applied to the coil 286 to obtain permanent magnetization of the portions of the wheel that are in the magnetic flux path.

Figure 18:
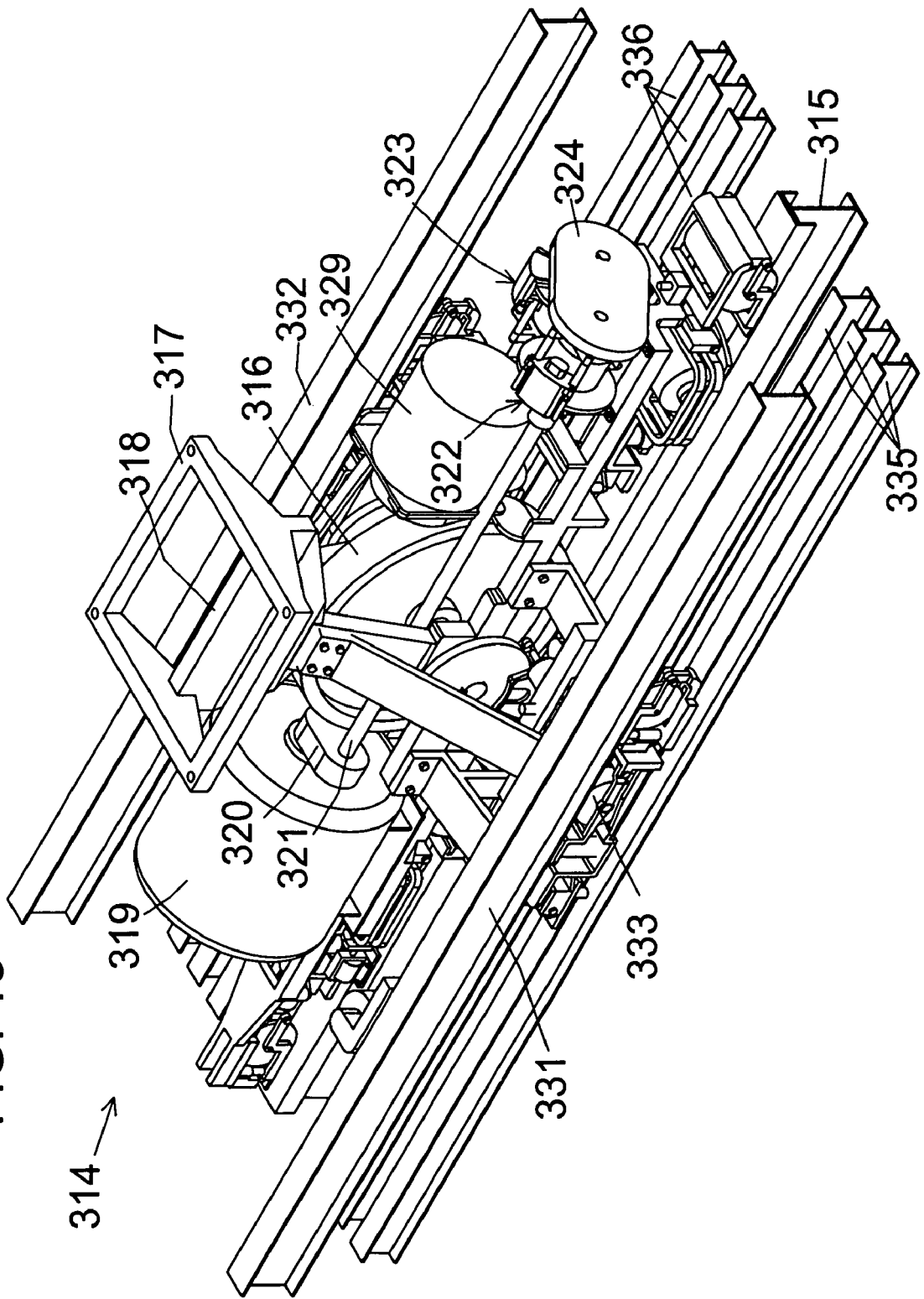
FIG. 18 is an isometric view showing another preferred form of carrier of the invention and certain rails of an associated preferred form of guideway for the carrier.
Figure 19:
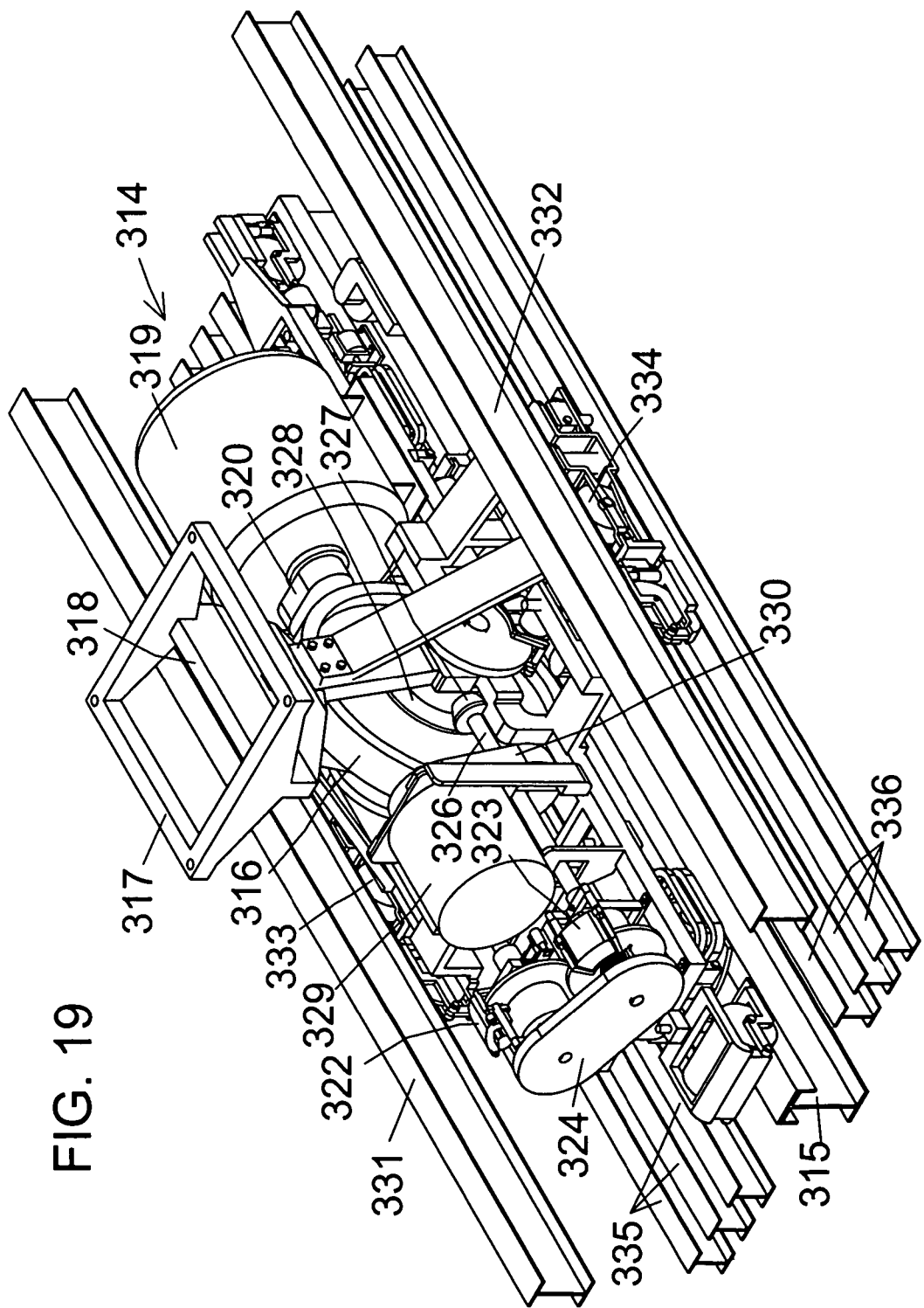
FIG. 19 is an isometric view similar to FIG. 18 but from a different angle to show an opposite side of the carrier of FIG. 18.
Figure 20:
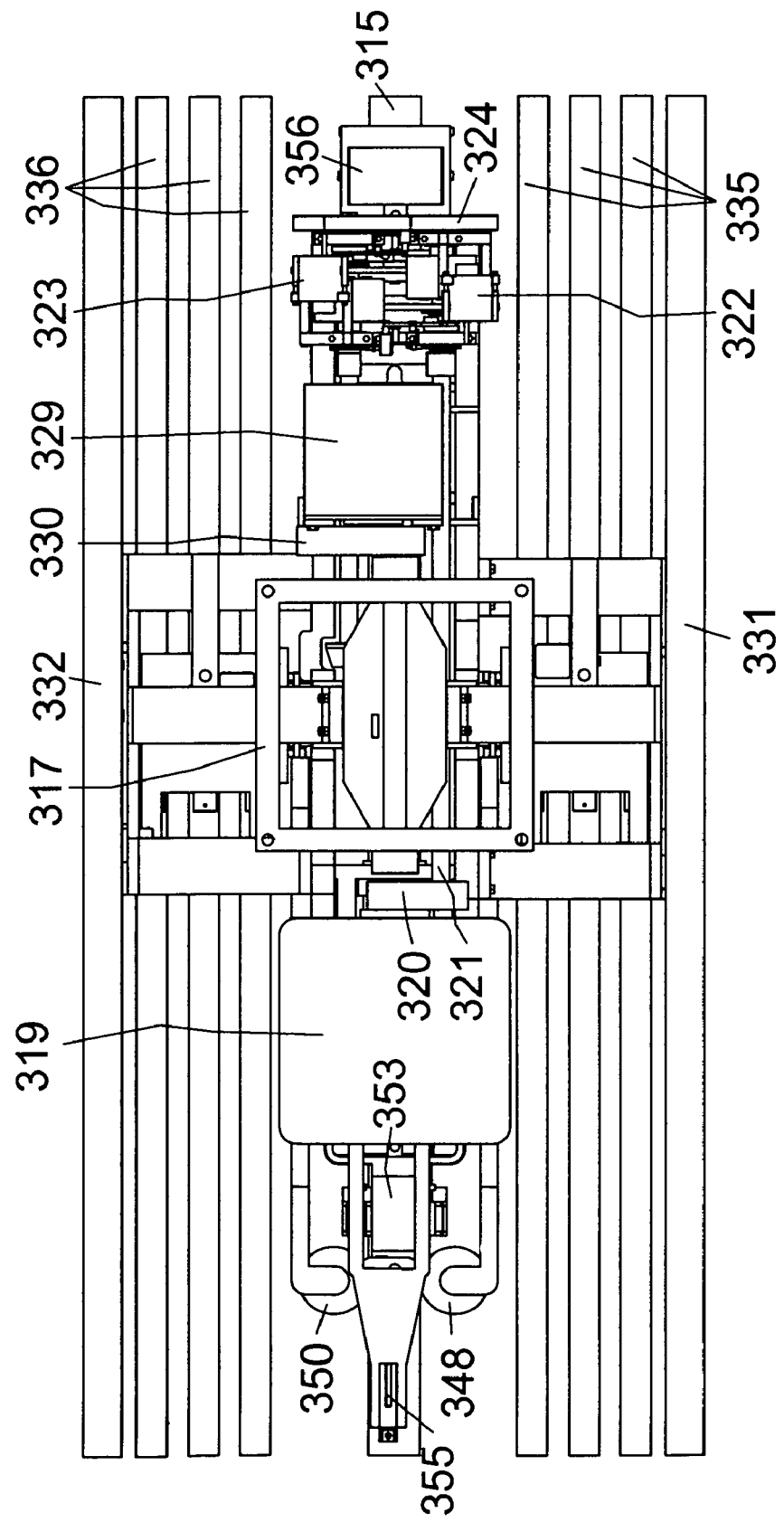
FIG. 20 is a top plan view of the carrier and rails of FIG. 18.
Figure 21:
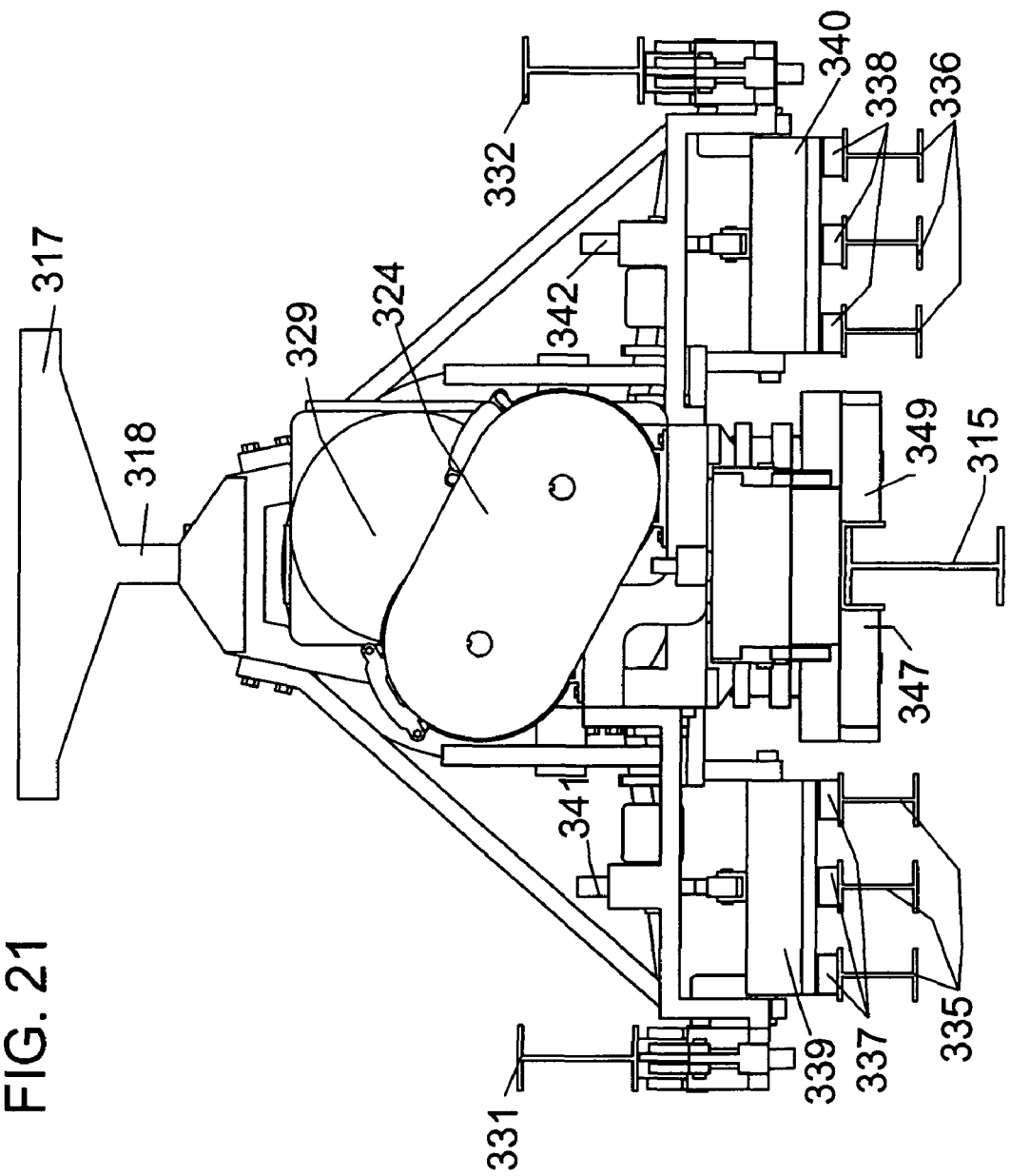
FIG. 21 is a rear elevational view of the carrier and rails of FIG. 18.

In FIG. 18, reference numeral 314 generally designates another preferred form of carrier constructed in accordance with the principles of this invention. Guideway rails are shown that are supported by suitable means, not shown, and that support, guide and supply electrical power to the carrier. Such guideway rails include a main rail 315 that supports a main support and drive wheel 316 of the carrier 314. A rectangular pad 317 supports a load to be carried, such as an automobile-carrying platform, a passenger cabin or a freight container. Pad 317 is directly above the main wheel 316 and is part of a frame of the carrier 314 supported by bearings for the main wheel 316. The frame includes a narrow elongated portion 318 which can extend through a narrow slot between top wall portions of a guideway.

A drive train for the main support and drive wheel 316 includes a three-phase AC induction motor 319 which is coupled though gears of a unit 320 to a forward end of a shaft 321 that extends rearwardly alongside the main wheel 316. The rearward end of the shaft 321 is connected to an input of a first transmission unit 322 that is coupled to an input of a second transmission unit 323 through gears in a housing 324. As shown in FIG. 2, the output of the second transmission unit 323 is coupled through a shaft 326 to a bevel gear 327 which drives a second bevel gear 328 secured to the main support and drive wheel 316. A DC motor/generator (M/G) 329 is electrically connected to batteries, not shown, and is mechanically coupled to the shaft 326 through gears in a housing 330.

Each of the transmission units 322 and 323 includes epicyclic gearing with planetary gears including a sun gear that is connected to a rotor which is controllably braked by a caliper brake to control drive from a planet-carrier to an internal ring gear. The M/G 329 is operated as a motor to supply the main drive torque for initial acceleration of the carrier 314. Then the caliper brakes of the transmission units 322 and 323 are controlled to cause drive torque to be increasingly derived from the induction motor 310, all drive torque being derived from the induction motor when the speed is at or near a maximum speed. Through control of the caliper brakes and through selective lock-ups of the two transmission units, substantially constant carrier speeds of about 45 MPH, 63 MPH and 88 MPH can be developed with drive from the AC induction motor 319 which can operate with high efficiency at a rated speed determined by the number of poles of the motor and the frequency of the applied AC.

For control of tilting of the carrier 314 and also for control of traction between the main drive and support wheel 316 and the main rail 315, the guideway includes a pair of auxiliary rails 331 and 332 that will be referred to as side rails, being positioned at substantial distances from opposite sides of the main rail 315. The undersides of side rails 331 and 332 are engaged by wheels 333 and 334 of the carrier 314, wheel 333 being shown in both FIGS. 18 and 19, wheel 334 being shown only in FIG. 19. To resist tilting of the carrier about the main rail, the relative upward forces applied by wheels 333 and 334 to the side rails 331 and 332 are controlled by actuating components that are associated with the wheels 333 and 334 and that may include motorized screw jacks. For increased traction when accelerating or decelerating or when moving on inclines, such actuating components may function to simultaneously increase the upward forces applied to the undersides of both of rails 331 and 332. To facilitate movement through Y-junctions, the vertical positions of the side rails 331 and 332 are such that lower portions of components associated with the wheels 319 and 320 are substantially above the level of the top surface of the main rail 315.

For supply of electrical power to the carrier 314, current supply rails in two groups 335 and 336 of three each are shown on opposite sides of the main rail 315. The rails of the two groups 335 and 336 are connected in parallel to a source of three phase AC power which may be obtained from the grid. For more reliable supply of power, both groups 335 and 336 may preferably be provided along all guideways but, with the exception of Y-junctions, one of groups 335 and 336 could be used alone. As shown in the rearward elevational view of FIG. 21, the upper surfaces of the rails of groups 335 and 336 are at the same level as the upper surface of the main rail 315 and are engaged by current collector shoes in two groups 337 and 338 of three each, positioned under the horizontal axis of the main support and drive wheel 316. The two groups 337 and 338 of shoes are resiliently supported from the undersides of rearward ends of two blocks 339 and 340 of an insulating material Forward ends of the blocks 339 and 340 are supported for pivotal movement about a horizontal axis. When moving through Y-junctions, the rearward ends of the blocks 339 and 340, positioned over the shoes 337 and 338, are arranged to be selectively lifted through operation of two motorized screw jacks 341 and 342. Shoe group 337 is lifted when steering to the right through a divergent Y-junction or when approaching a convergent Y junction from the right. Shoe group 338 is lifted when steering to the left through a divergent Y-junction or when approaching a convergent Y junction from the left.

Figure 22:
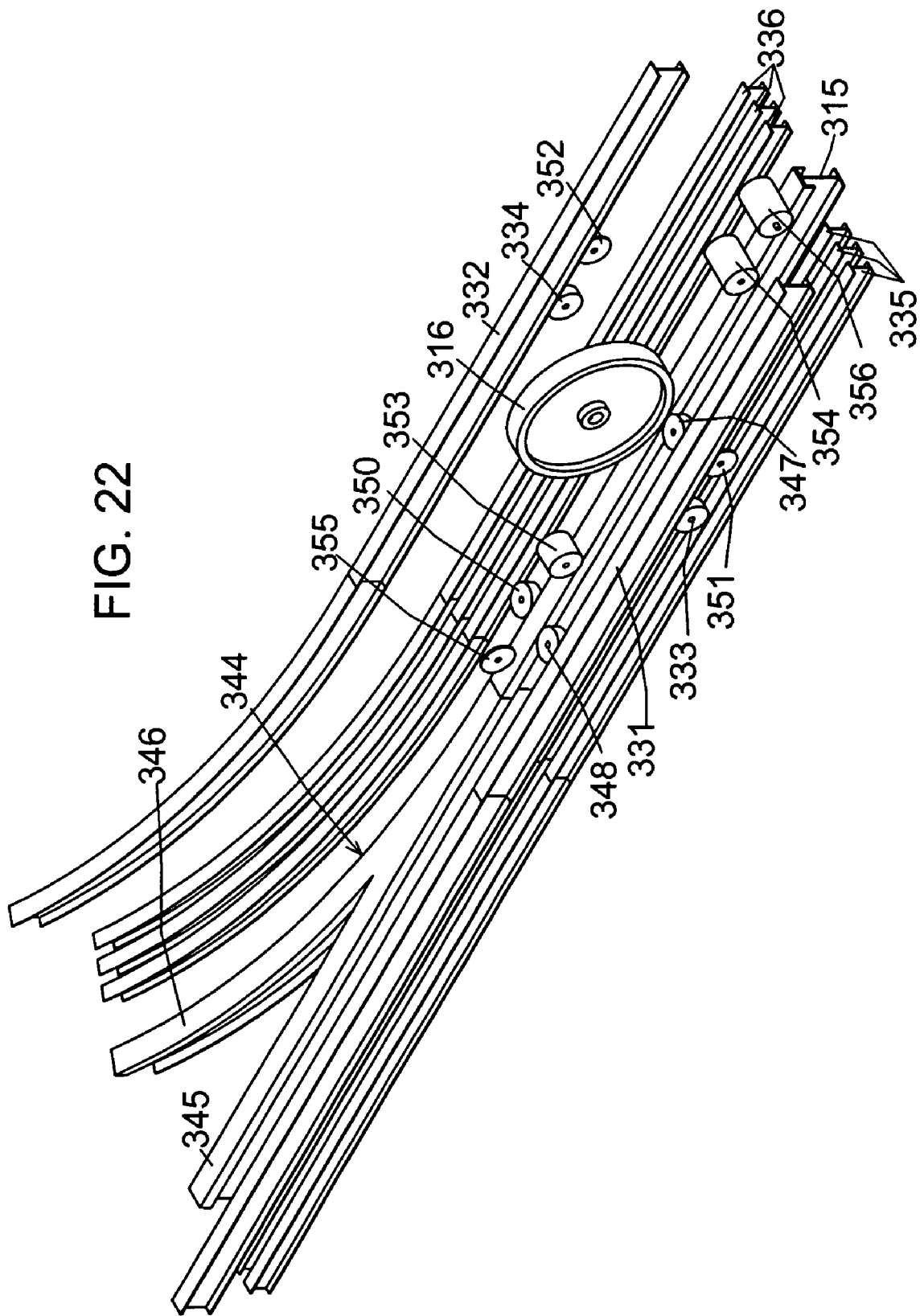
FIG. 22 is an isometric view rails of a portion of a divergent Y-junction of a guideway and showing wheels of the carrier of FIG. 18 but not showing other components of the carrier, the purpose being to show how the wheels cooperate with the rails in guiding the carrier, in steering of the carrier and in controlling tilting, traction and balance.
Figure 23:
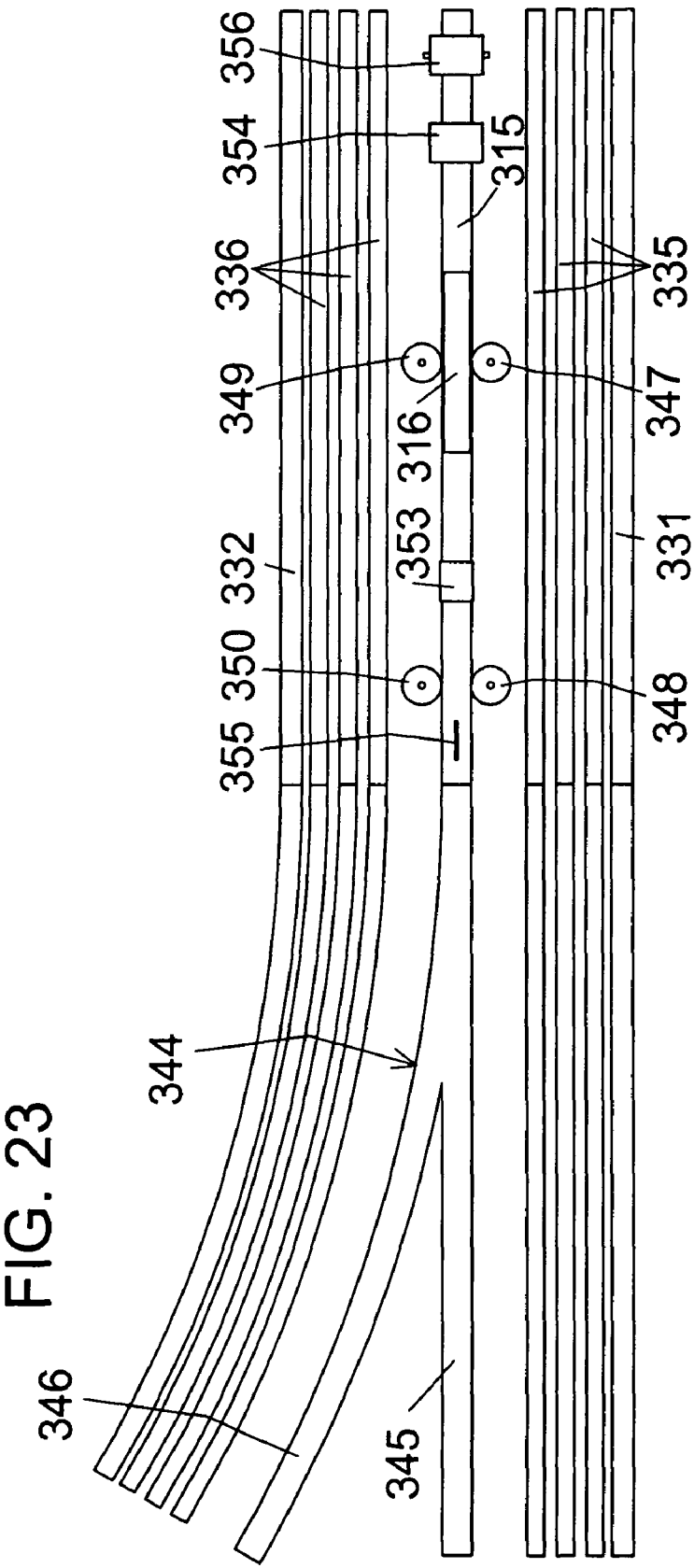
FIG. 23 is a top plan view of the components as shown in FIG. 22.

FIG. 22 is an isometric view which shows the guideway rails at the entrance to a divergent Y-junction and wheels of the carrier 314 that cooperate with such rails in steering through the divergent Y-junction. Through control of the positions of certain wheels, a carrier may be steered to either move in a left path that is straight ahead or in a right path that veers off to the right. The main support and drive wheel 316 is movable along the guideway rail 315 and onto a divergent Y-junction rail structure 344. Structure 344 includes a portion 345 for support of the carrier when moving in a left path that is a straight-ahead path with the construction as shown but that could be a path veering off to the left. Structure 344 also includes a portion 346 for support of the carrier when moving in a right path that veers off to the right with the construction as shown but that could be a straight-ahead path.

Left and right guide and steer wheels are provided that are supported from the carrier 314 for rotation about vertical axes and that engage left and right side surfaces of the main rail 315 and of the structure 344 to guide and steer the carrier. The left guide and steer wheels include a rearward wheel 347 that is positioned opposite the main support and drive wheel 316 and a forward wheel 348 that is positioned a substantial distance ahead of the rearward wheel 347. Similarly, the right guide and steer wheels include a rearward wheel 349 that is positioned opposite the main support and drive wheel 316 and a forward wheel 350 that is positioned a substantial distance ahead of the rearward wheel 349. In FIG. 22, the right rearward wheel 349 is hidden behind the main wheel 316 but is shown in the rear elevational view of FIG. 21 and in FIG. 23.

As aforementioned, actuating components are associated with the wheels 333 and 334 to control the upward forces applied by wheels 333 and 334 to the undersides of side rails 331 and 332. In control of tilting, such components are controlled from vertical displacements of sensing wheels 351 and 352 which engage the undersides of side rails 331 and 332. Sensing wheels 351 and 352 are connected to linear potentiometers to develop electrical signals proportional to vertical displacements of the side portions of the carrier relative to the rails 331 and 332.

For control of balance about the axis of the main wheel 316, wheels 353 and 354 are engaged with the main rail 315 at points spaced forwardly and rearwardly from the main wheel 316. Downward forces applied to the rail 315 by wheels 353 and 354 are controlled by actuating components that may included motorized screw jacks. Such components operate in response to electrical signals that are developed by linear potentiometers connected to sensing wheels 355 and 356 and that are proportional to vertical displacements of forward and rearward portions of the carrier 314 relative to the main rail 315. In moving through curves and turns, the carrier rotates about a vertical axis through the area of engagement between the main wheel 316 and the main rail 315. There can then be a quite substantial lateral displacement of the rearward balance and sensing wheels 354 and 356 relative to the portions of the main rail 315 engaged thereby. For this reason, the rearward balance and sensing wheels 354 and 356 have large widths as shown, sufficient to insure proper engagement with the main rail 11 when moving through turns of minimum radius.

In guideway sections other than in Y-junctions in which the main rail curves to the left or right, both the left wheels 347 and 348 and the right wheels 349 and 350 will engage the left and right sides of the main rail 315. The rearward wheels 347 and 349 will then insure that the carrier will be rotated about a vertical axis through the area of engagement between the main wheel 316 and the main rail 315. The coaction between the engaged surfaces of the main wheel and the main rail will then develop a lateral force on the carrier that assists a change in direction of the carrier to follow the curved path and that opposes a centrifugal developed in following the curved path.

Figure 24:
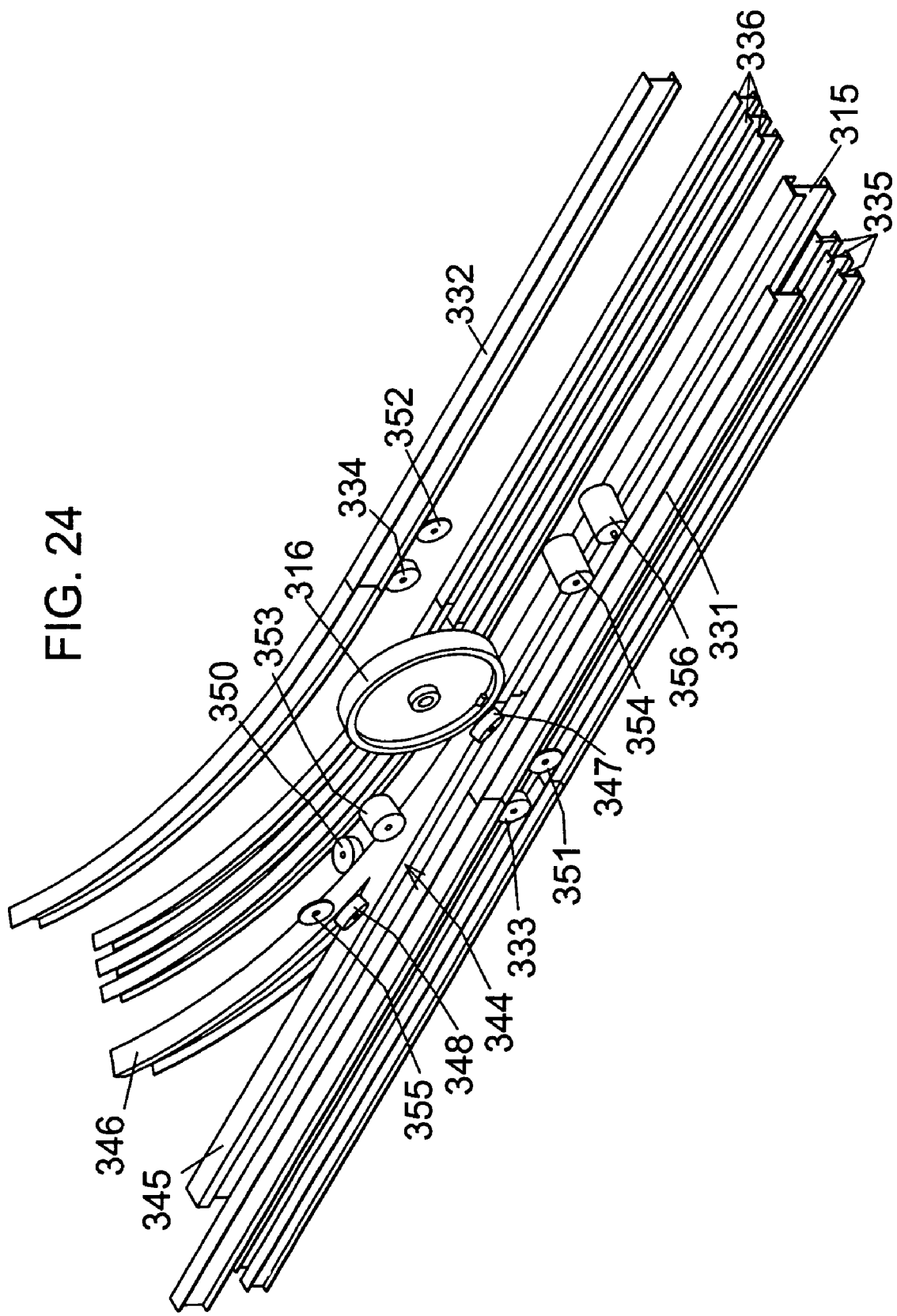
FIG. 24 is a view similar to FIG. 22, but showing the condition of the carrier wheels after the carrier has entered the divergent Y-junction.

When moving through a divergent Y junction such as shown in FIG. 22, means not shown are provided for selectively lifting either the left wheels 347 and 348 or the right wheels 349 and 350. In a steer to the right, the left wheels 347 and 348 are lifted to be above the level of the main rail 315 and structure 344. In a steer to the left, the right wheels 45 and 46 are lifted to be above the level of the main rail 315 and structure 344. FIG. 24 is similar to FIG. 22, but shows the condition of the carrier wheels after the carrier has entered the divergent Y-junction The left guide and steer wheels 347 and 349 are lifted as shown so as to be above the level of the main rail 315. The forward balance control wheel 353 is turned about a vertical axis to develop a lateral force on the carrier 314 that insures engagement of the right guide and steel wheels 349 and 350 with right sides of the main rail 315 and structure 344 when moving through the Y-junction.

Figure 25:
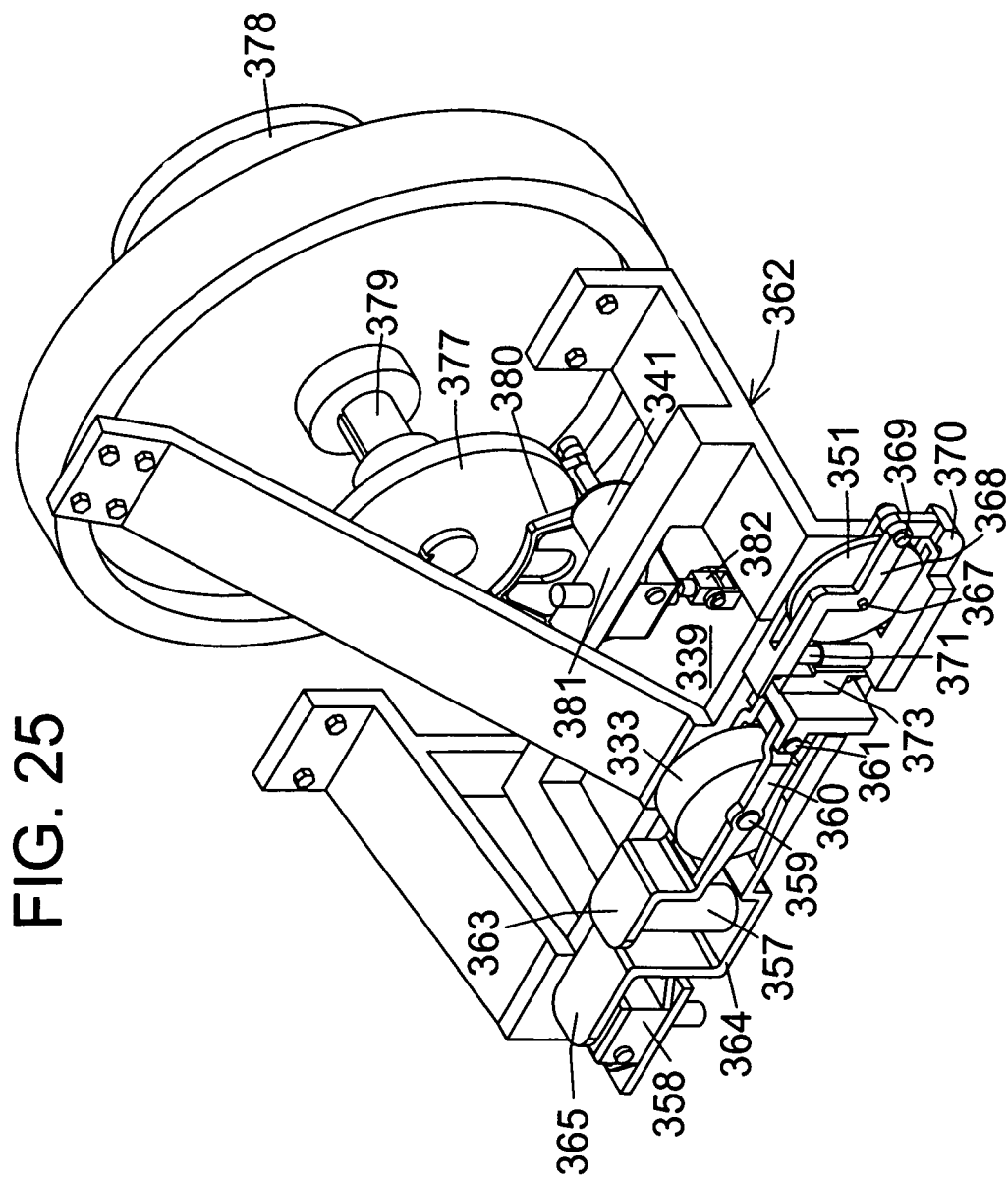
FIG. 25 is an isometric view of parts of the carrier of FIG. 18 that are involved in control of tilt of the carrier.
Figure 26:
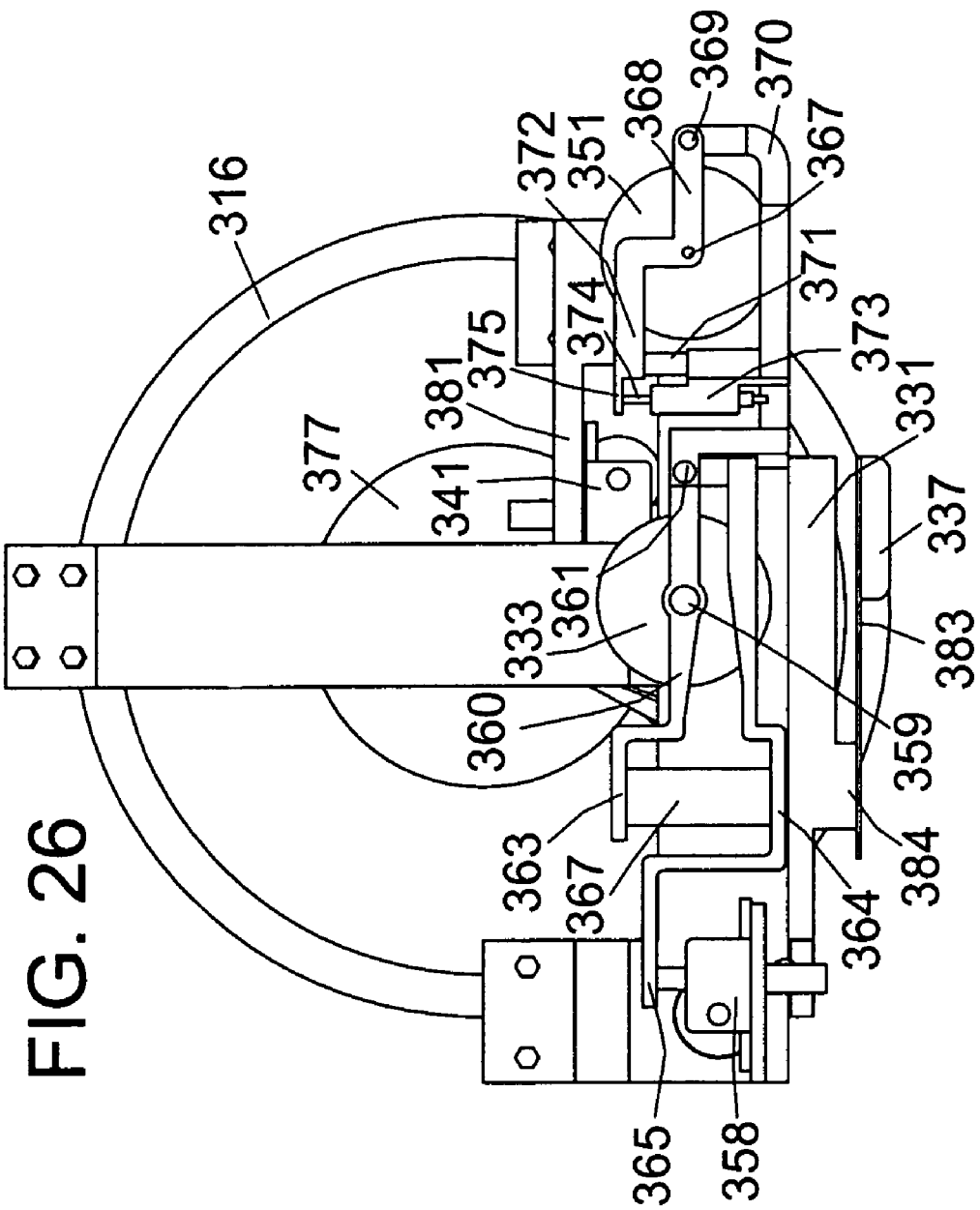
FIG. 26 is a side elevational view of the parts shown in FIG. 25.

FIG. 25 is an isometric view of parts of the carrier 314, including the wheels 333 and 351 that are involved in control of tilt of the carrier, and including the support block 339 and the screw jack 341 that are involved in support and lifting of the current collector shoes 337. FIG. 26 is a side elevational view of the parts shown in FIG. 25.

The wheels 333 and 351 engage the underside of the left side rail 331. An upward force is applied by wheel 351 through a spring 357 to resiliently oppose tilting of the carrier about a longitudinal axis, in a clockwise direction as viewed from the rear of the carrier. For active control of tilt, the force applied through spring 357 is controlled through a motorized screw jack 358 that is operated in response to vertical movement of the sensing wheel 351 relative to part of the structure of carrier 314. For increased traction between the mail wheel 316 and main rail 315, the jack 358 and a similar jack on the right side of the carrier may be simultaneously controlled to increase the upward forces applied by both of the left and right wheels 351 and 352 to the undersides of the left and right side rails 331 and 332.

To apply an upward force from the wheel 333 to the underside of the left side rail 331 of the guideway, wheel 333 is journaled on a shaft 359 that is supported by a lever 360 pivoted on a shaft 361. Shaft 361 and the jack 358 are supported through a structure 362 from a frame of the carrier 314. The underside of an end portion 363 of lever 360 is engaged by the upper end of the spring 357. The lower end of spring 357 engages a second lever 364 that is pivoted on the shaft 361. An upper end of a screw of the jack 358 engages the underside of an end portion 365 of lever 364 to control an upward force applied to the lower end of spring 357 and to thereby control the force applied by wheel 333 to the underside of the left side rail 331.

As is also shown in FIG. 25, and as is more clearly shown in FIG. 26, the sensing wheel 351 is journaled on a shaft 364 that is supported by a lever 368. Lever 368 is pivotal on a shaft 369 that is supported by a base member 370 supported through the support structure 362 from the frame of the carrier 314. The sensing wheel 361 is urged upwardly by means of a spring 371 having a lower end portion supported by the base member 370 and having an upper end engaged with the underside of an end portion 372 of lever 364. An electrical signal that is proportional to upward displacement of wheel 351 relative to base member 370 is developed by means of a linear potentiometer 373 that has a spring-urged element 374 engaged with a terminal end portion 375 of lever 368. The electrical signal so developed is used in control of the jack 358 to provide an active control of the force applied by wheel 333 to the underside of the left side rail 331. Active control is advantageous in control of tilt when the carrier 314 is following a curved path to be subject to centrifugal forces and when the carrier and its load are subject to the forces of side winds. Active control is also advantageous in increasing traction when accelerating and decelerating and when moving on inclines.

It is noted that FIG. 25 also shows how two braking assemblies are provided for braking of the carrier. Rotors 377 and 378 are secured to left and right ends of a support shaft 379 for the main wheel 316. Portions of a caliper brake 380 for the rotor 377 are shown in FIG. 25, a like caliper brake being provided for the rotor 378. Providing two brake assemblies is advantageous in reducing wear and also in providing the ability to obtain greater braking torques when necessary, also for safety, greatly decreasing the likelihood of complete failure of braking FIG. 25 also shows the support of the jack 341 from a portion 381 of the support structure 362 and a linkage 382 between a screw of the jack 341 and the block 339 of insulating material that supports the current collector shoes 337. As shown in FIG. 26, a left one of the shoes 337 is secured to the rearward end of a resilient spring member 383, the forward end of member 383 being secured to the underside of a depending portion 384 of the block 339. The other two of the shoes 337 and each of the shoes 338 on the opposite right side are supported in the same way. Electrical cables, not shown, are connected to the forward end of member 383 and to the forward ends of the other resilient members, for supply of 3-phase power to the carrier 314.

The forward end of the block 339 is supported from the support structure 363 for pivotal movement about a horizontal axis. When steering to the right through a divergent Y-junction, the rearward end of the block 339 is lifted through jack 341 and linkage 382 (not visible in FIG. 26, but shown in FIG. 25 to lift the shoes 337 to a level above the upper surface of the main rail 315.

Figure 27:
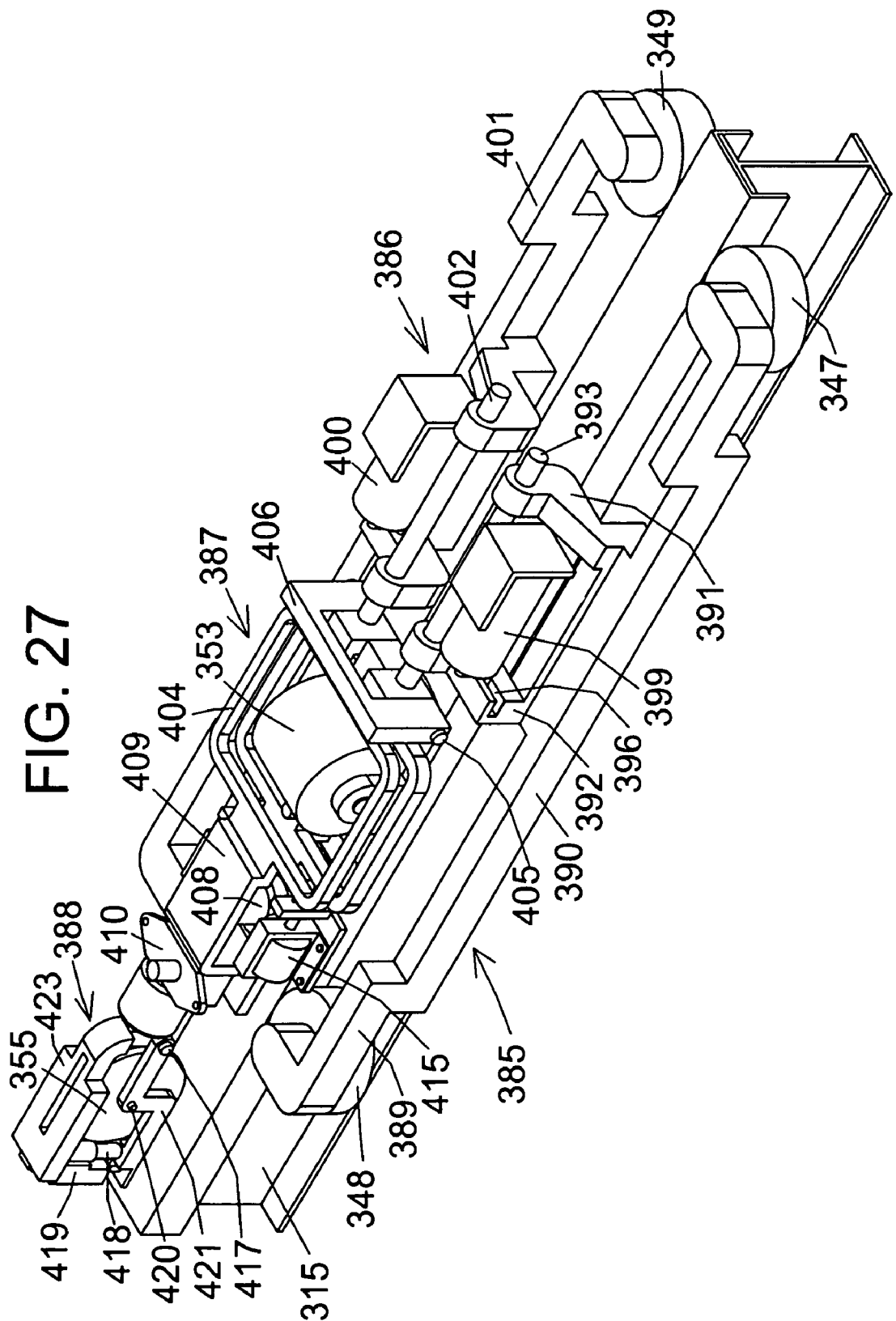
FIG. 27 is an isometric view showing assemblies for support and control of positions of guide wheels of the carrier of FIG. 18, an assembly for support and control of a forward balance wheel and an assembly for support of a sensing wheel and developing an electrical signal in response to vertical displacement of the sensing wheel.

FIG. 27 is an isometric view showing assemblies 385 and 386 for support and control of positions of the guide wheels 347, 349 and 348, 350, an assembly 387 for support and control of the forward balance wheel 353 and an assembly 388 for support of the sensing wheel 355 and for developing an electrical signal in response to vertical displacement of the sensing wheel 355.

The assembly 385 includes a member 389 which supports and journals the wheels 347 and 348 at its rearward and forward ends and which includes a downwardly offset portion 390. The member 389 includes longitudinally spaced portions 391 and 392 which extend inwardly and upwardly from the offset portion 390 for support of the member 389 for pivotal movement about the axis of a horizontal longitudinally extending shaft 393 that is supported by a frame structure, not shown, of the carrier 314. The axis of shaft 393 is spaced upwardly from the left upper edge of the main rail 315. To lift the wheels 347 and 348 for a steer to the right through a divergent Y-junction, the member 389 is rotated about an angle of about 60 degrees, in a clockwise direction as viewed from behind. The wheels 347 and 348 are then positioned above the level of the upper surface of the main rail 314. When the member 389 is so rotated, the offset of the portion 389 avoids interference with the assembly 387 and with frame structures, not shown, of the carrier 314.

Figure 28:
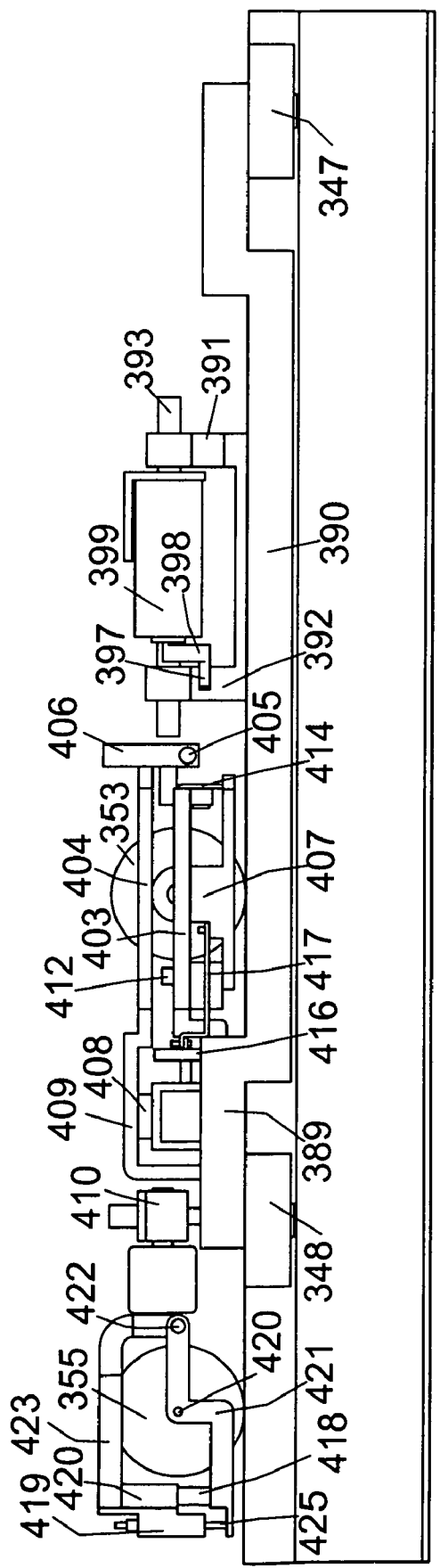
FIG. 28 is a side elevational view of the assemblies shown in FIG. 27.

To rotate the member 389, the portion 392 thereof has a groove 396 which, as shown in FIG. 28, receives a pin 397 extending forwardly from the end of a crank arm 398. Crank arm 398 is rotated by a gear motor 399 about a horizontal longitudinally extending axis. A second gear motor 400 is provided for the right-hand assembly 386 which includes a member 401 that is pivotal on a shaft 402. Member 401 has a form that is a mirror image of the form of member 389 and supports the wheels 348 and 350, wheel 350 being hidden from view in FIG. 27. To steer to the left through a divergent Y junction, the gear motor 400 rotates the member 401 and the wheels 348 and 350 through about a 60 degree angle, in a counter-clockwise direction as viewed from behind. Gear motors 398 and 400, as well as shafts 303 and 402 are secured by means not shown to a frame structure of the carrier 314.

The assembly 387 includes the wheel 353 that engages the main rail 315 at a point spaced forwardly from the main wheel 316 for control of balance about the axis of the main wheel 316. A lower member 403 and an upper member 404 are provided, both of which function as levers. Both have rearward end portions that are pivotally supported on a transverse horizontal shaft 405 is supported by a member 406 secured to the frame structure of the carrier 314. The lower lever member 403 functions to exert downward forces on a support member 407 for the wheel 353. A coiled compression spring 408 has an upper end engaged with the underside of a portion 409 of the upper member 404 and a lower end engaged with a forward end portion, not visible in the drawings, of the lower lever member 403. A motorized screw jack 410 that is secured to the frame structure of the carrier 314 controls the vertical position of a forward terminal end portion 411 of the upper member 404 to control the force applied by spring 408 and to thereby act through the lower member 403 and wheel support member 407 to control the force applied by wheel 353 against the main rail 315.

Each of the lower and upper lever members is formed to provide a hoop portion of rectangular shape that surrounds the wheel 353 and that is provided for the purpose of minimizing the vertical dimension of the assembly which is positioned under the induction motor 319 of the carrier. The support member 407 for the wheel 353 includes an upstanding and centrally located shaft portion 412 which extends upwardly through an opening in a depending portion 411 of the lower lever member 403. A rearward end portion of the support member 407 is engaged by a wheel 414 that is carried by the lower lever member 403 and that applies a downward force to the member 407 while allowing rotation of the member 407 about the vertical axis of the shaft portion 412.

The vertical axis of shaft portion 412 is spaced forwardly from the axis of the wheel 353. Normally, the wheel support member 407 freely pivots about the vertical axis of shaft portion 412 to obtain a caster action. However, when moving through divergent Y-junctions the wheel support member 407 may be rotated about the axis of shaft portion 412 and to a position in which the wheel 353 coacts with the main rail 315 to apply a transverse force that insures proper engagement of those of the guide wheels 347-350 that are not lifted with sides of the main rail 315 and structure 344. For this purpose, left and right solenoids are provided, only the left solenoid 415 being visible in the drawings. As shown in FIG. 28, an armature 416 of the solenoid 415 is connected through a link 417 to the left side of the wheel support member 407. When the solenoid 415 is energized, the left side of the wheel support member 407 is moved forwardly, rotating the wheel support member 407 and the wheel 353 in a clockwise direction as viewed from above to exert a force to the right on a forward portion of the carrier 314 and to insure engagement of the guide wheels 347 and 349 with the left sides of the main rail 315 and structure 344. This is the desired result when the guide wheels 348 and 350 are lifted for a steer to the left. For a steer to the right, when wheels 347 and 349 are lifted, the right hand solenoid, not shown, is energized to rotate the wheel 353 in a counter-clockwise direction as viewed from above and to insure engagement of the non-lifted wheels 348 and 350 with the right side of the main rail 315.

The assembly 388 includes a support that includes a coiled compression spring 418 for urging the sensing wheel 355 downwardly into engagement with the main rail and a linear potentiometer 419 for use in developing an electrical signal proportional to downward displacement of the wheel 355. The wheel 355 is journaled on a shaft 420 carried by a lever 421 which has a rearward end pivotal on a shaft 422. Shaft 422 is supported by a depending portion at the rearward end of a support member 423 that is supported from the frame structure of the carrier 314. The lower end of the spring 418 is engaged with a forward portion of the lever 421. The upper end of the spring 418 extends into a sleeve 424 that depends from the support member 423. A terminal end of the lever 421 is engaged by a sensing element 425 of the linear potentiometer 419.

Details of constructions of assemblies for support and control of the balance wheel 353 and sensing wheel 356 are not shown for the reason that they are essentially the same as those of assemblies 387 and 388, differing only in that the rearward wheels 354 and 356 are much wider that the forward wheels 353 and 355 and in that solenoids corresponding to those of assembly 387 are not provided for control of the rearward balance wheel 354.

Figure 29:
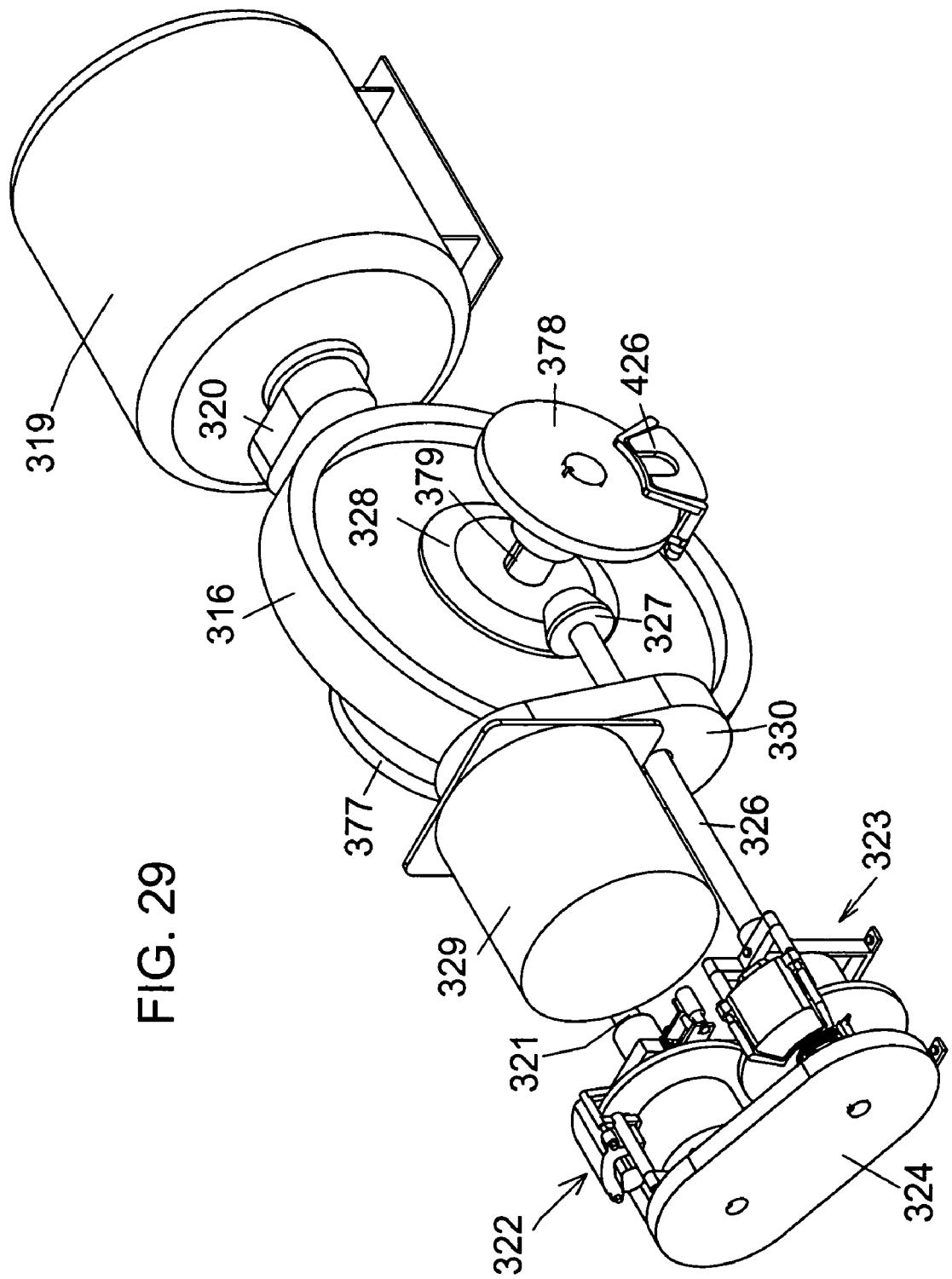
FIG. 29 is an isometric view showing only the components of a power train of the carrier of FIG. 18.
Figure 30:
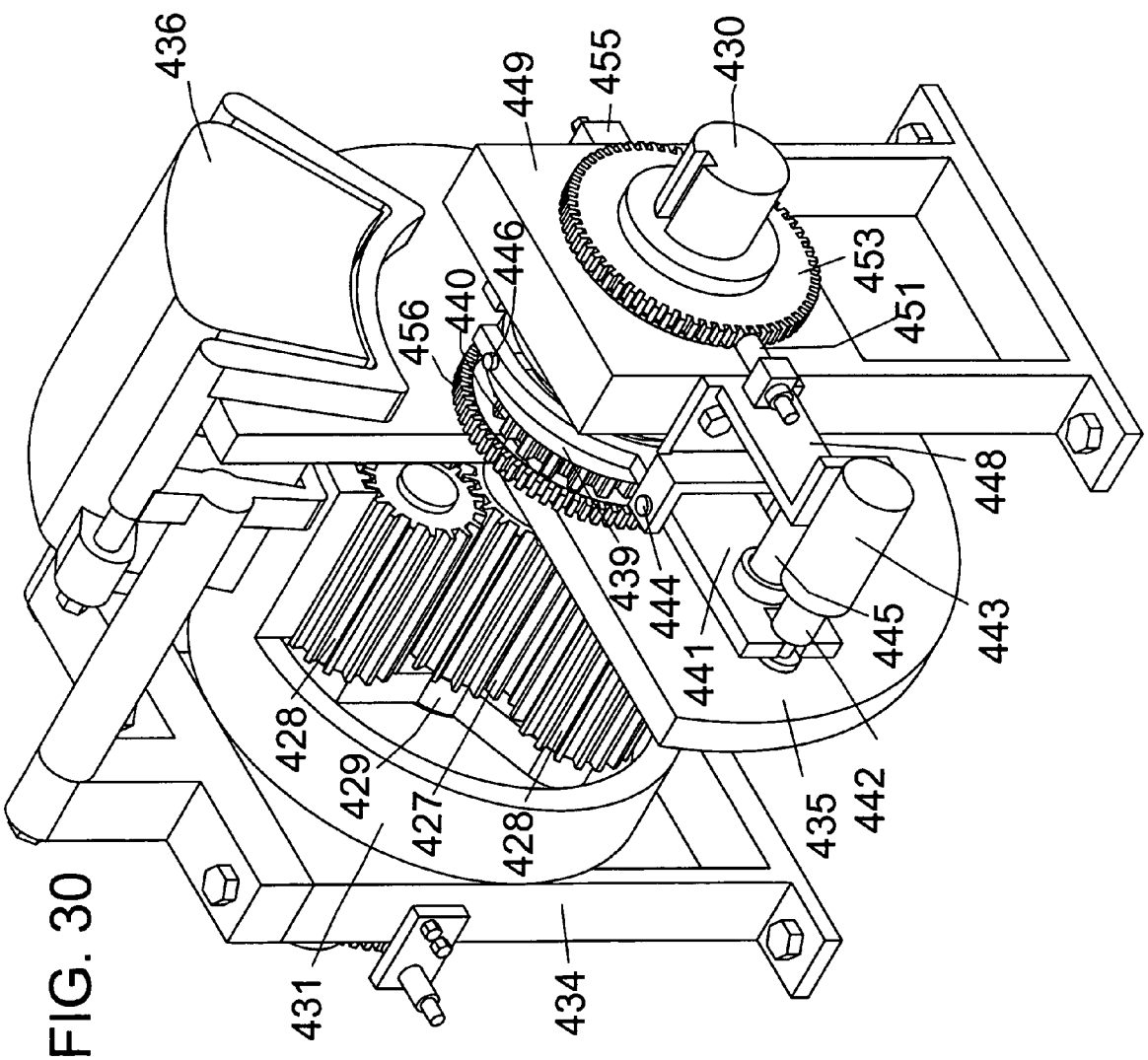
FIG. 30 is an isometric view of one transmission unit of the power train of FIG. 30, with certain parts being shown broken away in order to show gears of the unit.
Figure 31:
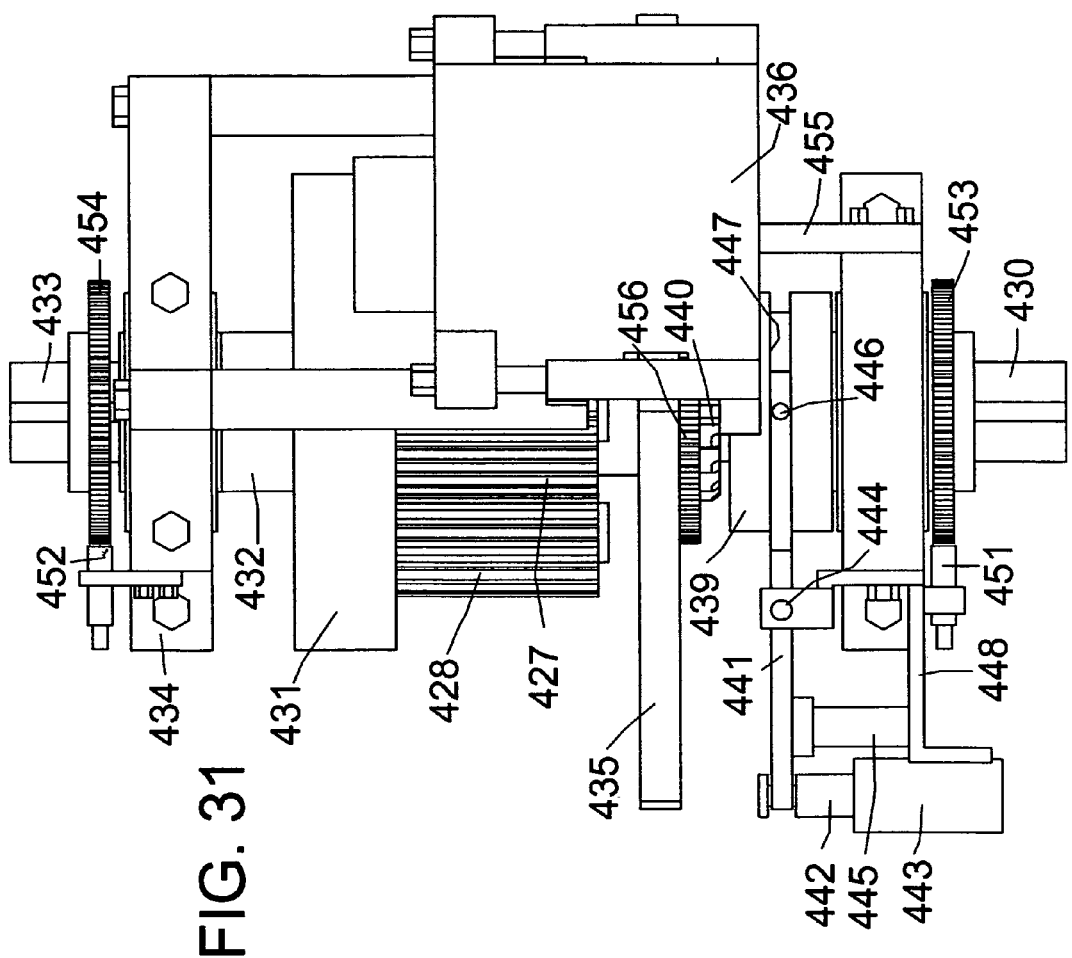
FIG. 31 is a top plan view of the transmission unit as shown in FIG. 30.

FIG. 29 more clearly shows the drive train of carrier 314 that has been described in connection with FIGS. 18-21 and 26. It also shows a caliper brake 426 for braking the rotor 378, hidden from view in FIG. 25. FIG. 30 is an isometric view of the transmission unit 323 when viewed by itself and from a different angle than in FIG. 29, certain components being shown broken away in order to show gears of the unit. FIG. 31 is a top plan view of the transmission unit 323 as shown in FIG. 30.

The transmission units 322 and 323 are substantially identical. Each has a planetary gear train with a sun gears that can be braked to a stop to obtain a maximum output/input speed ratio, preferably a 1.4 to 1 ratio. Each train may be selectively locked-up to obtain a 1 to 1 ratio. The units are coupled in series to obtain three different fixed output/input speed ratios, a 1 to 1 ratio when gear trains of both units are locked up, a 1.4 to 1 ratio with the gear train of one unit locked up and the sun gear of the other fully braked and a 1.96 to one ratio with the sun gears of both units fully braked. The transmission unit 323 that is illustrated in FIGS. 30 and 31 has a planetary gear train that includes a sun gear 427; three planet gears 428 two of which are visible in FIG. 13; a planet gear carrier 429 that is secured to the forward end of an input shaft 430; and a ring gear formed by teeth on the inside of a portion of an output member 431. Output member 431 has a hub portion 432 that is shown in the plan view of FIG. 30 and that is secured to the rearward end of an output shaft 433 which is journaled in an opening in a support 434. The input shaft 430 extends forwardly beyond the planet gear carrier 429 and into an opening in the output member 431 to be journaled by the output member 431. A rotor 435 is secured to the sun gear 425 and is braked by a caliper 436 that is operable from a source of controllable hydraulic pressure, not shown.

Means are provided for selectively locking-up the gear train so that the output shaft, input shaft and sun gear will all rotate at the same speed. In particular, an annular member 439 having internal splines is mounted on an externally splined member, not visible, that is secured to the input shaft. Member 439 is movable axially to engage an externally splined member 440 that is secured to the rotor 435, to thereby lock up the gear train. One end of a fork 441 is connected a plunger 442 of a solenoid 443 which, when energized, rotates the fork 441 about the axis of a shaft 444 and against the force of a compression spring 445 to move the opposite end of the fork and upper and lower pins 446 carried thereby in a direction to move member 439 into engagement with the member 440 on the rotor 131. Pins 446 are engaged in an annular groove 447 in the member 439. The solenoid 443, fork-support shaft 444 and spring 445 are supported from a bracket 448 which is secured to a support 449 of the transmission unit 323.

For purposes of control, signals are developed at rates proportional to the speeds of the input and output shafts 430 and 433 by sensors 451 and 452 that are mounted on the supports 449 and 434 and that have ends adjacent the periphery of toothed speed discs 453 and 454 mounted on the input and output shafts 428 and 431. An additional sensor, not visible in the drawings, is supported from support 449 through a bracket 455 and has an end adjacent the periphery of an additional speed disc 456 that is secured to the rotor 435 and thereby to the sun gear 427. To obtain a 1 to 1 ratio, the sun gear may be braked until the speed of the input shaft is equal to that of the output shaft, whereupon the solenoid 443 may be energized to lock-up the gear train. To obtain a maximum ratio, the caliper 436 is operated to brake the rotor 435 and thereby the sun gear 427 to a stop.

If K is the ratio of the diameter of the planet gears 428 to the diameter of the sun gear 427, and Wout, Win and Ws are respectively the angular velocities of the output shaft 433, input shaft 430 and sun gear 427, then Wout=Win*2*(1+K)/(1+2*K)−Ws*(1/(1+2*K). In the illustrated embodiment, K=3/4; Wout=Win*1.4−Ws*0.4. If R=ratio obtained from transmission units 322 and 323, Win is in RPM, BGR=ratio of diameter of bevel gear 328 to the diameter of bevel gear 327, and WD=diameter of wheel 316 in inches, the carrier speed in ft/sec=R*Win*(1/BGR)*WD*0.004363. If R=1.96 (using both units 18 and 19 in series), Win=1750 RPM, BGR=3 and WD=26 inches, carrier speed is equal to 129.7 ft/sec or about 88.4 MPH. Using one of the units 322 and 323 with the other locked up, the speed will be about 63.2 MPH. With both units locked up the speed will be about 45.1 MPH.

The drive arrangement as disclosed takes advantage of the high efficiency obtainable with induction motors when operated at near rated speed. The induction motor 319 is especially suitable for drive of a carriers that follow another along a guideways, when all carriers should move at the same speed to maintain safe following distances. The speed of an induction motor does vary with load and the load requirements of carriers vary with wind velocities, differences in coefficients of aerodynamic drag and other factors. Accordingly, maintaining a safe following distance behind a carrier ahead may require a slow down of a carrier, for example when both carriers face a head wind and the carrier behind has a drag coefficient less than that of the carrier ahead. The required speed control is normally quite small but it is necessary and is readily obtainable through control of braking of sun gears of the transmission units.

When the sun gear of a unit is braked to a stop, the output speed of that unit is at the maximum achievable under existing load conditions. If the speed is too high it may be decreased by decreasing the braking torque applied to the sun gear, allowing drag on the carrier to slow down the carrier. The speed of the sun gear may thereby be increased from zero to a value, normally quite small, at which the desired carrier speed is obtained. Normally, the power dissipated in the brake will be quite small, being proportional to the product of the speed of the sun gear and the torque applied thereto. The drive control system is thus efficient and works quite well in achieving the small changes in the high speed of a carrier that are normally required when moving along a guideway.

Braking of the sun gear may also be used to advantage for control of acceleration of a carrier from a stop to a speed at which it may merge with carriers moving along a main-line guideway, but not without problems. When the carrier speed is zero, the speed of the sun gear will be at a maximum. The braking power initially applied to the sun gear may be quite large, being proportional to the product of the initial high speed of the sun gear and a high torque that is proportional to the desired acceleration. The required sizes of the caliper brakes and associated rotors may thus be quite large. The energy losses might also be quite large. The separate M/G (motor/generator) 329 is very important in dealing with these problems, being active as a motor to assist in drive of the carrier during acceleration to reduce the high amount of power that would otherwise need to be dissipated in braking of the sun gear. The power requirements imposed upon the gear train components, when used for acceleration, decreases as function of the difference between the speed attained from use of the M/G 329 and the speed to be reached. If the M/G 329 can accelerate the carrier to a speed that is a large fraction of the speed to be obtained, the braking of one of both of the sun gears can be used with relatively low power losses to accelerate the remainder of the way to the desired final speed. Preferably, the M/G 329 is powered from a battery and acts as a generator during deceleration of the carrier to charge the battery and recover some of the energy used in acceleration of the carrier. The DC motor-generator 329 may also be operated from the battery to drive the carrier in the event of failure of supply of AC power to the induction motor.

It will be understood that modifications and variations may be effected without departing from the spirit and scope of the novel concepts of the invention.

I claim:

1. A transport system comprising: a guideway including a main rail and auxiliary rails in spaced parallel relation to said main rail,
    a carrier movable along said guideway and including a single main wheel for riding on said main rail and auxiliary wheels for contact with said main and auxiliary rails, and
    drive and braking means for said single main wheel,
    wherein said carrier includes means for supporting a load to be carried above said single main wheel,
    wherein said auxiliary wheels include tilt control and balance control wheels which are so positioned and so operate in contact with said main and auxiliary rails as to cause said single main wheel to support at least a major portion of the weight of said carrier and of any load carried by said carrier above said single main wheel,
    wherein said auxiliary rails include first and second rails that are on opposite sides of and in symmetrical relation to a central vertical plane through said main rail,
    wherein said tilt control wheels engage said first and second rails to limit tilting of said carrier about a central longitudinal axis through said plane and along the top of said main rail, and
    wherein said balance control wheels control balance of said carrier about the axis of said single main wheel.

2. A transport system as defined in claim 1, wherein said first and second rails are located in horizontally spaced relation to said main rail.

3. A transport system as defined in claim 2, wherein said tilt control wheels contact undersides of said first and second rails to apply upward forces to said first and second rails and to thereby increase the force applied from said main wheel to said main rail, and
    wherein means are provided for control of said upward forces to control traction between said main wheel and said main rail.

4. A transport system as defined in claim 1, wherein said balance control wheels are in contact with upper surface areas of said main rail that are in forwardly and rearwardly spaced relation to said main wheel.

5. A transport system as defined in claim 4, wherein said auxiliary wheels include a left pair of wheels for contacting a left side of said main rail and a right pair of wheels for contacting a right side of said main rail,
    each of said left and right pairs of wheels including a rearward wheel in adjacent relation to the area of contact between said main wheel and said main rail and a forward wheel spaced forwardly from said rearward wheel,
    wherein means operate in Y-junctions to lift said left pair of wheels when steering to the right and to lift said right pair of wheels when steering to the left, and
    wherein the forward one of said balance-control wheels is positioned to develop a force to the left on said carrier when steering to the right and is positioned to develop a force to the right on said carrier when steering to the left.

6. A transport system as defined in claim 1, wherein said first and second rails are located in spaced side-by-side relation above said main rail,
    wherein said tilt control wheels contact side surfaces of said first and second rails to limit rotation of said carrier about said central longitudinal axis, and
    wherein said balance control wheels are in forwardly spaced relation to said main wheel and are in contact with an upper surface of said main rail and with opposed underside surfaces of said first and second rails.

7. A transport system as defined in claim 1, wherein said guideway includes Y-junctions and in each Y-junction first and second main rail portions extend away from each other and from one end of a third main rail portion for support of said carrier for movement in either a first path or a second path,
    wherein in each Y-junction said first rail is located in vertically spaced relation to said first and third main rail portions and said second rail is located in vertically spaced relation to said second and third main rail portions,
    wherein said tilt control wheels include a first wheel that contacts an outer side of said first rail to limit tilting action in one direction when said carrier moves in said first path and a second wheel that contacts an outer side said second rail to limit tilting action in an opposite direction when said carrier moves in said second path,
    wherein said auxiliary wheels further include wheels that contact inward sides of said first and second rails for limiting said tilting action in said opposite direction when said carrier is moving in said first path and for limiting said tilting action in said one direction when said carrier is moving in said second path and
    wherein means are provided for lowering said second tilt control wheel when said carrier is moving in said first path and for lowering said first tilt control wheel when said carrier is moving in said second path.

8. A transport system as defined in claim 1 wherein said main rail is of steel and
    wherein said main wheel includes a peripheral part that includes first and second annular portions of magnetic material that are in axially spaced relation for contact with separate transversely spaced portions of said main rail and a third annular portion of magnetic material that is radially inside a space between said first and second annular portions and that completes a magnetic flux path through said first and second portions and through portions of said steel rail that are between areas of said steel rail contacted by said first and second portions, and
    means for developing magnetic flux in said path to develop a magnetic attraction between said wheel and said rail and to thereby obtain increased traction between said wheel and said rail,
    said magnetic flux developing means including a coil of wire that is in said space and that is wound around said third annular portion of said peripheral part of said wheel, and
    current supply means for applying an electrical current to said coil.

9. A transport system as defined in claim 1, wherein said auxiliary wheels include a left wheel for contacting a left side of said main rail and a right wheel for contacting a right side of said main rail,
    wherein said left and right wheels normally function to keep said main wheel in a centered position on said main rail, wherein means operate in Y-junctions to lift said left wheel when steering to the right and to lift said right wheel when steering to the left, and wherein guide means operate to maintain contact of said right wheel with said right side of said main rail when said left wheel is lifted to steer to the right and to maintain contact of said left wheel with said left side of said main rail when said right wheel is lifted to steer to the left.

10. A transport system as defined in claim 9, wherein said auxiliary rails include a first rail that is in horizontally spaced relation to the left of said main rail and a second rail that is in horizontally spaced relation to the right of said main rail, and wherein said guide means include wheels for contact with said first and second rails when moving through Y-junctions.

11. A transport system as defined in claim 9 wherein said balance control wheels are in contact with upper surface areas of said main rail that are in forwardly and rearwardly spaced relation to said main wheel, and wherein said guide means operate to so position the forward one of said balance-control wheels as to develop a force to the left on said carrier when steering to the right as to develop a force to the right on said carrier when steering to the left.

12. A transport system comprising: a guideway including a main rail and auxiliary rails, a carrier movable along said guideway and including a single main wheel for riding on said main rail and auxiliary wheels for contact with said main and auxiliary rails, drive and braking means for said single main wheel, and means for so controlling forces acting on said carrier through contact of said auxiliary wheels with said main and auxiliary rails as to cause said main wheel to support at least a major portion of the weight of said carrier and any load carried by said carrier, said carrier including balance means for limiting movement of said carrier about the axis of said main wheel, wherein said auxiliary rails include first and second rails that are located in spaced side-by-side relation above said main rail, wherein said auxiliary wheels include first and second wheels that contact side surfaces of said first and second rails to limit rotation of said carrier about a longitudinal axis, wherein said balance means include auxiliary wheels that are in forwardly spaced relation to said main wheel and that contact an upper surface of said main rail and opposed underside surfaces of said first and second rails, and wherein said auxiliary wheels include an additional pair of wheels that apply controllable upward forces to undersides of said first and second auxiliary rails to thereby control traction between said main wheel and said main rail.

13. A transport system comprising: a guideway including a main rail and auxiliary rails, a carrier movable along said guideway and including a single main wheel for riding on said main rail and auxiliary wheels for contact with said main and auxiliary rails, drive and braking means for said single main wheel, and means for so controlling forces acting on said carrier through contact of said auxiliary wheels with said main and auxiliary rails as to cause said main wheel to support at least a major portion of the weight of said carrier and any load carried by said carrier, wherein said auxiliary rails include first and second rails that are located in horizontally spaced relation to said main rail, wherein said auxiliary wheels include first and second wheels that contact said first and second rails to limit tilting of said carrier about a longitudinal axis, wherein said guideway includes Y-junctions and in each Y-junction first and second main rail portions extend away from each other and from one end of a third main rail portion for support of said carrier for movement in either a first path or a second path, wherein in each Y-junction said first rail is located on one side of and in horizontally spaced relation to said first and third main rail portions and said second auxiliary rail is located on an opposite side and in horizontally spaced relation to said second and third main rail portions, wherein said first wheel contacts the underside of said first rail to limit tilting action in one direction when said carrier moves in said first path, wherein said second wheel contacts the underside of said second rail to limit tilting action in an opposite direction when said carrier moves in said second path, and wherein additional means are provided in each Y-junction for limiting said tilting action in said opposite direction when said carrier is moving in said first path and for limiting said tilting action in said one direction when said carrier is moving in said second path.

14. A transport system as defined in claim 13 wherein said additional means include first current supply rails on said one side of said main rail, second current supply rails on said opposite side of said main rail, first current collector shoes that contact said first current supply rails to limit said tilting action in said opposite direction when said carrier is moving in said first path and second current collector shoes that contact said second current supply rails to limit said tilting action in said one direction when said carrier is moving in said second path.

15. A transport system including a guideway, a plurality of carriers each including drive wheel means for effecting movement thereof along said guideway, an AC induction motor, means for supply of AC from said guideway to said induction motor during said movement along said guideway, battery means, a DC motor/generator including an armature and a field winding, connection means for flow of current between said battery means and said armature, field current control means between said battery means and said fielding winding, an epicyclic gear train including a first element coupled to said AC induction motor, a second element coupled to said wheel means and a third element coupled to said DC motor/generator, and processor means coupled to said field current control means and operative in one mode to increase current through said field winding to thereby increase current flow from said motor/generator to said battery means and to thereby cause said DC motor/generator to apply a braking torque to said third element and thereby increase the speed of rotation of said second element and the speed of drive of said wheel means, characterized in the provision of an electrically controllable brake mechanically coupled to said third element and electrically connected to said processor, said processor means being operative to control said brake to apply a braking torque from said brake to said third element and thereby augment the braking torque applied by said DC motor/generator.

16. A transport system as defined in claim 15, further characterized in the provision of an electrical load resistance, and in that said connection means is in the form of a switching circuit that is connected to said electrical load resistance and that is controllable by said processor means to disconnect said armature from said battery means and connect said armature to said electrical resistance when the field current is at maximum and the voltage developed by said armature is less that the voltage supplied by said battery means.

17. A transport system as defined in claim 15, further characterized in that said connection means is in the form of a switching circuit controllable by said processor means to reverse the connection between said armature and said battery means in the event of failure in the supply of AC current to said induction motor and then allow flow of current from said battery means to said motor/generator for operation of said motor/generator as a motor to drive said wheel means through said epicyclic gear train.

18. A transport system including a guideway,
a plurality of carriers each including drive wheel means for effecting movement thereof along said guideway,
an AC induction motor, and
means for supply of AC from said guideway to said induction motor during said movement along said guideway,
a drive train that includes an epicyclic gearing having first, second and third elements, said first element being coupled to said AC induction motor to receive an input torque from said AC induction motor, said second element being coupled to said drive wheel means to apply an output torque to said drive wheel means,
first brake means for applying a controllable braking torque to said third element to effect application of a drive torque from said second element to said wheel means that is proportional to said braking torque,
second brake means for applying a controllable braking torque to said wheel means,
battery means,
a DC motor-generator mechanically coupled to said wheel means and including an armature electrically coupled to said battery means,
said drive train being operative in a carrier-acceleration mode in which said DC motor-generator operates as a motor supplied with current from said battery to apply a corresponding component of accelerating torque to said wheel means and in which said first braking means operate as necessary to cause application of a braking torque to said third element and a corresponding additional component of accelerating torque to said wheel means,
said drive train being operative in a carrier-deceleration mode in which said DC motor-generator operates as a generator to apply a charging current to said battery means and a corresponding component of decelerating torque to said wheel means and in which said second braking means operate as necessary to cause application of an additional component of decelerating torque to said wheel means, and
said drive train being operative in a carrier-drive mode in which said AC supply means are inoperative and in which said DC motor-generator is selectively operative either as a motor supplied with current from said battery means to apply a corresponding drive torque to said wheel means or as a generator supplying a charging current to said battery means to apply a corresponding decelerating torque to said wheel means.

19. A transport system as defined in claim 18 wherein said epicyclic gearing is part of a drive unit of said drive train and includes a sun gear forming said third element and having external teeth, a ring gear having internal teeth and forming said second element, planet gears are meshed with said external teeth of said sun gear and said internal teeth of said ring gear and a carrier supporting said planet gears and forming said first element, wherein locking means are provided for interconnecting two of said elements of said gear train to cause all three to operate at the same rotational speed, and
wherein speed sensing means are provided for sensing the speeds of rotation of at least two of said gearing elements,
said unit being operable in a lower speed mode in which said locking means is placed in an inoperative condition while operating said brake means to reduce the speed of said sun gear until two of said gear elements are rotating at the same speed with said locking means being thereafter operative to obtain a one-to-one ratio of the speed of rotation of said carrier element to the speed of rotation of said ring gear element, and
said unit being operative in a higher speed mode in which said locking means is placed in an inoperative condition while operating said brake means to gradually bring rotation of said third element to a stop and to then obtain a certain higher-than-one ratio of the speed of rotation of said second element to the speed of rotation of said first element.

20. A transport system as defined in claim 19, wherein said drive train includes a second drive train unit that includes a second epicyclic gear train,
second speed sensing means and third brake means which are respectively similar to said epicyclic gear train, said speed sensing means and said first brake means,
said second epicyclic gear train including a carrier coupled to said ring gear of said first drive train unit, a ring gear coupled to said wheel means and a sun gear coupled to said second brake means, and
said second drive train unit being operative in lower and higher speed modes like those of said first drive train unit whereby to obtain at least three ratios of the speed of rotation of said second element of said second drive train to the speed of rotation of said first element of the first drive train unit.

21. A transport system as defined in claim 20, wherein said brake means includes a rotor coupled to third element, and caliper means for controllable frictional contact with said rotor.

22. A transport system comprising a platform arranged to be carried by a carrier that is movable along a guideway and arranged to receive a car driven thereon and to lock a car thereto,
said platform comprising: stop means at a forward end of said platform,
chock means located behind said stop means,
first operating means for said stop means,
second operating means for said chock means,
said first and second operating means having car-receiving conditions in which said stop means are in an upright position for engagement by a front bumper of a car to limit forward movement of a car being driven onto said platform and in which said chock means are in lower positions that avoid interference with driving of a car onto said platform and that are behind the front wheels of a car that has a front bumper engaged with said stop means, said first and second operating means having car-locking conditions in which stop means remain in said upright position for engagement with said front bumper of a car to prevent forward movement of a car being driven onto said platform and in which said chock means are moved upwardly from said lower positions and then forwardly into firm contact with front wheels of a car to prevent rearward movement of a car after being driven onto said platform, and said first and second operating means having car-delivery conditions in which said stop means are in forward and lowered positions out of the path of car to be driven off of said platform and in which said chock means are back in said lower positions, wherein said first operating means includes spring means operative when said stop means are in said upright position to absorb energy that is applied from the front bumper of a car driven onto the platform.

23. A transport system as defined in claim 22 wherein said stop means includes two transversely spaced elements for contact with transversely spaced portions of a front bumper of a car.

24. A transport system as defined in claim 22 wherein said stop means are journaled on a transverse horizontal axis to be pivotal between said upright position and said forward and lowered position, and wherein said spring means of said first operating means is in the form of torsion spring means on said axis, and a gear motor for operating through said torsion spring means to rotate said stop means about said axis.

25. A transport system as defined in claim 22 wherein said second operating means includes a pair of transversely spaced longitudinally extending racks, a transverse actuating bar connecting forward ends of said racks and arranged to move said chocks forwardly and rearwardly, a pair of pinions meshing with said racks, a transverse shaft connecting said pinions, and gear-motor means for rotating said transverse shaft.

26. A transport system including a guideway including a steel rail, a carrier movable along said guideway and including a support wheel for riding on said steel rail and drive and braking means for said support wheel, characterized in that said support wheel includes a peripheral part that includes first and second annular portions of magnetic material that are in axially spaced relation for contact with separate transversely spaced portions of said steel rail and a third annular portion of magnetic material that is radially inside a space between said first and second annular portions and that completes a magnetic flux path through said first and second portions and through portions of said steel rail that are between areas of said rail contacted by said first and second portions, and means for developing a magnetic flux in said path to develop a magnetic attraction between said support wheel and said steel rail and to thereby obtain increased traction between said support wheel and said steel rail.

27. A transport system as defined in claim 26 wherein said magnetic flux developing means comprises a coil of wire that is in said space and that is wound around said third annular portion of said peripheral part of said wheel, and current supply means for applying an electrical current to said coil.

28. A transport system as defined in claim 27, wherein said current supply means includes pair of annular conductors that are in coaxial relation on said wheel and that are connected to opposite ends of said coil, and stationary brush means in contact with said annular conductors and arranged for connection to a source of current.

* * * * *